US011882398B2

(12) United States Patent
Ham et al.

(10) Patent No.: US 11,882,398 B2
(45) Date of Patent: Jan. 23, 2024

(54) VIBRATION APPARATUS, APPARATUS AND VEHICLE INCLUDING THE SAME

(71) Applicant: LG Display Co., Ltd., Seoul (KR)

(72) Inventors: Yong-Su Ham, Paju-si (KR); YongWoo Lee, Paju-si (KR); YuSeon Kho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/531,003

(22) Filed: Nov. 19, 2021

(65) Prior Publication Data

US 2022/0174398 A1 Jun. 2, 2022

(30) Foreign Application Priority Data

Nov. 27, 2020 (KR) ........................ 10-2020-0161876

(51) Int. Cl.

*H04R 3/00* (2006.01)
*H04R 1/28* (2006.01)
*H04R 17/00* (2006.01)
*H04R 1/32* (2006.01)

(52) U.S. Cl.

CPC ............ *H04R 1/2811* (2013.01); *H04R 3/00* (2013.01); *H04R 17/005* (2013.01); *H04R 1/323* (2013.01); *H04R 2499/13* (2013.01); *H04R 2499/15* (2013.01)

(58) Field of Classification Search

CPC ........ H04R 1/2811; H04R 1/28; H04R 1/323; H04R 17/005; H04R 2499/13; H04R 2499/15

See application file for complete search history.

(56) References Cited

U.S. PATENT DOCUMENTS 6,278,790 B1 * 8/2001 Davis ........................ H04R 7/04 381/431
2002/0168074 A1 * 11/2002 Miyamoto ............... H04R 9/10 381/182
2019/0037164 A1 * 1/2019 Kim ..................... H04R 17/005

* cited by examiner

*Primary Examiner* — Suhan Ni
(74) *Attorney, Agent, or Firm* — Morgan, Lewis & Bockius LLP

(57) ABSTRACT

A vibration apparatus comprises a lower vibration structure, an upper vibration structure on the lower vibration structure, and an adhesive member between the lower vibration structure and the upper vibration structure. The lower vibration structure and the upper vibration structure are configured to generate sound waves having different frequencies.

34 Claims, 27 Drawing Sheets

VIBRATION APPARATUS, APPARATUS AND VEHICLE INCLUDING THE SAME

CROSS-REFERENCE TO RELATED APPLICATIONS

This application claims the benefit of the Korean Patent Application No. 10-2020-0161876 filed on Nov. 27, 2020, which is hereby incorporated by reference as if fully set forth herein.

BACKGROUND

Technical Field

The present disclosure relates to a vibration apparatus, an apparatus including the same, and a vehicle including the vibration apparatus.

Discussion of the Related Art

In display apparatuses, a display panel displays an image, and a separate speaker should be installed for providing a sound. When a speaker is in a display apparatus, the speaker occupies a space; due to this, the design and spatial disposition of the display apparatus are limited.

However, because a sound output from a speaker may travel to a rearward or a downward direction of the display apparatus, sound quality may be degraded due to interference between sounds reflected from a wall and the ground. For this reason, it may be difficult to transfer an accurate sound, and the immersion experience of a viewer is reduced.

SUMMARY

The inventors have performed various experiments on a vibration apparatus and an apparatus including the same, which may output an accurate sound or a directivity-based sound toward a user (or a viewer). Through the various experiments, the inventors have invented a vibration apparatus, an apparatus including the same, and a vehicle including the apparatus, which may output a sound or a directivity-based sound toward a user.

Accordingly, embodiments of the present disclosure are directed to a vibration apparatus, an apparatus including the same, and a vehicle including the vibration apparatus that substantially obviates one or more of the problems due to limitations and disadvantages of the related art.

An aspect of the present disclosure is to provide a vibration apparatus, an apparatus including the same, and a vehicle including the apparatus, which may output a directivity-based sound.

Another aspect of the present disclosure is to provide a vibration apparatus, an apparatus including the same, and a vehicle including the apparatus, which may output a directivity-based sound and may enhance a low-pitched sound band characteristic of a sound.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a vibration apparatus comprises a lower vibration structure, an upper vibration structure on the lower vibration structure, and an adhesive member between the lower vibration structure and the upper vibration structure, wherein the lower vibration structure and the upper vibration structure are configured to generate sound waves having different frequencies.

In another aspect, an apparatus comprises a vibration member, a vibration generating apparatus in the vibration member, and a connection member between the vibration member and the vibration generating apparatus, wherein the vibration generating apparatus comprises the vibration apparatus, the vibration apparatus comprises a lower vibration structure, an upper vibration structure on the lower vibration structure, and an adhesive member between the lower vibration structure and the upper vibration structure, wherein the lower vibration structure and the upper vibration structure are configured to generate sound waves having different frequencies.

In another aspect, a vehicle comprises vehicle interior material covering a vehicle structure, and sound generating apparatus disposed at the vehicle interior material, the sound generating apparatus includes a vibration apparatus, and the vehicle interior material vibrates according to a vibration of the sound generating apparatus to output a sound, the vibration apparatus comprises a lower vibration structure, an upper vibration structure on the lower vibration structure, and an adhesive member between the lower vibration structure and the upper vibration structure, wherein the lower vibration structure and the upper vibration structure are configured to generate sound waves having different frequencies.

Each of the vibration apparatus, the apparatus including the same, and the vehicle including the apparatus according to the embodiments of the present disclosure may output a directivity-based sound.

Each of the vibration apparatus, the apparatus including the same, and the vehicle including the apparatus according to the embodiments of the present disclosure may output a directivity-based sound and may enhance a sound characteristic including a low-pitched sound band characteristic of a sound.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

Figure 1:
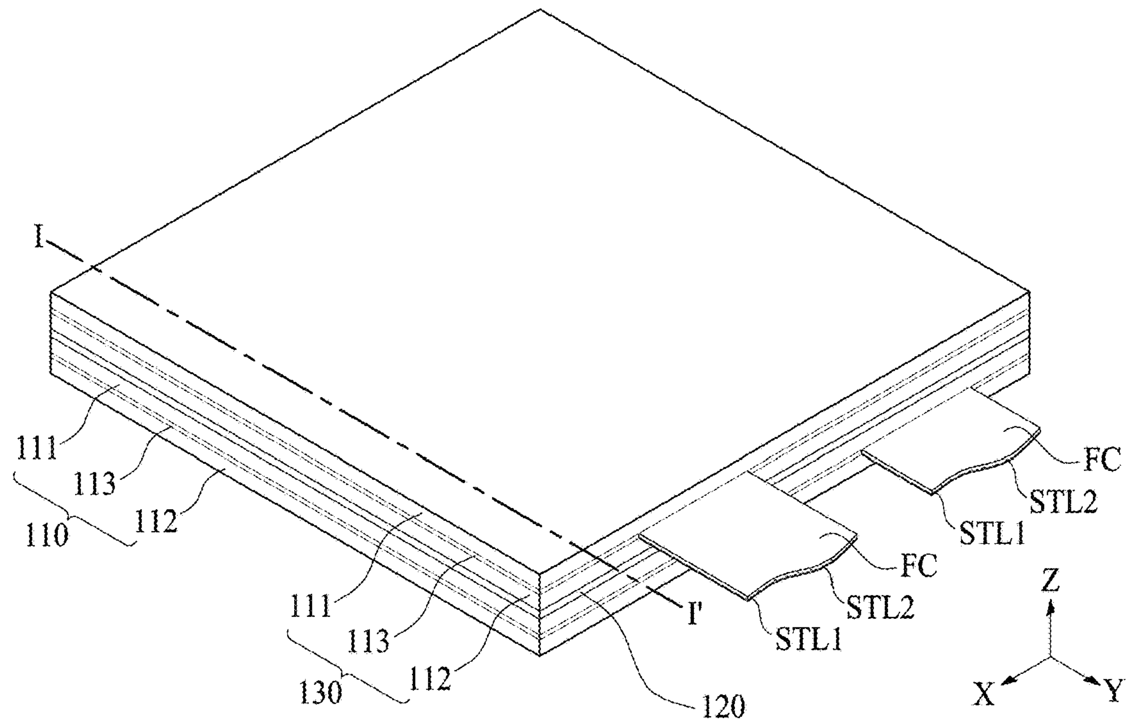
FIG. 1 illustrates a vibration apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When “comprise,” “have,” and “include” described in the present specification are used, another part may be added unless “only” is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, “on,” “over,” “under,” and “next,” one or more other parts may be disposed between the two parts unless a more limiting term, such as “just” or “direct(ly)” is used.

In describing a time relationship, for example, when the temporal order is described as, for example, “after,” “subsequent,” “next,” and “before,” a case that is not continuous may be included unless a more limiting term, such as “just,” “immediate(ly),” or “direct(ly)” is used.

It will be understood that, although the terms “first,” “second,” etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms “first,” “second,” “A,” “B,” “(a),” “(b),” etc. may be used. These terms are intended to identify the corresponding elements from the other elements, and basis, order, or number of the corresponding elements should not be limited by these terms. The expression that an element is “connected,” “coupled,” or “adhered” to another element or layer the element or layer can not only be directly connected or adhered to another element or layer, but also be indirectly connected or adhered to another element or layer with one or more intervening elements or layers “disposed,” or “interposed” between the elements or layers, unless otherwise specified.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as the first item, the second item, or the third item.

In the present disclosure, an apparatus may include a display apparatus such as an organic light emitting display (OLED) module or a liquid crystal module (LCM) including a display panel and a driver for driving the display panel. Also, the apparatus may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the apparatus may include a display apparatus itself, such as an LCM or an OLED module, and a set device which is a final consumer device or an application product including the LCM or the OLED module.

In some embodiments, an LCM or an OLED module including a display panel and a driver may be referred to as a display apparatus, and an electronic device which is a final product including an LCM or an OLED module may be referred to as a set device. For example, the display apparatus may include a display panel, such as an LCD or an OLED, and a source printed circuit board (PCB) which is a controller for driving the display panel. The set device may further include a set PCB which is a set controller electrically connected to the source PCB to overall control the set device.

A display panel applied to an embodiment of the present disclosure may use all types of display panels such as a liquid crystal display panel, an organic light emitting diode (OLED) display panel, and an electroluminescent display panel, but embodiments of the present disclosure are not limited thereto. For example, the display panel may be a display panel capable of generating a sound by being vibrated by a vibration apparatus according to an embodiment of the present disclosure. A display panel applied to a display apparatus according to an embodiment of the present disclosure is not limited a shape or a size of the display panel.

For example, when the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix or the like, and a liquid crystal layer between the array substrate and the upper substrate.

When the display panel is the organic light emitting display panel (OLED), the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed at the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer, for example, a nano-sized material layer, a quantum dot, a light emitting layer, or the like. As another example, the layer provided on the array substrate may include a micro light emitting diode.

The display panel may further include a backing such as a metal plate attached on the display panel. However, embodiments of the present disclosure are not limited to the metal plate, and the display panel may include another structure.

In the present disclosure, the apparatus including a vibration apparatus may be applied to vehicles as a user interface device such as a central control panel for automobiles. For example, the apparatus may be provided between occupants sitting on two front seats in order for a vibration of the display panel to be transferred to the inside of a vehicle. Therefore, an audio experience in a vehicle is improved in comparison with a case where speakers are disposed at interior sides of the vehicle.

The vibration apparatus and an apparatus comprising the same according to an embodiment of the present disclosure may vibrate a vibration object (or a vibration member) to generate or output a sound according to the vibration of the vibration object. For example, the vibration object (or the vibration structure) may be a display panel including pixels displaying an image, a screen panel on which an image is projected from a display apparatus, a lighting panel, a vibration plate, wood, plastic, glass, cloth, paper, a vehicle interior material, a vehicle glass window, a building indoor ceiling, a building glass window, a building interior material, an aircraft interior material, and an aircraft glass window, or the like, but embodiments of the present disclosure are not limited thereto. For example, the lighting panel may be a light emitting diode lighting panel (or apparatus), an organic light emitting lighting panel (or apparatus), or an inorganic light emitting lighting panel (or apparatus), or the like, but embodiments of the present disclosure are not limited thereto. For example, the vibration plate may include a metal material, or may include single nonmetal materials or composite nonmetal materials of one or more of wood, plastic, glass, cloth, paper, and leather, but embodiments of the present disclosure are not limited thereto.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

FIG. 1 illustrates a vibration apparatus according to an embodiment of the present disclosure.

With reference to FIG. 1, the vibration apparatus according to an embodiment of the present disclosure may include a first vibration structure 110 and a second vibration structure 130 stacked on the first vibration structure 110.

The first vibration structure 110 may be a lower vibration structure, a lower vibration generator, a lower vibration module, a lower actuator, a lower exciter, a lower vibration film, a low film actuator, a low film exciter, a lower sound generator, a first vibration generator, a first vibration module, a first actuator, a first exciter, a first vibration film, a first film actuator, a first film exciter, or a first sound generator, but embodiments of the present disclosure are not limited thereto.

The first vibration structure 110 may include a piezoelectric material having a piezoelectric characteristic. The first vibration structure 110 may be displaced or vibrated as the piezoelectric material alternately repeats contraction and expansion by a piezoelectric effect of the piezoelectric material based on a first vibration driving signal (or a first sound signal). For example, the first vibration structure 110 may output or generate a first sound wave based on a displacement or a vibration of the piezoelectric material. For example, a vibration of the first vibration structure 110 may be used as a vibration for a haptic feedback responding to a user touch.

The second vibration structure 130 may be an upper vibration structure, an upper vibration generator, an upper vibration module, an upper actuator, an upper exciter, an upper vibration film, an upper film actuator, an upper film exciter, an upper sound generator, a second vibration generator, a second vibration module, a second actuator, a second exciter, a second vibration film, a second film actuator, a second film exciter, or a second sound generator, but embodiments of the present disclosure are not limited thereto.

The second vibration structure 130 may include a piezoelectric material having a piezoelectric characteristic. The second vibration structure 130 may be displaced or vibrated as the piezoelectric material alternately repeats contraction and expansion by a piezoelectric effect of the piezoelectric material based on a second vibration driving signal (or a second sound signal). For example, the second vibration structure 130 may output or generate a second sound wave based on a displacement or a vibration of the piezoelectric material. For example, a vibration of the second vibration structure 130 may be used as a vibration for a haptic feedback responding to a user touch.

The second vibration structure 130 may be stacked on a front surface (or an upper surface) of the first vibration structure 110. For example, the second vibration structure 130 may be coupled or connected to the front surface of the first vibration structure 110 by an adhesive member 120. Therefore, the first vibration structure 110 and the second vibration structure 130 may overlap or may be stacked on each other.

The first vibration structure 110 and the second vibration structure 130 may overlap or may be stacked to be displaced (or driven or vibrated) in the same direction. For example, the first vibration structure 110 and the second vibration structure 130 may contract or expand in the same driving direction (or displacement direction or vibration direction) based on a vibration driving signal in a state where the first vibration structure 110 and the second vibration structure 130 overlap or are stacked on each other, and thus, a displacement amount (or a bending force or flexural force) or an amplitude displacement may increase or may be maximized. Accordingly, a sound pressure level characteristic of a sound and a sound characteristic of a middle-low-pitched sound band generated based on a displacement of each of the first vibration structure 110 and the second vibration structure 130 may be enhanced. For example, the middle-low-pitched sound band may be 200 Hz to 1 kHz, but embodiments of the present disclosure are not limited thereto.

The adhesive member 120 according to an embodiment of the present disclosure may be disposed or interposed between the first vibration structure 110 and the second vibration structure 130. The adhesive member 120 may be a connection member, a coupling member, or an integration member, but embodiments of the present disclosure are not limited thereto.

According to an embodiment of the present disclosure, the adhesive member 120 may include a material including an adhesive which is good in adhesive adherence force or attaching force with respect to each of the first vibration structure 110 and the second vibration structure 130. For example, the adhesive member 120 may include an ultraviolet (UV)-curable adhesive or a thermos-curable adhesive. For example, an adhesive of the adhesive member 120 may have shore hardness (Shore D) or a young's modulus of $10^7$ Pa or more so that vibration loss (or vibration attenuation) caused by displacement interference between the first vibration structure 110 and the second vibration structure 130 is minimized. For example, the adhesive of the adhesive member 120 may have shore hardness (Shore D) of 50 or more.

The first vibration structure 110 and the second vibration structure 130 according to an embodiment of the present disclosure may be integrated into one structure (or part) through a laminating process using the adhesive member 120. For example, the first vibration structure 110 and the second vibration structure 130 may be integrated into one structure by a laminating process using a roller.

The first vibration structure 110 and the second vibration structure 130 may output sound waves having different frequencies, and thus, the vibration apparatus may output or implement a directional-based sound.

According to an embodiment of the present disclosure, any one of the first vibration structure 110 and the second vibration structure 130 which overlap or are stacked on each other may output a first sound wave, and the other of the first vibration structure 110 and the second vibration structure 130 which overlap or are stacked on each other may output a second wave which differs from the first sound wave. For example, the first vibration structure 110 may output the first sound wave, and the second vibration structure 110 may output the second sound wave.

Each of the first sound wave and the second sound wave may be any one or more of an audible frequency, an ultrasonic wave of an inaudible frequency band without audible frequency, and an ultrasonic wave of an inaudible frequency band including an audible frequency. For example, an ultrasonic wave (or a mixed sound wave) including an audible frequency may be an ultrasonic or mixed frequency which an audible frequency is mixed with. An ultrasonic wave of an inaudible frequency band may be a carrier wave or a carrier frequency.

According to an embodiment of the present disclosure, the first wave may be an ultrasonic wave of an inaudible frequency band without audible frequency, and the second sound wave may be an ultrasonic wave of an audible frequency band. However, embodiments of the present disclosure are not limited thereto. For example, the first wave may allow the second wave to concentrate or focus in a specific direction to assign a directivity to the second sound wave or to limit a directional angle of a second sound, and thus, may implement a user's privacy protection function of allowing a sound not to be listened in a periphery region (or an inaudible region) other than a region (or an audible region) in a specific direction. Accordingly, the vibration apparatus may output a sound having a directivity or a directional angle based on the first wave and the second wave.

As another embodiment of the present disclosure, the first wave may be an ultrasonic wave of an inaudible frequency band without audible frequency, and the second sound wave may be an ultrasonic wave which an audible frequency is mixed. However, embodiments of the present disclosure are not limited thereto. For example, an ultrasonic wave including an audible frequency may be a mixed frequency (or a mixed sound wave), and an ultrasonic wave of an inaudible frequency band may be a carrier wave or a carrier frequency. For example, when the first sound wave is an ultrasonic wave and the second sound wave is a mixed frequency, a beating phenomenon where an envelope of an audible frequency corresponding to a difference between the first sound wave and the second sound wave may occur in an overlap region between the first sound wave and the second sound wave having different frequencies (or a resonance frequency), and based on the beating phenomenon, an overlap region between the first sound wave and the second sound wave may be an audible region which enables a user to listen to a sound and a non-overlap region between the first sound wave and the second sound wave may be an inaudible region which disables a user to listen to a sound. Accordingly, the vibration apparatus may output a sound having a directivity or a directional angle based on the first wave and the second wave.

According to an embodiment of the present disclosure, at least one or more of the first vibration structure 110 and the second vibration structure 130 may simultaneously output the first sound wave and the second sound wave. For example, at least one or more of the first vibration structure 110 and the second vibration structure 130 may include a first vibration region (or a first sound wave generating region) which generates the first sound wave and a second vibration region (or a second sound wave generating region) which generates the second sound wave. The second vibration region may have a size of 6 cm or less so as to generate a resonance frequency of 30 kHz or more, but embodiments of the present disclosure are not limited thereto. In at least one or more of the first vibration structure 110 and the second vibration structure 130, the second vibration region may not be fixed and may vary based on a sound wave output direction.

Figure 2:
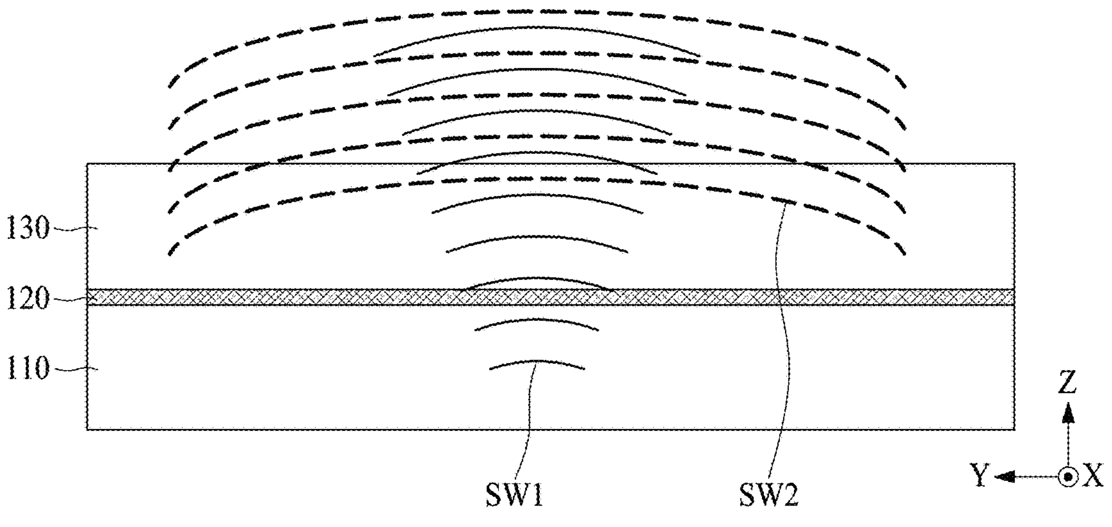
FIG. 2 illustrates a sound output of the vibration apparatus illustrated in FIG. 1.

In the vibration apparatus according to an embodiment of the present disclosure, as illustrated in FIG. 2, the first vibration structure 110 and the second vibration structure 130 may overlap or may be stacked on each other, and based on a first sound wave SW1 generated from the first vibration structure 110 and a second sound wave SW2 generated from the second vibration structure 130, a sound having an enhanced sound pressure level characteristic of a middle-low-pitched sound band may be output or a sound having a directivity or a directional angle may be output. Also, the vibration apparatus according to an embodiment of the present disclosure may vary a position or a size of an overlap region between the first sound wave SW1 generated from the first vibration structure 110 and the second sound wave SW2 generated from the second vibration structure 130, and thus, may vary a directivity direction of a sound and/or a directional angle of a sound and may output a sound having a minimal directional angle (or a directivity).

Figure 3:
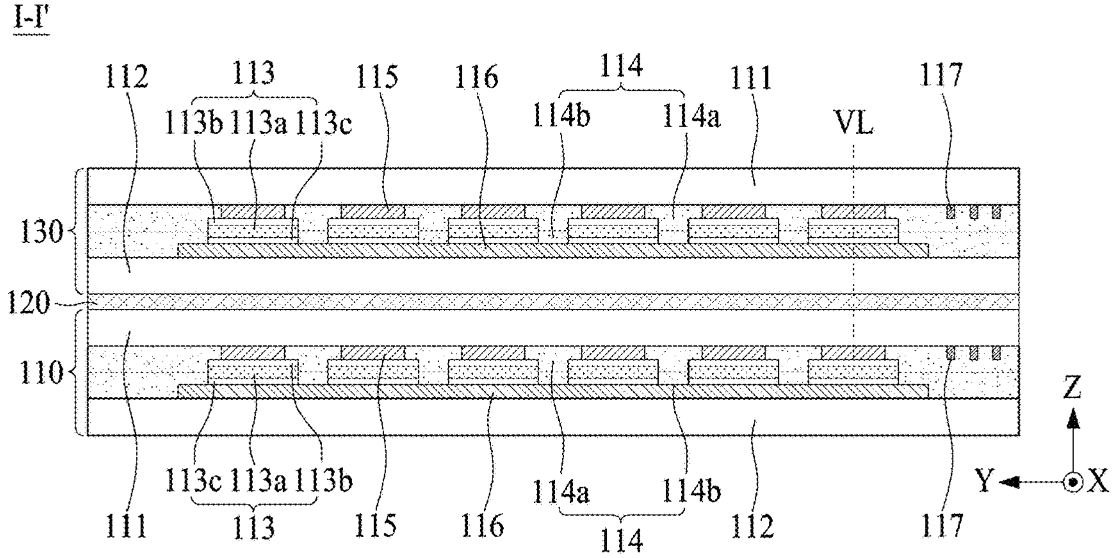
FIG. 3 is a cross-sectional view taken along line I-I' illustrated in FIG. 1.
Figure 4:
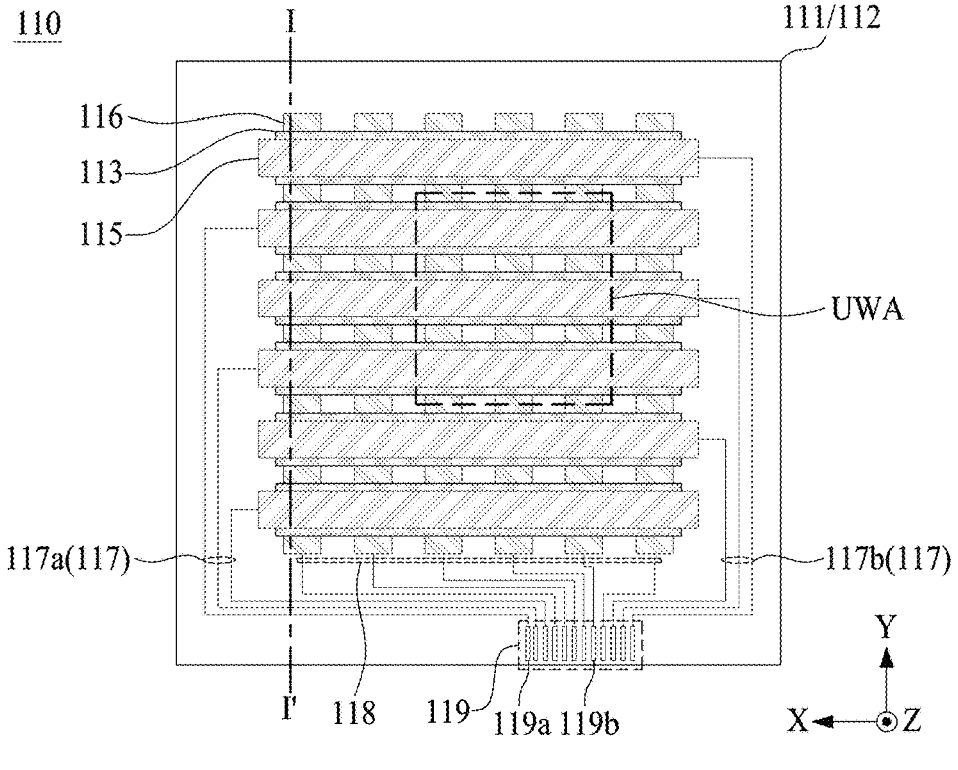
FIG. 4 is a plan view illustrating a first vibration structure according to an embodiment of the present disclosure illustrated in FIG. 3.
Figure 5:
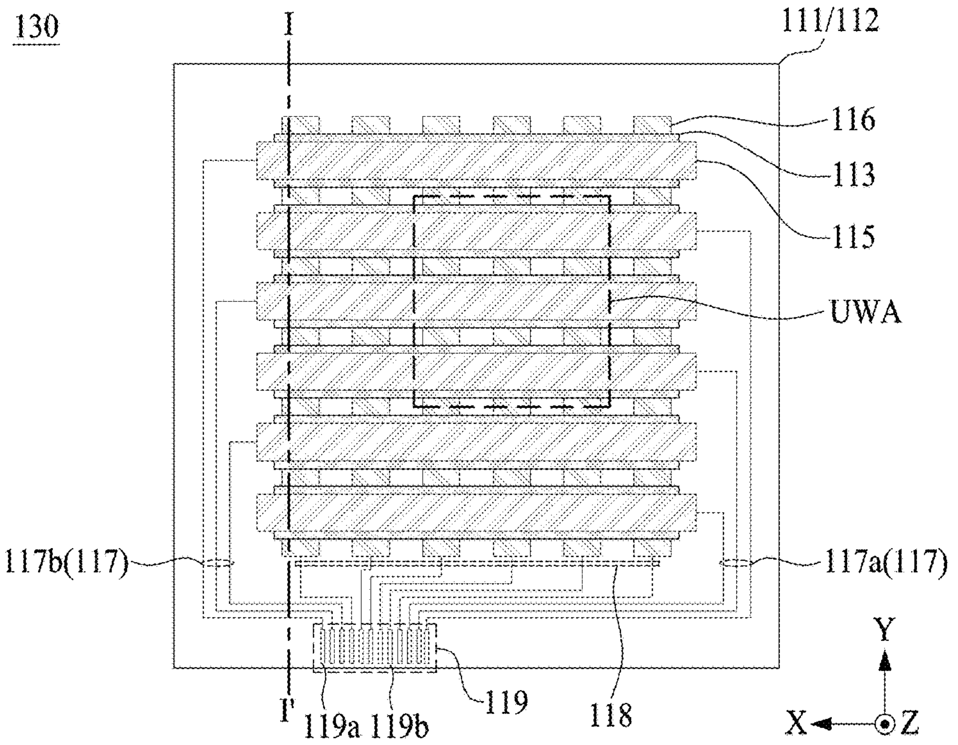
FIG. 5 is a plan view illustrating a second vibration structure according to an embodiment of the present disclosure illustrated in FIG. 3.

FIG. 3 is a cross-sectional view taken along line I-I' illustrated in FIG. 1, and FIG. 4 is a plan view illustrating a first vibration structure according to an embodiment of the present disclosure illustrated in FIG. 3. A cross-sectional view of the first vibration structure taken along line I-I' illustrated in FIG. 5 is illustrated in FIG. 3.

With reference to FIGS. 1, 3, and 4, the first vibration structure 110 according to an embodiment of the present disclosure may include a first base member 111, a second base member 112, and a plurality of vibration generating parts 113.

The first base member 111 and the second base member 112 may be disposed to overlap each other. For example, the first base member 111 may be disposed or aligned on the second base member 112.

Each of the first base member 111 and the second base member 112 according to an embodiment of the present disclosure may be formed of a plastic material, a fiber material, or a wood material, but embodiments of the present disclosure are not limited thereto. For example, the first base member 111 and the second base member 112 may be formed of the same or different material of the plastic material, the fiber material, and the wood material. For example, each of the first base member 111 and the second base member 112 may be a polyimide (PI) film or a polyethyleneterephthalate (PET) film, but embodiments of the present disclosure are not limited thereto. The first base member 111 may be a first protection member. The second base member 112 may be a second protection member.

Each of a plurality of vibration generating parts (or first vibration generating parts) 113 may be disposed or interposed between the first base member 111 and the second base member 112. For example, each of the plurality of vibration generating parts 113 may be implemented in a line shape which extends long in a first direction X. For example, the plurality of second vibration generating parts 113 may be spaced apart from one another in a second direction Y crossing the first direction X. For example, the first direction X may be a widthwise direction of the vibration apparatus, the second direction Y may be a lengthwise direction of the vibration apparatus crossing the first direction X, but embodiments of the present disclosure are not limited thereto. For example, the first direction X may be the lengthwise direction of the vibration apparatus, and the second direction Y may be the widthwise direction of the vibration apparatus.

Each of a plurality of vibration generating parts 113 may include a piezoelectric material (or a piezoelectric element) having a piezoelectric characteristic (or a piezoelectric effect). For example, the piezoelectric material may have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto.

Each of a plurality of vibration generating parts 113 according to an embodiment of the present disclosure may include a vibration portion 113*a* including a piezoelectric material, a first electrode layer 113*b* disposed at a first surface of the vibration portion 113*a*, and a second electrode layer 113*c* disposed at a second surface, which is opposite to or different from the first surface, of the vibration portion 113*a*.

The vibration portion (or a first vibration portion) 113*a* may be referred to as a vibration layer, a piezoelectric layer, a piezoelectric material layer, an electroactive layer, a piezoelectric vibration portion, a piezoelectric material portion, an electroactive portion, an inorganic material layer, or an inorganic material portion, or the like, but embodiments of the present disclosure are not limited thereto.

The vibration portion 113*a* may be configured as a ceramic-based material for generating a relatively high vibration, or may be configured as a piezoelectric ceramic having a perovskite-based crystalline structure. The perovskite crystalline structure may have a piezoelectric effect and an inverse piezoelectric effect and may be a plate-shaped structure having orientation. The perovskite crystalline structure may be represented by a chemical formula "$ABO_3$". In the chemical formula, "A" may include a divalent metal element, and "B" may include a tetravalent metal element. As an embodiment of the present disclosure, in the chemical formula "$ABO_3$", "A", and "B" may be cations, and "O" may be anions. For example, the perovskite crystalline structure may include at least one or more of $PbTiO_3$, $PbZrO_3$, $PbZrTiO_3$, $BaTiO_3$, and $SrTiO_3$, but embodiments of the present disclosure are not limited thereto.

The vibration portion 113*a* according to an embodiment of the present disclosure may include one or more of lead (Pb), zirconium (Zr), titanium (Ti), zinc (Zn), nickel (Ni), and niobium (Nb), but embodiments of the present disclosure are not limited thereto.

The vibration portion 113*a* according to another embodiment of the present disclosure may include a lead zirconate titanate (PZT)-based material including lead (Pb), zirconium (Zr), and titanium (Ti) or may include a lead zirconate nickel niobate (PZNN)-based material including lead (Pb), zirconium (Zr), nickel (Ni), and niobium (Nb), but embodiments of the present disclosure are not limited thereto. Also, the vibration portion 113*a* may include at least one or more of $CaTiO_3$, $BaTiO_3$, and $SrTiO_3$ without Pb, but embodiments of the present disclosure are not limited thereto.

The vibration portion 113*a* according to another embodiment of the present disclosure may have a piezoelectric deformation coefficient "$d_{33}$" of 1,000 pC/N or more in a thickness direction Z. By having a high piezoelectric deformation coefficient "$d_{33}$", it is possible to provide the vibrating apparatus that may be applied to a vibration object (or a vibration member) having a large size or may have a sufficient vibration characteristic or piezoelectric characteristic. For example, the vibration portion 113*a* may include a PZT-based material ($PbZrTiO_3$) as a main component and may include a softener dopant material doped into "A" site (Pb) and a relaxor ferroelectric material doped into "B" site (ZrTi).

The softener dopant material may enhance a piezoelectric characteristic and a dielectric characteristic of the vibration portion 113*a*, and for example, may increase the piezoelectric deformation coefficient "$d_{33}$" of the vibration portion 113*a*. When the softener dopant material includes a monovalent element "+1", the inventors have confirmed that a piezoelectric characteristic and a dielectric characteristic are reduced. For example, when the softener dopant material includes kalium (K) and rubidium (Rb), a piezoelectric characteristic and a dielectric characteristic may be reduced. Therefore, by performing various experiments, the inventors have recognized that the softener dopant material should include a dyad element "+2" to a triad element "+3", for enhancing a piezoelectric characteristic and a dielectric characteristic. The softener dopant material according to an embodiment of the present disclosure may include a dyad element "+2" to a triad element "+3". Morphotropic phase boundary (MPB) may be implemented by adding the softener dopant material to the PZT-based material ($PbZrTiO_3$), and thus, a piezoelectric characteristic and a dielectric characteristic may be enhanced. For example, the softener dopant material may include strontium (Sr), barium (Ba), lanthanum (La), neodymium (Nd), calcium (Ca), yttrium (Y), erbium (Er), or ytterbium (Yb). For example, ions ($Sr^{2+}$, $Ba^{2+}$, $La^{2+}$, $Nd^{3+}$, $Ca^{2+}$, $Y^{3+}$, $Er^{3+}$, $Yb^{3+}$) of the softener dopant material doped into the PZT-based material ($PbZrTiO_3$) may substitute a portion of lead (Pb) in the PZT-based material ($PbZrTiO_3$), and a substitution rate thereof may be about 2 mol % to about 20 mol %. For example, when the substitution rate is less than 2 mol % or greater than 20 mol %, a perovskite crystal structure may be broken, and thus, an electromechanical coupling coefficient "kP" and the piezoelectric deformation coefficient "$d_{33}$" may decrease. When the softener dopant material is substituted, the MPB may be formed, and a piezoelectric characteristic and a dielectric characteristic may be high in the MPB, thereby implementing a vibration apparatus having a high piezoelectric characteristic and a high dielectric characteristic.

According to an embodiment of the present disclosure, the relaxor ferroelectric material doped into the PZT-based material ($PbZrTiO_3$) may enhance an electric deformation characteristic of the vibration portion 113*a*. The relaxor ferroelectric material according to an embodiment of the present disclosure may include a lead magnesium niobate (PMN)-based material or a lead nickel niobate (PNN)-based material, but embodiments of the present disclosure are not limited thereto. The PMN-based material may include Pb, Mg, and Nb, and for example, may include $Pb(Ni, Nb)O_3$. For example, the relaxor ferroelectric material doped into the PZT-based material ($PbZrTiO_3$) may substitute a portion of each of zirconium (Zr) and titanium (Ti) in the PZT-based material ($PbZrTiO_3$), and a substitution rate thereof may be about 5 mol % to about 25 mol %. For example, when the substitution rate is less than 5 mol % or greater than 25 mol %, a perovskite crystal structure may be broken, and thus, the electromechanical coupling coefficient "kP" and the piezoelectric deformation coefficient "$d_{33}$" may decrease.

According to an embodiment of the present disclosure, the vibration portion 113*a* may further include a donor material doped into "B" site (ZrTi) of the PZT-based material ($PbZrTiO_3$), in order to more enhance a piezoelectric coefficient. For example, the donor material doped into the "B" site (ZrTi) may include a tetrad element "+4" or a hexad element "+6". For example, the donor material doped into the "B" site (ZrTi) may include tellurium (Te), germanium (Ge), uranium (U), bismuth (Bi), niobium (Nb), tantalum (Ta), antimony (Sb), or tungsten (W).

The vibration portion 113*a* according to an embodiment of the present disclosure may be expressed as the following Formula 1.

$$(Pb_{A-B}C_B)((Mg_{1/3}Nb_{2/3})_a(Ni_{1/3}Nb_{2/3})_bZr_cTi_d)O_3 \qquad \text{[Formula 1]}$$

Here, C may be one of Ca, Sr, and Ba. Also, a+b+c+d=1, $0.02 \le B \le 0.20$, $0.80 \le A-B \le 0.98$, $0.05 \le a \le 0.25$, $0.05 \le b \le 0.25$, $0.10 \le c \le 0.50$, and $0.10 \le d \le 0.50$.

The vibration portion 113*a* according to an embodiment of the present disclosure may have a piezoelectric deformation coefficient "$d_{33}$" of 1,000 pC/N or more in a thickness direction Z, thereby implementing a vibration apparatus having an enhanced vibration characteristic. For example, a vibration apparatus having an enhanced vibration characteristic may be implemented in a large-area apparatus (or a vibration object or a vibration member).

The first electrode layer 113*b* may be disposed at a first surface (or an upper surface) of the vibration portion 113*a*. For example, the first electrode layer 113*b* may be directly and electrically connected to the first surface of the vibration portion 113*a*. For example, the first electrode layer 113*b* may be disposed between the vibration portion 113*a* and the first base member 111. For example, the first electrode layer 113*b* may have a single-body electrode type which is disposed at a whole first surface of the vibration portion 113*a*. For example, the first electrode layer 113*b* may have the same shape as the vibration portion 113*a*, but embodiments of the present disclosure are not limited thereto.

The first electrode layer 113*b* according to an embodiment of the present disclosure may be formed of a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), Mg, or the like, or an alloy thereof, but embodiments of the present disclosure are not limited thereto.

The second electrode layer 113*c* may be disposed at a second surface (or a rear surface) of the vibration portion 113*a* and may overlap the first electrode layer 113*b*. For example, the second electrode layer 113*c* may be directly and electrically connected to the second surface of the vibration portion 113*a*. For example, the second electrode layer 113*c* may be disposed between the vibration portion 113*a* and the second base member 113. For example, the second electrode layer 113*c* may have a single-body electrode type which is disposed at a whole second surface of the vibration portion 113*a*. For example, the second electrode layer 113*c* may have the same shape as the vibration portion 113*a*, but embodiments of the present disclosure are not limited thereto.

The second electrode layer 113*c* according to an embodiment of the present disclosure may be formed of a transparent conductive material, a semitransparent conductive material, or an opaque conductive material. For example, the second electrode layer 113*c* may be formed of the same material as the first electrode layer 113*b*, but embodiments of the present disclosure are not limited thereto. As another embodiment of the present disclosure, the second electrode layer 113*c* may be formed of a different material than the first electrode layer 113*b*.

The first vibration structure 110 according to an embodiment of the present disclosure may further include an adhesive layer 114 which is disposed between the first base member 111 and the second base member 112 to surround side surfaces (or sidewalls) of each of the plurality of vibration generating parts 113.

The adhesive layer 114 may be attached the first base member 111 to the second base member 112 with each of the plurality of vibration generating part 113 therebetween. The adhesive layer 114 may be disposed in a region, other than each of the plurality of vibration generating part 113, of a region between the first base member 111 and the second base member 112.

The adhesive layer 114 according to an embodiment of the present disclosure may include a first adhesive layer 114*a* disposed at a second surface (or a rear surface) of the first base member 111 and a second adhesive layer 114*b* disposed at a first surface (or an upper surface) of the second base member 112. The first adhesive layer 114*a* and the second adhesive layer 114*b* may be coupled or bonded to each other between the first base member 111 and the second base member 112 and may be implemented as one adhesive layer. The first adhesive layer 114*a* or the second adhesive layer 114*b* may be omitted.

Each of the first and second adhesive layers 114*a* and 114*b* may include an electric insulating material. For example, the electric insulating material may have adhesiveness and may include a material capable of compression and decompression. For example, one or more of the first and second adhesive layers 114*a* and 114*b* may include an epoxy resin, an acrylic resin, a silicone resin, or a urethane resin, but embodiments of the present disclosure are not limited thereto.

The first based member 111 may be coupled or connected to the first surface (or the first electrode layer 113*b*) of each of the plurality of vibration generating parts 113 by a laminating process using the first adhesive layer 114*a*. The second based member 112 may be coupled or connected to the second surface (or the second electrode layer 113*c*) of each of the plurality of vibration generating parts 113 by a laminating process using the second adhesive layer 114*b*.

The first vibration structure 110 according to an embodiment of the present disclosure may further include a plurality of first power supply electrodes 115 and a plurality of second power supply electrodes 116.

Each of the plurality of first power supply electrodes 115 may be disposed between each of the plurality of vibration generating parts 113 and the first base member 111 and may be individually (or in a one-to-one relationship) connected to each of the plurality of vibration generating parts 113. Each of the plurality of first power supply electrodes 115 may be disposed in parallel at a second surface (or a rear surface) of the first base member 111 to overlap each of the plurality of vibration generating parts 113. For example, each of the plurality of first power supply electrodes 115 may be directly formed at the second surface (or the rear surface) of the first base member 111. Each of the plurality of first power supply electrodes 115 may be implemented in a line shape which extends long in a first direction X. For example, the plurality of first power supply electrodes 115 may be spaced apart from one another in a second direction Y. The number of first power supply electrodes 115 may be the same as the number of vibration generating parts 113.

Each of the plurality of first power supply electrodes 115 according to an embodiment of the present disclosure may be electrically connected to the first electrode layer 113*b* of each of the plurality of vibration generating parts 113 by an anisotropic conductive film in a one-to-one relationship. Each of the plurality of first power supply electrodes 115 according to another embodiment of the present disclosure may be electrically connected to the first electrode layer 113*b* of each of the plurality of vibration generating parts 113 in a one-to-one relationship by a conductive material (or particle) included in the adhesive layer 114 or the first adhesive layer 114*a*, instead of the anisotropic conductive film.

Each of the plurality of second power supply electrodes 116 may be disposed between each of the plurality of vibration generating parts 113 and the second base member 112 and may be electrically connected to each of the plurality of vibration generating parts 113 in a one-to-one relationship. Each of the plurality of second power supply electrodes 116 may be disposed in parallel at a first surface (or an upper surface) of the second base member 112 to cross each of the plurality of vibration generating parts 113. For example, each of the plurality of second power supply electrodes 116 may be directly formed at the first surface (or the upper surface) of the second base member 112. Each of the plurality of second power supply electrodes 116 may be implemented in a line shape which extends long in the second direction Y to cross each of the plurality of first power supply electrodes 114. For example, the plurality of second power supply electrodes 116 may be spaced apart from one another in the first direction X. For example, the number of second power supply electrodes 116 may be the same as the number of vibration generating parts 113 and may be the same as the number of first power supply electrodes 115.

Each of the plurality of second power supply electrodes 116 according to an embodiment of the present disclosure may be electrically connected to the second electrode layer 113*c* of each of the plurality of vibration generating parts 113 by an anisotropic conductive film in a one-to-one relationship. Each of the plurality of second power supply electrodes 116 according to another embodiment of the present disclosure may be electrically connected to the second electrode layer 113*c* of each of the plurality of vibration generating parts 113 in a one-to-one relationship by a conductive material (or particle) included in the adhesive layer 114 or the second adhesive layer 114*b*, instead of the anisotropic conductive film.

The first vibration structure 110 according to an embodiment of the present disclosure may include a plurality of first power supply lines 117, a plurality of second power supply lines 118, and a pad part 119.

Each of the plurality of first power supply lines 117 may be electrically connected to each of the plurality of first power supply electrodes 115 in a one-to-one relationship. Each of the plurality of first power supply lines 117 may be directly formed at the second surface (or the rear surface) of the first base member 111 along with each of the plurality of first power supply electrodes 115. For example, each of the plurality of first power supply lines 117 may be disposed at first to third periphery portions of a second surface periphery portion of the first base member 111 and may be electrically connected to each of the plurality of first power supply electrodes 115 in a one-to-one relationship. For example, the number of first power supply lines 117 may be the same as the number of first power supply electrodes 115.

According to an embodiment of the present disclosure, odd-numbered power supply lines 117*a* of the plurality of first power supply lines 117 may be disposed in parallel at the first and third periphery portions of the second surface periphery portion of the first base member 111 and may be electrically connected to first sides (or one end) of odd-numbered power supply electrodes of the plurality of first power supply electrodes 115. Even-numbered power supply lines 117*b* of the plurality of first power supply lines 117 may be disposed in parallel at the first and second periphery portions of the second surface periphery portion of the first base member 111 and may be electrically connected to second sides (or the other end), which is opposite to the first sides (or the one end), of even-numbered power supply electrodes of the plurality of first power supply electrodes 115.

Each of the plurality of second power supply lines 118 may be electrically connected to each of the plurality of second power supply electrodes 116 in a one-to-one relationship. Each of the plurality of second power supply lines 118 may be directly formed at the first surface (or the upper surface) of the second base member 112 along with each of the plurality of second power supply electrodes 116. For example, each of the plurality of second power supply lines 118 may be disposed at a first periphery portion of a first surface periphery portion of the second base member 112 and may be electrically connected to each of the plurality of second power supply electrodes 116 in a one-to-one relationship. For example, the number of second power supply lines 118 may be the same as the number of second power supply electrodes 116.

Each of the plurality of second power supply lines 118 may be disposed not to overlap each of the plurality of first power supply lines 117, and thus, may be electrically disconnected (or isolated) from the plurality of first power supply lines 117.

The pad part 119 (or a first pad part) may be disposed at a first periphery portion of a second surface periphery portion of the first base member 111 and a first periphery portion of a first surface periphery portion of the second base member 112. For example, the pad part 119 may be disposed between one side and a center portion of the first periphery portion of the second surface periphery portion of the first base member 111.

The pad part 119 according to an embodiment of the present disclosure may include a plurality of first pads 119*a* disposed in parallel at the first periphery portion of the second surface periphery portion of the first base member 111, and a plurality of second pads 119*b* disposed in parallel at the first periphery portion of the first surface periphery portion of the second base member 112.

Each of the plurality of first pads 119*a* may be electrically connected to an end of each of the plurality of first power supply lines 117. Accordingly, each of the plurality of first pads 119*a* may be electrically connected to each of the plurality of first power supply electrodes 115 through each of the plurality of first power supply lines 117 in a one-to-one relationship.

Each of the plurality of second pads 119*b* may be electrically connected to an end of each of the plurality of second power supply lines 118. Accordingly, each of the plurality of second pads 119*b* may be electrically connected to each of the plurality of second power supply electrodes 116 through each of the plurality of second power supply lines 118 in a one-to-one relationship.

The plurality of first pads 119*a* and the plurality of second pads 119*b* may be disposed in parallel at the first periphery portion of the second surface periphery portion of the first base member 111 so as to electrically disconnected (or isolated) from one another without being electrically connected to one another. For example, the first pads connected to odd-numbered power supply lines 117*a* among the plurality of first pads 119*a* may be disposed at a first side of the pad part 119. The second pads connected to even-numbered power supply lines 117*b* among the plurality of first pads 119*a* may be disposed at a second side of the pad part 119. The plurality of second pads 119*b* may be disposed between the first side and the second side of the pad part 119.

According to an embodiment of the preset disclosure, any one or more of the first base member 111 and the second base member 112 may further include a plurality of pad holes (or first pad holes) respectively overlapping the plurality of first pads 119*a* and the plurality of second pads 119*b*. For example, each of the plurality of pad holes may be formed to pass through the first base member 111 (or the second base member 112) overlapping at least a portion of each of the plurality of first pads 119*a* and the plurality of second pads 119*b*, and thus, at least a portion of each of the plurality of first pads 119*a* and the plurality of second pads 119*b* may be exposed at the outside of a first surface (or a second surface) of the first vibration structure 110.

The first vibration structure 110 according to an embodiment of the present disclosure may further include a flexible cable FC.

The flexible cable FC may be electrically connected to the pad part 119. Therefore, the flexible cable FC may transfer a first vibration driving signal supplied from a vibration driving circuit to a corresponding pad part 119. The flexible cable FC according to an embodiment of the present disclosure may include a plurality of first signal transfer lines STL1 electrically connected to each of the plurality of first pads 119*a* of the pad part 119, and a plurality of second signal transfer lines STL1 electrically connected to each of the plurality of second pads 119*b* of the pad part 119. For example, the flexible cable FC may be a flexible printed circuit cable or a flexible flat cable, but embodiments of the present disclosure are not limited thereto.

The first vibration driving signal may have an alternating current (AC) form which includes a first polarity signal and a second polarity signal. The first polarity signal may be one of a positive (+) signal and a negative (−) signal, and the second polarity signal may be one signal, other than the first polarity signal, of the positive (+) signal and the negative (−) signal. For example, the first polarity signal and the second polarity signal of the first vibration driving signal may be respectively supplied to the first electrode layer 113*b* and the second electrode layer 113*c* based on a dielectric polarization direction of the vibration portion 113*a* configured in the vibration generating part 113.

According to an embodiment of the present disclosure, the first polarity signal of the first vibration driving signal may be supplied to the first electrode layer 113*b* of each of the plurality of vibration generating parts 113 through the first signal transfer line STL1 of the flexible cable FC, the first pads 119*a* of the pad part 119, and the first power supply line 117. The second polarity signal of the first vibration driving signal may be supplied to the second electrode layer 113*c* of each of the plurality of vibration generating parts 113 through the second signal transfer line STL2 of the flexible cable FC, the second pads 119*b* of the pad part 119, and the second power supply line 118.

According to another embodiment of the present disclosure, the first polarity signal of the first vibration driving signal may be supplied to the second electrode layer 113*c* of each of the plurality of vibration generating parts 113 through the first signal transfer line STL1 of the flexible cable FC, the second pads 119*b* of the pad part 119, and the second power supply line 118. The second polarity signal of the first vibration driving signal may be supplied to the first electrode layer 113*b* of each of the plurality of vibration generating parts 113 through the second signal transfer line STL2 of the flexible cable FC, the first pads 119*a* of the pad part 119, and the first power supply line 117.

The flexible cable FC according to an embodiment of the present disclosure may further include a plurality of protrusion lines (or finger lines) which respectively protrude from ends of the plurality of first signal transfer lines STL1 and the plurality of second signal transfer lines STL2. Each of the plurality of protrusion lines may protrude (or extend) from the end of each of the plurality of first signal transfer lines STL1 and the plurality of second signal transfer lines STL2 to the pad part 119 may be disposed between the first base member 111 and the second base member 112 which overlap the pad part 119. According to an embodiment of the present disclosure, each of the plurality of protrusion lines may be electrically and directly connected to corresponding pads 119*a* and 119*b* of the pads of the pad part 119 by a bonding process (or a laminating process) between the first base member 111 and the second base member 112 by the adhesive layer 114. According to another embodiment of the present disclosure, each of the plurality of protrusion lines may be electrically and directly connected to the corresponding pads 119*a* and 119*b* of the pads of the pad part 119 by a conductive material (or particle) included in the adhesive layer 114 or an anisotropic conductive film.

The first vibration structure 110 according to an embodiment of the present disclosure may include a plurality of first power supply electrodes 115, intersecting with one another with each of the plurality of vibration generating parts 113 therebetween, and a plurality of vibration generating regions which are formed in intersection portions (or intersection regions) between the plurality of second power supply electrodes 116.

The first vibration structure 110 according to an embodiment of the present disclosure may generate a sound wave based on the repeated contraction and expansion of the vibration portion 113*a* corresponding to each of the plurality of vibration generating regions in response to the first polarity signal (or the second polarity signal) of the first vibration driving signal supplied to the first electrode layer 113*b* of each of the plurality of vibration generating parts 113 through the first power supply electrode 115 and the second polarity signal (or the first polarity signal) of the first vibration driving signal supplied to the second electrode layer 113*c* of each of the plurality of vibration generating parts 113 through the second power supply electrode 116.

According to an embodiment of the present disclosure, the first vibration structure 110 may generate a sound wave based on the repeated contraction and expansion of the vibration portion 113*a* corresponding to each of the plurality of vibration generating regions in response to the first polarity signal (or the second polarity signal) of the first vibration driving signal sequentially supplied to the first electrode layer 113*b* of each of the plurality of vibration generating parts 113 through the first power supply electrode 115 and the second polarity signal (or the first polarity signal) of the first vibration driving signal sequentially supplied to the second electrode layer 113*c* of each of the plurality of vibration generating parts 113 through the second power supply electrode 116, based on a passive matrix type.

According to another embodiment of the present disclosure, the first vibration structure 110 may generate a sound wave based on the repeated contraction and expansion of the vibration portion 113*a* corresponding to some of the plurality of vibration generating regions in response to the first polarity signal (or the second polarity signal) of the first vibration driving signal simultaneously supplied to the first electrode layers 113*b* of some of the plurality of vibration generating parts 113 through some of the plurality of first power supply electrodes 115 and the second polarity signal (or the first polarity signal) of the first vibration driving signal simultaneously supplied to the second electrode layers 113*c* of some of the plurality of vibration generating parts 113 through some of the plurality of second power supply electrodes 116. For example, when the first vibration structure 110 according to an embodiment of the present disclosure generates an ultrasonic wave and a width of each of the plurality of vibration generating parts 113 is 1 cm, the first vibration structure 110 may generate a sound wave based on the repeated contraction and expansion of the vibration portion 113*a* corresponding to 3×3 number of vibration generating regions UWA in response to the first polarity signal (or the second polarity signal) of the first vibration driving signal supplied to three first power supply electrodes 115 adjacent to one another in the first direction X and the second polarity signal (or the first polarity signal) of the first vibration driving signal supplied to three second power supply electrodes 116 adjacent to one another in the second direction Y.

As described above, the vibration apparatus according to an embodiment of the present disclosure may output a sound having an enhanced sound pressure level characteristic of a middle-low-pitched sound band or may output a sound having a directivity or a directional angle, based on the first sound wave SW1 generated from the first vibration structure 110 and the second sound wave SW2 generated from the second vibration structure 130. Also, the vibration apparatus according to an embodiment of the present disclosure may vary a position or a size of an overlap region between the first sound wave SW1 generated from the first vibration structure 110 and the second sound wave SW2 generated from the second vibration structure 130, and thus, may vary a directional direction of a sound and/or a directional angle of a sound and may output a sound having a minimal directional angle (or a directivity).

FIG. 5 is a plan view of a second vibration structure according to another embodiment of the present disclosure illustrated in FIG. 3. A cross-sectional view of the second vibration structure taken along line I-I' illustrated in FIG. 5 is illustrated in FIG. 3.

With reference to FIGS. 1, 3, and 5, the second vibration structure 130 according to another embodiment of the present disclosure may include a first base member 111, a second base member 112, and a plurality of vibration generating parts 113.

The first base member 111 and the second base member 112 may be disposed to overlap each other. For example, the first base member 111 may be disposed or aligned on the second base member 112. The first base member 111 and the second base member 112 of the second vibration structure 130 may be the same as the first base member 111 and the second base member 112 of the first vibration structure 110 described above with reference to FIGS. 3 and 4, and thus, like reference numerals refer to like elements and their repetitive descriptions may be omitted or will be briefly given below.

One or more of the first base member 111 and the second base member 112 of the second vibration structure 130 may be coupled or connected to a front surface (or an upper surface) of the first vibration structure 110 by an adhesive member 120. As an embodiment of the present disclosure, a second surface (or a rear surface) of the second base member 112 of the second vibration structure 130 may be coupled or connected to the front surface of the first vibration structure 110 by the adhesive member 120.

Each of a plurality of vibration generating parts (or second vibration generating parts) 113 may be disposed or interposed between the first base member 111 and the second base member 112. For example, each of the plurality of vibration generating parts 113 may be implemented in a line shape which extends long in a first direction X. For example, the plurality of second vibration generating parts 113 may be spaced apart from one another in a second direction Y crossing the first direction X.

Each of the vibration generating parts 113 of the second vibration structure 130 and each vibration generating part 113 of the first vibration structure 110 may overlap to be displaced (or vibrated) in the same direction.

According to an embodiment of the present disclosure, each vibration generating part 113 of the second vibration structure 130 and each vibration generating part 113 of the first vibration structure 110 may have the same size within an error range of a manufacturing process. As an embodiment of the present disclosure, with respect to the first direction X or the second direction Y, a center portion of each vibration generating part 113 of the second vibration structure 130 and a center portion of each vibration generating part 113 of the first vibration structure 110 may be aligned or disposed at a virtual extension line VL which extends in a thickness direction Z of the vibration apparatus. As another embodiment of the present disclosure, an end of each vibration generating part 113 of the second vibration structure 130 and an end of each vibration generating part 113 of the first vibration structure 110 may be aligned or disposed at the virtual extension line VL.

Each vibration generating part 113 of the second vibration structure 130 and each vibration generating part 113 of the first vibration structure 110 may be displaced (or driven or vibrated) in the same direction and may overlap without being staggered, and thus, an amplitude displacement of each of the first vibration structure 110 and the second vibration structure 130 may be maximized. Therefore, a sound pressure level characteristic of a sound and a sound characteristic of a middle-low-pitched sound band generated based on displacements of the first vibration structure 110 and the second vibration structure 130 may be enhanced. For example, when each vibration generating part 113 of the second vibration structure 130 and each vibration generating part 113 of the first vibration structure 110 are displaced in different directions and overlap to be staggered, a displacement direction and an amplitude displacement of each vibration generating part 113 of the second vibration structure 130 may not match a displacement direction and an amplitude displacement of each vibration generating part 113 of the first vibration structure 110, and thus, an amplitude displacement of each of the first vibration structure 110 and the second vibration structure 130 may not be maximized.

In the second vibration structure 130 according to an embodiment of the present disclosure, each of the plurality of vibration generating parts 113 may include a vibration portion 113*a* including a piezoelectric material, a first electrode layer 113*b* disposed at a first surface of the vibration portion 113*a*, and a second electrode layer 113*c* disposed at a second surface, which is opposite to the first surface, of the vibration portion 113*a*. In each vibration generating part 113 of the second vibration structure 130, the vibration generating part 113*a*, the first electrode layer 113*b*, and the second electrode layer 113*c* may respectively be the same as the vibration generating part 113*a*, the first electrode layer 113*b*, and the second electrode layer 113*c* of each of the plurality of vibration generating parts 113 provided in the first vibration structure 110 described above with reference to FIGS. 3 and 4, and thus, like reference numerals refer to like elements and their repetitive descriptions may be omitted.

The second vibration structure 130 according to an embodiment of the present disclosure may further include an adhesive layer 114 which is disposed between the first base member 111 and the second base member 112 to surround side surfaces (or sidewalls) of each of the plurality of vibration generating parts 113. The adhesive layer 114 of the second vibration structure 130 may respectively be the same as the adhesive layer 114 of the first vibration structure 110 described above with reference to FIGS. 3 and 4, and thus, like reference numerals refer to like elements and their repetitive descriptions may be omitted.

The second vibration structure 130 according to an embodiment of the present disclosure may further include a plurality of first power supply electrodes 115 and a plurality of second power supply electrodes 116.

In the second vibration structure 130, the plurality of first power supply electrodes 115 and the plurality of second power supply electrodes 116 may respectively be the same as the plurality of first power supply electrodes 115 and the plurality of second power supply electrodes 116 provided in the first vibration structure 110 described above with reference to FIGS. 3 and 4, and thus, like reference numerals refer to like elements and their repetitive descriptions may be omitted or will be briefly given below.

Each of the plurality of first power supply electrodes 115 provided in the second vibration structure 130 may overlap or may be stacked each of the plurality of second power supply electrodes 116 provided in the first vibration structure 110 without being staggered.

According to an embodiment of the present disclosure, each of the plurality of first power supply electrodes 115 provided in the second vibration structure 130 may be electrically connected to the first electrode layer 113*b* of each of the plurality of vibration generating parts 113 by an anisotropic conductive film in a one-to-one relationship. According to another embodiment of the present disclosure, each of the plurality of first power supply electrodes 115 provided in the second vibration structure 130 may be electrically connected to the first electrode layer 113*b* of each of the plurality of vibration generating parts 113 in a one-to-one relationship by a conductive material (or particle) included in the adhesive layer 114 or the first adhesive layer 114*a*, instead of the anisotropic conductive film.

Each of the plurality of second power supply electrodes 116 provided in the second vibration structure 130 may overlap or may be stacked each of the plurality of second power supply electrodes 116 provided in the first vibration structure 110 without being staggered.

According to an embodiment of the present disclosure, each of the plurality of second power supply electrodes 116 provided in the second vibration structure 130 may be electrically connected to the second electrode layer 113*c* of each of the plurality of vibration generating parts 113 by an anisotropic conductive film in a one-to-one relationship. According to another embodiment of the present disclosure, each of the plurality of second power supply electrodes 116 provided in the second vibration structure 130 may be electrically connected to the second electrode layer 113*c* of each of the plurality of vibration generating parts 113 in a one-to-one relationship by a conductive material (or particle) included in the adhesive layer 114 or the second adhesive layer 114*b*, instead of the anisotropic conductive film.

The second vibration structure 130 according to an embodiment of the present disclosure may include a plurality of first power supply lines 117, a plurality of second power supply lines 118, and a pad part 119.

The plurality of first power supply lines 117, the plurality of second power supply lines 118, and the pad part 119 provided in the second vibration structure 130 may respectively be the same as the plurality of first power supply lines 117, the plurality of second power supply lines 118, and the pad part 119 provided in the first vibration structure 110 described above with reference to FIGS. 3 and 4, and thus, like reference numerals refer to like elements and their repetitive descriptions may be omitted or will be briefly given below.

According to an embodiment of the present disclosure, odd-numbered power supply lines 117*a* of the plurality of first power supply lines 117 provided in the second vibration structure 130 may be disposed in parallel at first and second periphery portions of a second surface periphery portion of the first base member 111 and may be electrically connected to second sides (or the other end) of odd-numbered power supply electrodes of the plurality of first power supply electrodes 115. Even-numbered power supply lines 117*b* of the plurality of first power supply lines 117 provided in the second vibration structure 130 may be disposed in parallel at first and third periphery portions of the second surface periphery portion of the first base member 111 and may be electrically connected to first sides (or one end) of even-numbered power supply electrodes of the plurality of first power supply electrodes 115.

Each of the plurality of second power supply lines 118 provided in the second vibration structure 130 may be directly formed at a first surface (or an upper surface) of the second base member 112 along with each of the plurality of second power supply electrodes 116. For example, the plurality of second power supply lines 118 may be disposed in parallel at a first periphery portion among a first surface periphery portion of the second base member 112 and may be electrically and respectively connected to the plurality of second power supply electrodes 116 in a one-to-one relationship.

Each of the plurality of second power supply lines 118 provided in the second vibration structure 130 may be disposed not to overlap each of the plurality of first power supply lines 117, and thus, may be electrically disconnected (or isolated) from each of the plurality of first power supply lines 117.

The pad part 119 (or a second pad part) provided in the second vibration structure 130 may be disposed between the other side and a center portion of the first periphery portion of the second surface periphery portion of the first base member 111.

According to an embodiment of the preset disclosure, one or more of the first base member 111 and the second base member 112 provided in the second vibration structure 130 may further include a plurality of pad holes (or first pad holes) respectively overlapping the plurality of first pads 119*a* and the plurality of second pads 119*b*. For example, each of the plurality of pad holes may be formed to pass through the first base member 111 (or the second base member 112) overlapping at least a portion of each of the plurality of first pads 119*a* and the plurality of second pads 119*b*, and thus, at least a portion of each of the plurality of first pads 119*a* and the plurality of second pads 119*b* may be exposed at the outside of a first surface (or a second surface) of the first vibration structure 110.

The second vibration structure 130 according to an embodiment of the present disclosure may further include a flexible cable FC.

The flexible cable FC may be electrically connected to the pad part 119 of the second vibration structure 130. The flexible cable FC may be the same as the flexible cable FC of the first vibration structure 110 described above with reference to FIGS. 1 and 4, and thus, like reference numerals refer to like elements and their repetitive descriptions may be omitted.

The flexible cable FC according to an embodiment of the present disclosure may further include a plurality of protrusion lines (or finger lines) which respectively protrude from ends of a plurality of first signal transfer lines STL1 and a plurality of second signal transfer lines STL2. The plurality of protrusion lines may be the same as the protrusion lines of the flexible cable FC provided in the first vibration structure 110, and thus, like reference numerals refer to like elements and their repetitive descriptions are omitted.

The second vibration structure 130 according to an embodiment of the present disclosure may include a plurality of first power supply electrodes 115, intersecting with one another with each of the plurality of vibration generating parts 113 therebetween, and a plurality of vibration generating regions which are formed in intersection portions (or intersection regions) between the plurality of second power supply electrodes 116.

The second vibration structure 130 according to an embodiment of the present disclosure may generate a sound wave based on the repeated contraction and expansion of the vibration portion 113*a* corresponding to each of the plurality of vibration generating regions in response to a first polarity signal (or a second polarity signal) of a second vibration driving signal supplied to the first electrode layer 113*b* of each of the plurality of vibration generating parts 113 through the first power supply electrode 115 and a second polarity signal (or a first polarity signal) of a second vibration driving signal supplied to the second electrode layer 113*c* of each of the plurality of vibration generating parts 113 through the second power supply electrode 116. An operation of generating a sound wave by the second vibration structure 130 may be the same as the first vibration structure 110, and thus, its repetitive description may be omitted.

Figure 6:
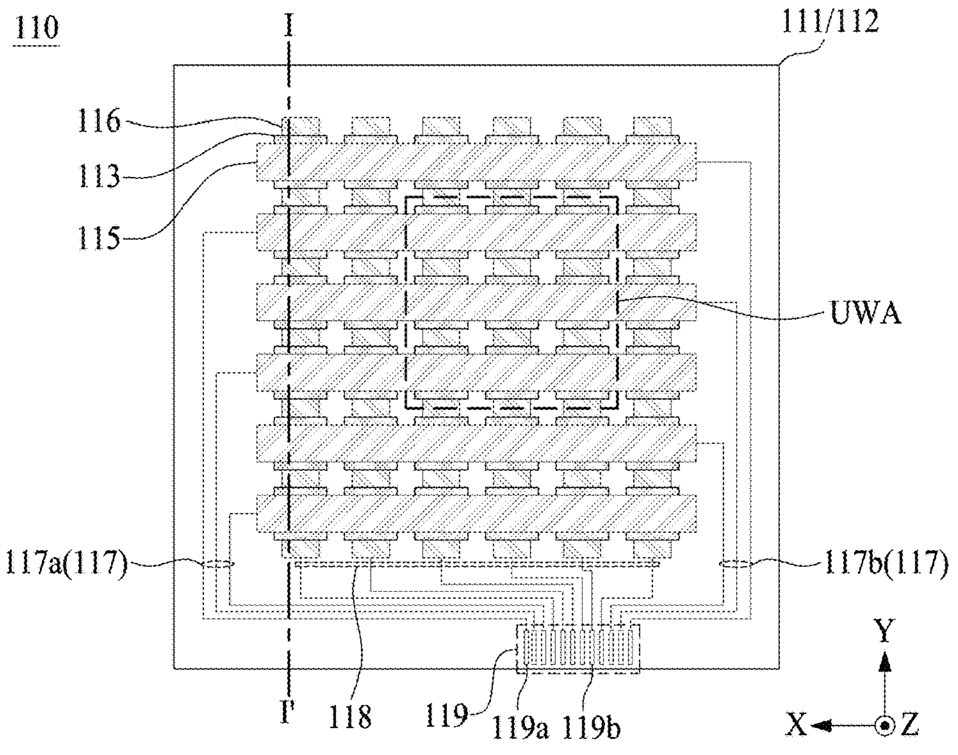
FIG. 6 is a plan view illustrating a first vibration structure according to another embodiment of the present disclosure illustrated in FIGS. 1 and 3.
Figure 7:
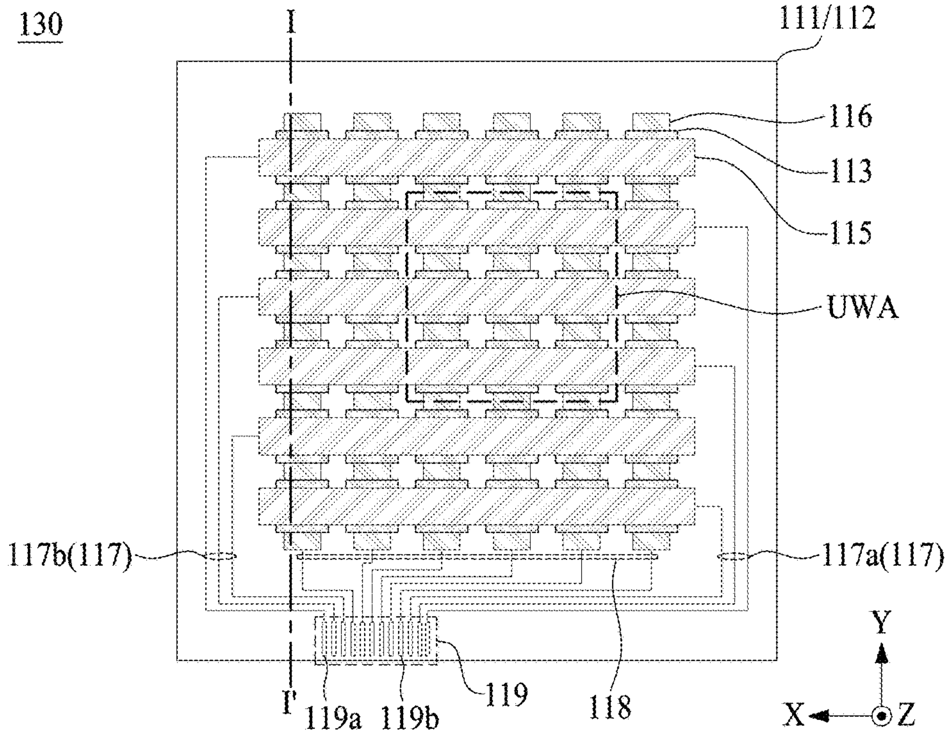
FIG. 7 is a plan view illustrating a second vibration structure according to another embodiment of the present disclosure illustrated in FIGS. 1 and 3.

FIG. 6 is a plan view of a first vibration structure according to another embodiment of the present disclosure illustrated in FIGS. 1 and 3, and FIG. 7 is a plan view of a second vibration structure according to another embodiment of the present disclosure illustrated in FIGS. 1 and 3. FIGS. 6 and 7 illustrate an embodiment implemented by modifying a vibration generating part of each of the first and second vibration structures illustrated in FIGS. 3 to 5. Therefore, in the following description, repetitive descriptions of elements other than a vibration generating part of each of first and second vibration structures and elements relevant thereto may be omitted or will be briefly given. A cross-sectional view of each of the first and second vibration structures taken along line I-I' illustrated in FIGS. 6 and 7 is illustrated in FIG. 3.

With reference to FIGS. 1, 3, and 6, in a first vibration structure 110 according to another embodiment of the present disclosure, a plurality of vibration generating parts 113 may be spaced apart from one another in a first direction X and a second direction Y. For example, the plurality of vibration generating parts 113 may be respectively disposed in only intersection portions (or intersection regions) between a plurality of first power supply electrodes 115 and a plurality of second power supply electrodes 116. For example, the number of vibration generating parts 113 may be the same as the number of the intersection portions of the first power supply electrodes 115 and the second power supply electrodes 116.

The plurality of vibration generating parts 113 according to another embodiment of the present disclosure may have an island shape where the plurality of vibration generating parts 113 are respectively disposed between the intersection portions between the plurality of first power supply electrodes 115 and the plurality of second power supply electrodes 116. For example, each of the plurality of vibration generating parts 113 may have a size which is greater than that of each of the intersection portions (the intersection regions) between the plurality of first power supply electrodes 115 and the plurality of second power supply electrodes 116. For example, each of the plurality of vibration generating parts 113 may have a regular hexahedron structure or a square cross-sectional structure having a widthwise length of 1 cm and a lengthwise length of 1 cm.

In the first vibration structure 110, each of the plurality of vibration generating parts 113 may be divided by a group of second power supply electrode 116 in the first direction X and may be divided by a group of first power supply electrode 115 in the second direction Y, and thus, based on an individual vibration of each of the plurality of vibration generating parts 113, a sharp (or clear) and accurate sound wave may be generated without noise caused by parasitic interference between the plurality of vibration generating parts 113.

The first vibration structure 110 according to another embodiment of the present disclosure may generate a sound wave having various frequencies (or a resonance frequency) based on the number of vibration generating parts 113 or a size of a vibration region among the plurality of vibration generating parts 113. For example, when each of the plurality of vibration generating parts 113 has a size of 1 cm, the first vibration structure 110 may generate a ultrasonic sound wave based on individually simultaneous vibrations of nine vibration generating parts 113 corresponding to 3×3 number of vibration generating regions UWA in response to a first polarity signal (or a second polarity signal) of a first vibration driving signal supplied to three first power supply electrodes 115 adjacent to one another in the first direction X and a second polarity signal (or a first polarity signal) of a first vibration driving signal supplied to three second power supply electrodes 116 adjacent to one another in the second direction Y.

With reference to FIGS. 1, 3, and 7, in a second vibration structure 130 according to another embodiment of the present disclosure, a plurality of vibration generating parts 113 may be spaced apart from one another in a first direction X and a second direction Y. For example, each of the plurality of vibration generating parts 113 may be respectively disposed in only intersection portions (or intersection regions) between a plurality of first power supply electrodes 115 and a plurality of second power supply electrodes 116. The plurality of vibration generating parts 113 provided in the second vibration structure 130 may accurately overlap or may be accurately stacked on the plurality of vibration generating parts 113 provided in the first vibration structure 110, respectively. The plurality of vibration generating parts 113 provided in the second vibration structure 130 according to another embodiment of the present disclosure may be the same as the plurality of vibration generating parts 113 provided in the first vibration structure 110 described above with reference to FIG. 6, and thus, their repetitive descriptions may be omitted.

In the second vibration structure 130, each of the plurality of vibration generating parts 113 may be divided by second power supply electrode 116 units in the first direction X and may be divided by first power supply electrode 115 units in the second direction Y, and thus, based on an individual vibration of each of the plurality of vibration generating parts 113, a sharp (or clear) and accurate sound wave may be generated without noise caused by parasitic interference between the plurality of vibration generating parts 113.

Therefore, a vibration apparatus including the first vibration structure 110 and the second vibration structure 130 according to another embodiment of the present disclosure may generate a sharper and more accurate sound wave based on individually simultaneous vibrations of the plurality of vibration generating parts 113 and may generate a sound wave having various frequencies (or a resonance frequency) based on the number of vibration generating parts 113 or a size of a vibration region among the plurality of vibration generating parts 113.

Figure 8:
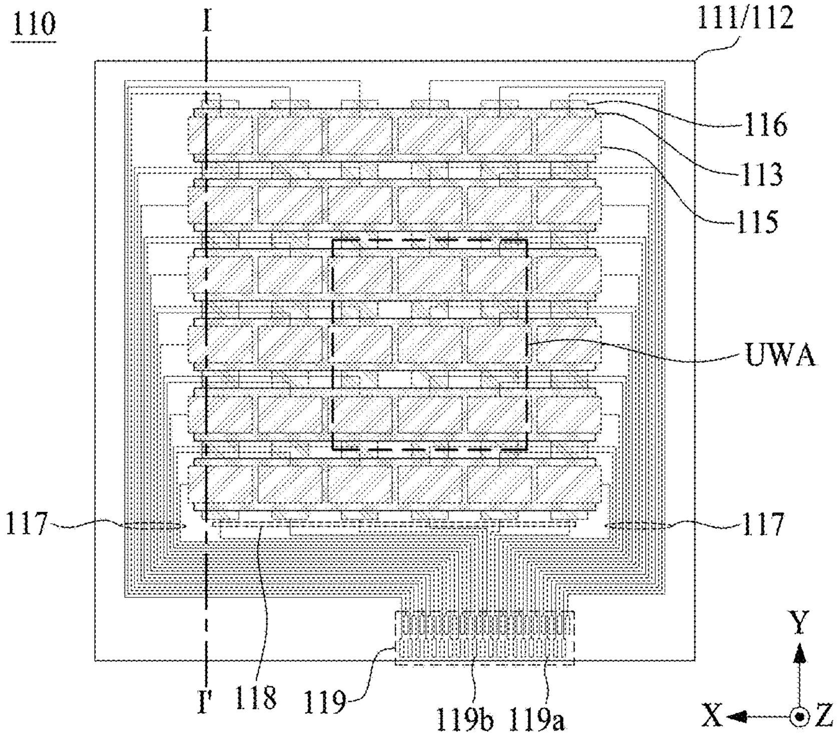
FIG. 8 is a plan view illustrating a first vibration structure according to another embodiment of the present disclosure illustrated in FIGS. 1 and 3.
Figure 9:
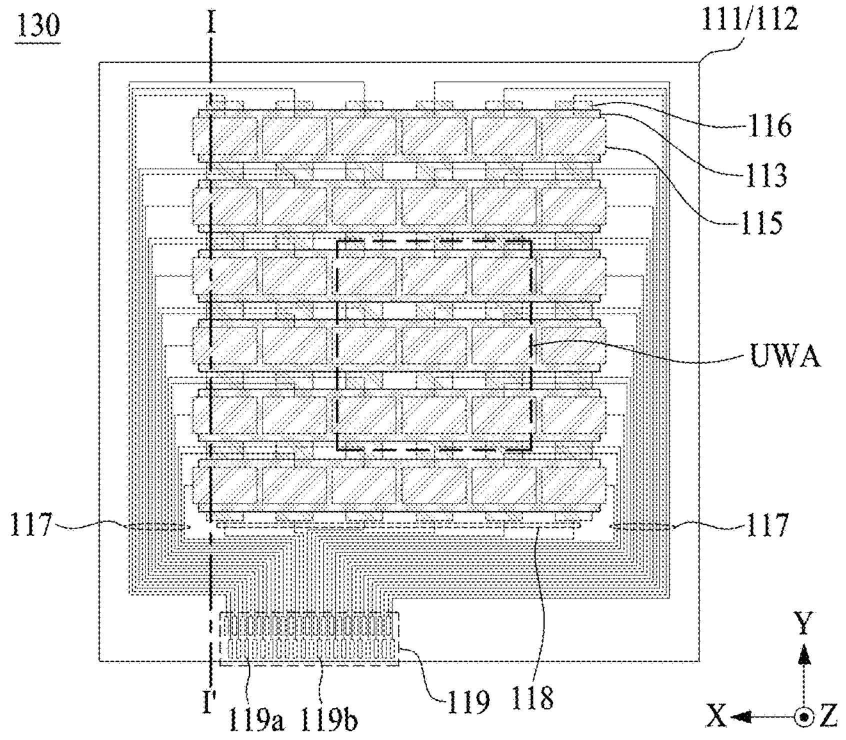
FIG. 9 is a plan view illustrating a second vibration structure according to another embodiment of the present disclosure illustrated in FIGS. 1 and 3.

FIG. 8 is a plan view of a first vibration structure according to another embodiment of the present disclosure illustrated in FIGS. 1 and 3, and FIG. 9 is a plan view of a second vibration structure according to another embodiment of the present disclosure illustrated in FIGS. 1 and 3. FIGS. 8 and 9 illustrate an embodiment implemented by modifying the plurality of first power supply electrodes and the plurality of first power supply lines illustrated in FIGS. 3 to 5. In the following description, therefore, repetitive descriptions of elements other than first power supply electrodes and a first power supply line of each of first and second vibration structures and elements relevant thereto may be omitted or will be briefly given below. A cross-sectional view of each of the first and second vibration structures taken along line I-I' illustrated in FIGS. 8 and 9 is illustrated in FIG. 3.

With reference to FIGS. 1, 3, and 8, in a first vibration structure 110 according to another embodiment of the present disclosure, a plurality of first power supply electrodes 115 may be spaced apart from one another in each of a first direction X and a second direction Y. For example, the plurality of first power supply electrodes 115 may be respectively disposed at a plurality of vibration generating parts 113 which are spaced apart from one another in the first direction X.

The plurality of first power supply electrodes 115 according to another embodiment of the present disclosure may each have an island shape which is disposed at the plurality of vibration generating parts 113 respectively overlapping a plurality of second power supply electrodes 116. For example, each of the plurality of first power supply electrodes 115 may have a rectangular shape which intersects with each of the plurality of second power supply electrodes 116 in a first direction X, but embodiments of the present disclosure are not limited thereto. For example, each of the plurality of first power supply electrodes 115 may be divided by second power supply electrode 116 units in the first direction X and may be divided by vibration generating part 113 units in the second direction Y.

A plurality of first power supply lines 117 may be electrically and respectively connected to the plurality of first power supply electrodes 115 which are spaced apart from one another in the first direction X and the second direction Y. For example, the plurality of first power supply lines 117 may be disposed in parallel at second and third periphery portions of a second surface periphery portion of a first base member 111 and may be electrically and respectively connected to the plurality of first power supply electrodes 115. Except for that the number of first power supply lines 117 is the same as the number of first power supply electrodes 115, the first power supply lines 117 may be similar to the plurality of first power supply lines 117 described above with reference to FIGS. 3 and 4, and thus, their repetitive descriptions may be omitted.

In the first vibration structure 110, each of the plurality of first power supply electrodes 115 may be divided by second power supply electrode 116 units in the first direction X and may be divided by vibration generating part 113 units in the second direction Y, and thus, each of a plurality of vibration generating regions or the plurality of vibration generating parts 113 respectively overlapping the plurality of first power supply electrodes 115 may individually vibrate based on a first vibration driving signal selectively supplied through each of the plurality of first power supply electrodes 115 to generate a sound wave.

The first vibration structure 110 according to another embodiment of the present disclosure may generate a sound wave having various frequencies (or a resonance frequency) based on a size of a vibration region or the number of vibration generating parts 113 which vibrate based on a first vibration driving signal selectively supplied to each of the plurality of first power supply electrodes 115. For example, when each of the plurality of vibration generating parts 113 has a size of 1 cm, the first vibration structure 110 may generate a sound wave based on individually simultaneous vibrations of nine vibration generating parts 113 corresponding to 3×3 number of vibration generating regions UWA in response to a first polarity signal (or a second polarity signal) of a first vibration driving signal supplied to nine first power supply electrodes 115 adjacent to one another in the first direction X and a second polarity signal (or a first polarity signal) of a first vibration driving signal supplied to three second power supply electrodes 116 adjacent to one another in the second direction Y.

With reference to FIGS. 1, 2, and 9, in a second vibration structure 130 according to another embodiment of the present disclosure, a plurality of first power supply electrodes 115 may be spaced apart from one another in each of a first direction X and a second direction Y. For example, the plurality of first power supply electrodes 115 may be respectively disposed at a plurality of vibration generating parts 113 which are spaced apart from one another in the first direction X. The plurality of first power supply electrodes 115 provided in the second vibration structure 130 according to another embodiment of the present disclosure may be the same as the plurality of first power supply electrodes 115 provided in the first vibration structure 110 described above with reference to FIG. 8, and thus, their repetitive descriptions are omitted.

In the second vibration structure 130 according to another embodiment of the present disclosure, a plurality of first power supply lines 117 may be disposed in parallel at second and third periphery portions of a second surface periphery portion of a first base member 111 and may be electrically and respectively connected to the plurality of first power supply electrodes 115. The plurality of first power supply lines 117 provided in the second vibration structure 130 according to another embodiment of the present disclosure may be the same as the plurality of first power supply lines 117 provided in the first vibration structure 110 described above with reference to FIG. 8, and thus, their repetitive descriptions may be omitted.

In the second vibration structure 130, each of the plurality of first power supply electrodes 115 may be divided by a group of a second power supply electrode 116 in the first direction X and may be divided by a group of a vibration generating part 113 in the second direction Y, and thus, each of a plurality of vibration generating regions or the plurality of vibration generating parts 113 respectively overlapping the plurality of first power supply electrodes 115 may individually vibrate based on a first vibration driving signal selectively supplied through each of the plurality of first power supply electrodes 115 to generate a sound wave.

The second vibration structure 130 according to another embodiment of the present disclosure may generate a sound wave having various frequencies (or a resonance frequency) based on a size of a vibration region or the number of vibration generating parts 113 which vibrate based on a first vibration driving signal selectively supplied to each of the plurality of first power supply electrodes 115. For example, when each of the plurality of vibration generating parts 113 has a size of 1 cm, the second vibration structure 130 may generate a sound wave based on individually simultaneous vibrations of nine vibration generating parts 113 corresponding to 3×3 number of vibration generating regions UWA in response to a first polarity signal (or a second polarity signal) of a second vibration driving signal supplied to nine first power supply electrodes 115 adjacent to one another in the first direction X and a second polarity signal (or a first polarity signal) of a second vibration driving signal supplied to three second power supply electrodes 116 adjacent to one another in the second direction Y.

Therefore, a vibration apparatus including the first vibration structure 110 and the second vibration structure 130 according to another embodiment of the present disclosure may generate a sound wave based on individual vibrations of vibration generating regions of the plurality of vibration generating parts 113 respectively overlapping the plurality of first power supply electrodes 115.

Figure 10:
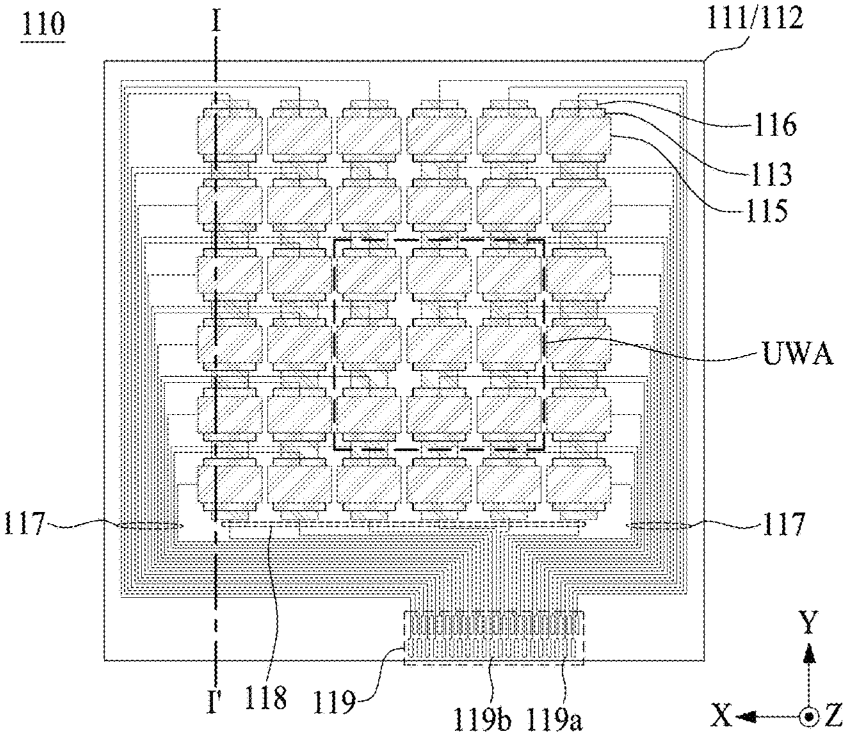
FIG. 10 is a plan view illustrating a first vibration structure according to another embodiment of the present disclosure illustrated in FIGS. 1 and 3.
Figure 11:
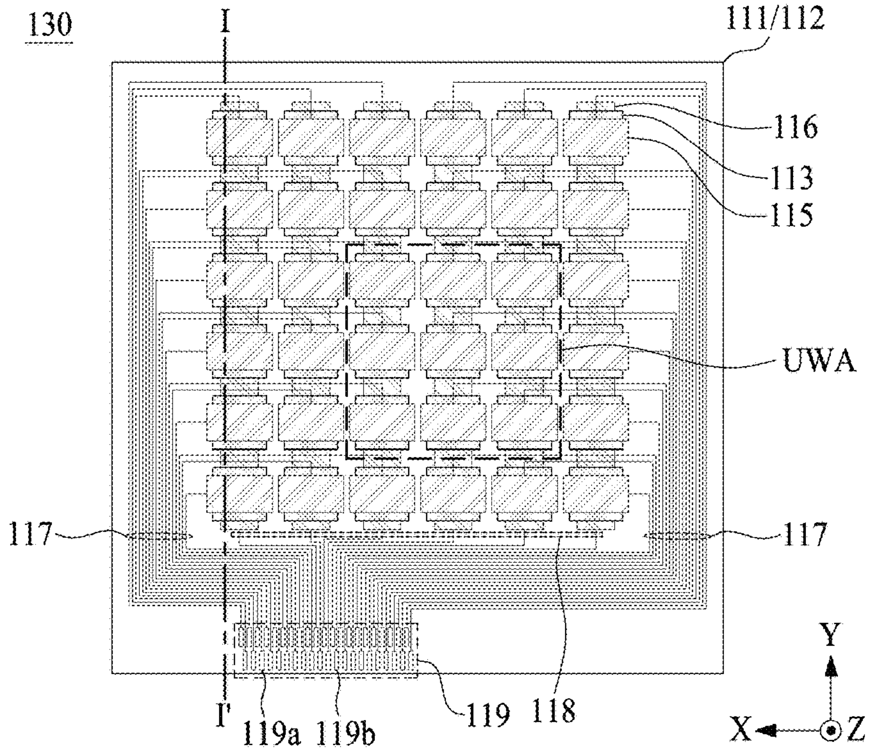
FIG. 11 is a plan view illustrating a second vibration structure according to another embodiment of the present disclosure illustrated in FIGS. 1 and 3.

FIG. 10 is a plan view of a first vibration structure according to another embodiment of the present disclosure illustrated in FIGS. 1 and 3, and FIG. 11 is a plan view of a second vibration structure according to another embodiment of the present disclosure illustrated in FIGS. 1 and 3. FIGS. 10 and 11 illustrate an embodiment implemented by modifying the plurality of vibration generating parts illustrated in FIGS. 8 and 9. In the following description, therefore, repetitive descriptions of elements other than a plurality of vibration generating parts of each of first and second vibration structures and elements relevant thereto may be omitted or will be briefly given below. A cross-sectional view of each of the first and second vibration structures taken along line I-I' illustrated in FIGS. 10 and 11 is illustrated in FIG. 3.

With reference to FIGS. 1, 3, and 10, in a first vibration structure 110 according to another embodiment of the present disclosure, a plurality of vibration generating parts 113 may be spaced apart from one another in each of a first direction X and a second direction Y. For example, the plurality of vibration generating parts 113 may be respectively disposed in only intersection portions (or intersection regions) between a plurality of first power supply electrodes 115 and a plurality of second power supply electrodes 116. For example, the number of vibration generating parts 113 may be the same as the number of intersection portions (or intersection regions) between the plurality of first power supply electrodes 115 and the plurality of second power supply electrodes 116. The plurality of vibration generating parts 113 provided in the first vibration structure 110 may be the same as the plurality of vibration generating parts 113 provided in the first vibration structure 110 described above with reference to FIG. 6, and thus, their repetitive descriptions are omitted.

With reference to FIGS. 1, 3, and 11, in a second vibration structure 130 according to another embodiment of the present disclosure, a plurality of vibration generating parts 113 may be spaced apart from one another in each of a first direction X and a second direction Y. For example, the plurality of vibration generating parts 113 may be respectively disposed in only intersection portions (or intersection regions) between a plurality of first power supply electrodes 115 and a plurality of second power supply electrodes 116. The plurality of vibration generating parts 113 provided in the second vibration structure 130 may accurately overlap or may be accurately stacked on the plurality of vibration generating parts 113 provided in the first vibration structure 110, respectively. The plurality of vibration generating parts 113 provided in the second vibration structure 130 according to another embodiment of the present disclosure may be the same as the plurality of vibration generating parts 113 provided in the first vibration structure 110 described above with reference to FIG. 7, and thus, their repetitive descriptions may be omitted.

Therefore, a vibration apparatus including the first vibration structure 110 and the second vibration structure 130 according to another embodiment of the present disclosure may generate a sharper and more accurate sound wave based on individually simultaneous vibrations of the plurality of vibration generating parts 113 (or a plurality of vibration generating regions) respectively overlapping the plurality of first power supply electrodes 115 and may generate a sound wave having various frequencies (or a resonance frequency) based on a size of a vibration region or the number of vibration generating parts 113 vibrating among the plurality of vibration generating parts 113.

Figure 12:
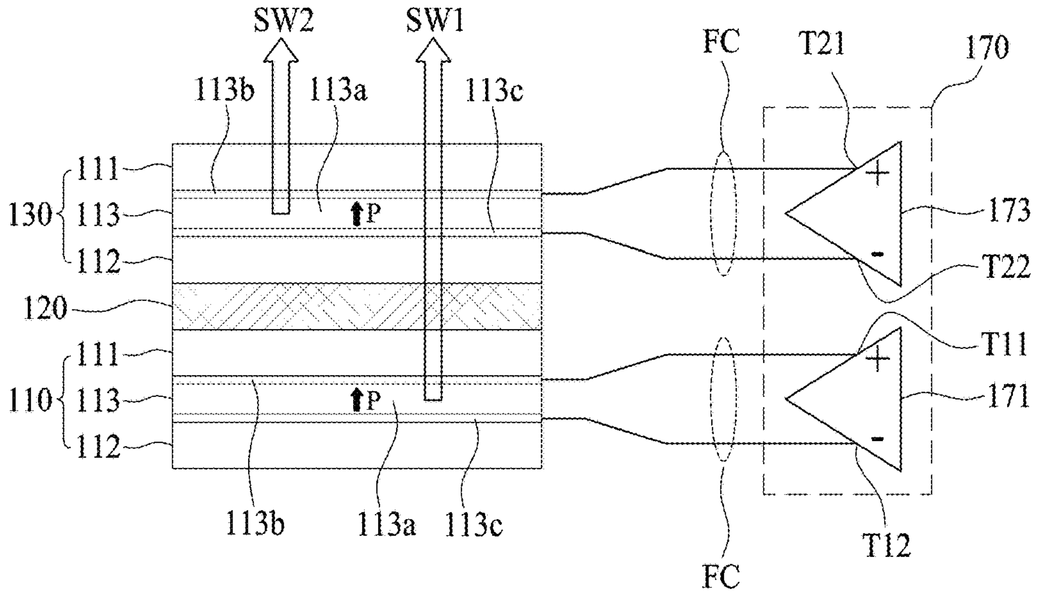
FIG. 12 illustrates a vibration driving circuit of a vibration apparatus according to an embodiment of the present disclosure.
Figure 13:
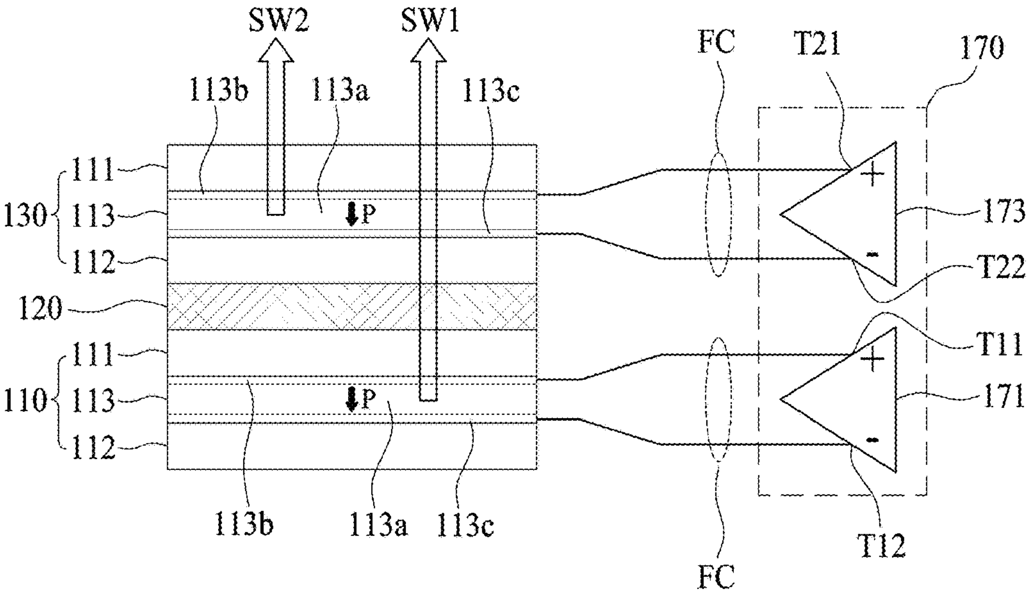
FIG. 13 illustrates a vibration driving circuit of a vibration apparatus according to another embodiment of the present disclosure.

FIG. 12 illustrates a vibration driving circuit of a vibration apparatus according to an embodiment of the present disclosure. FIG. 13 illustrates a vibration driving circuit of a vibration apparatus according to another embodiment of the present disclosure.

With reference to FIGS. 1 and 12, the vibration apparatus according to an embodiment of the present disclosure may further include a vibration driving circuit 170.

The vibration driving circuit 170 may be electrically connected to each of a first vibration structure 110 and a second vibration structure 130 through a flexible cable FC. The vibration driving circuit 170 may supply a first vibration driving signal to the first vibration structure 110, and simultaneously, may supply a second vibration driving signal to the second vibration structure 130, thereby vibrating (or displacing) each of the first vibration structure 110 and the second vibration structure 130 in the same direction. For example, the vibration driving circuit 170 may generate each of first and second vibration driving signals based on a sound source.

The vibration driving circuit 170 according to an embodiment of the present disclosure may generate the first vibration driving signal configured to generate a first sound wave SW1 based on a vibration of the first vibration structure 110 and may supply the generated first vibration driving signal to the first vibration structure 110, and moreover, may generate the second vibration driving signal configured to generate a second sound wave SW2 based on a vibration of the second vibration structure 130 and may supply the generated second vibration driving signal to the second vibration structure 130. According to an embodiment of the present disclosure, each of the first sound wave SW1 and the second sound wave SW2 may be one or more of a sound wave of an audible frequency band, a sound wave (or an ultrasonic wave) of an inaudible frequency band without audible frequency, and a sound wave (or a mixed sound wave) which an audible frequency is mixed with. For example, the vibration driving circuit 170 may generate the first vibration driving signal for generating the first sound wave SW1 corresponding to an ultrasonic wave and may generate the second vibration driving signal configured to generate the second sound wave SW2 corresponding to a sound wave (or a mixed sound wave) which an audible frequency is mixed with, but embodiments of the present disclosure are not limited thereto.

The vibration driving circuit 170 according to an embodiment of the present disclosure may include a first amplifier 171 connected to the first vibration structure 110 and a second amplifier 173 connected to the second vibration structure 130.

The first amplifier (or a first signal generating circuit) 171 may generate a first vibration driving signal in an AC type having a first polarity signal and a second polarity signal based on the sound source. The first amplifier 171 according to an embodiment of the present disclosure may include a first output terminal T11, which outputs the first polarity signal of the first vibration driving signal, and a second output terminal T12 which outputs the second polarity signal of the first vibration driving signal.

The second amplifier (or a second signal generating circuit) 173 may generate an AC second vibration driving signal having a first polarity signal and a second polarity signal based on the sound source. The second amplifier 173 according to an embodiment of the present disclosure may include a first output terminal T21, which outputs the first polarity signal of the second vibration driving signal, and a second output terminal T22 which outputs the second polarity signal of the second vibration driving signal.

Each of vibration portions 113*a* of each of the plurality of vibration generating parts 113 provided in the first vibration structure 110 may have a polarization direction P from a second electrode layer 113*c* to a first electrode layer 113*b*. Also, each of the vibration portions 113*a* of each of the plurality of vibration generating parts 113 provided in the second vibration structure 130 may have a polarization direction P from the second electrode layer 113*c* to the first electrode layer 113*b*. For example, a polarization direction P of the vibration portion 113*a* provided in the first vibration structure 110 may be the same as a polarization direction P of the vibration portion 113*a* provided in the second vibration structure 130.

The first polarity signal of the first vibration driving signal output from the first output terminal T11 of the first amplifier 171 may be supplied to, through the flexible cable FC, the first electrode layer 113*b* of each of the plurality of vibration generating parts 113 provided in the first vibration structure 110, and the second polarity signal of the first vibration driving signal output from the second output terminal T12 of the first amplifier 171 may be supplied to, through the flexible cable FC, the second electrode layer 113*c* of each of a plurality of vibration generating parts 113 provided in the first vibration structure 110.

The first polarity signal of the second vibration driving signal output from the first output terminal T21 of the second amplifier 173 may be supplied to the first electrode layer 113*b* of each of the plurality of vibration generating parts 113 provided in the second vibration structure 130, and the second polarity signal of the second vibration driving signal output from the second output terminal T22 of the second amplifier 173 may be supplied to, through the flexible cable FC, the second electrode layer 113*c* of each of the plurality of vibration generating parts 113 provided in the second vibration structure 130.

Each of the vibration portions 113*a* of the plurality of vibration generating parts 113 provided in the first vibration structure 110 illustrated in FIG. 12, as illustrated in FIG. 13, may have a polarization direction P from a first electrode layer 113*b* to the second electrode layer 113*c*. Each of the vibration portions 113*a* of the plurality of vibration generating parts 113 provided in the second vibration structure 130 illustrated in FIG. 12, as illustrated in FIG. 13, may have a polarization direction P from the first electrode layer 113*b* to the second electrode layer 113*c*.

Therefore, the first vibration structure 110 and the second vibration structure 130 illustrated in FIGS. 12 and 13 may vibrate in the same direction. For example, each of the first vibration structure 110 and the second vibration structure 130 may expand or contract simultaneously, and thus, a displacement amount (or a bending force or a flexural force) or an amplitude displacement of each of the first vibration structure 110 and the second vibration structure 130 may increase or may be maximized, thereby enhancing a sound pressure level characteristic of a sound and a sound characteristic of a middle-low-pitched sound band generated based on a vibration(s) of the first vibration structure 110 and/or the second vibration structure 130. Also, the first sound wave SW1 generated based on a vibration of the first vibration structure 110 and the second sound wave SW2 generated based on a vibration of the second vibration structure 110 may be output to overlap. Therefore, the vibration apparatus may output a sound having a directivity or a directional angle based on overlapping of the first sound wave SW1 and the second sound SW2. For example, an overlap region between the first sound wave SW1 and the second sound wave SW2 may be an audible region which enables a user to listen to a sound, and a non-overlap region between the first sound wave SW1 and the second sound wave SW2 may be an inaudible region which disables a user to listen to a sound. For example, the first sound wave SW1 may have a directivity or a directional angle based on the second wave SW2.

In FIGS. 12 and 13, the first polarity signal of the first vibration driving signal may be supplied to the first electrode layer 113*b* of the first vibration structure 110, the second polarity signal of the first vibration driving signal may be supplied to the second electrode layer 113*c* of the first vibration structure 110, the first polarity signal of the second vibration driving signal may be supplied to the second electrode layer 113*c* of the second vibration structure 130, and the second polarity signal of the second vibration driving signal may be supplied to the first electrode layer 113*b* of the second vibration structure 130. In this case, the first vibration structure 110 and the second vibration structure 130 may vibrate in an opposite direction. For example, when the first vibration structure 110 expands, the second vibration structure 130 may contract, and thus, a vibration of the first vibration structure 110 and a vibration of the second vibration structure 120 may be offset therebetween, whereby the vibration apparatus may not vibrate.

Figure 14:
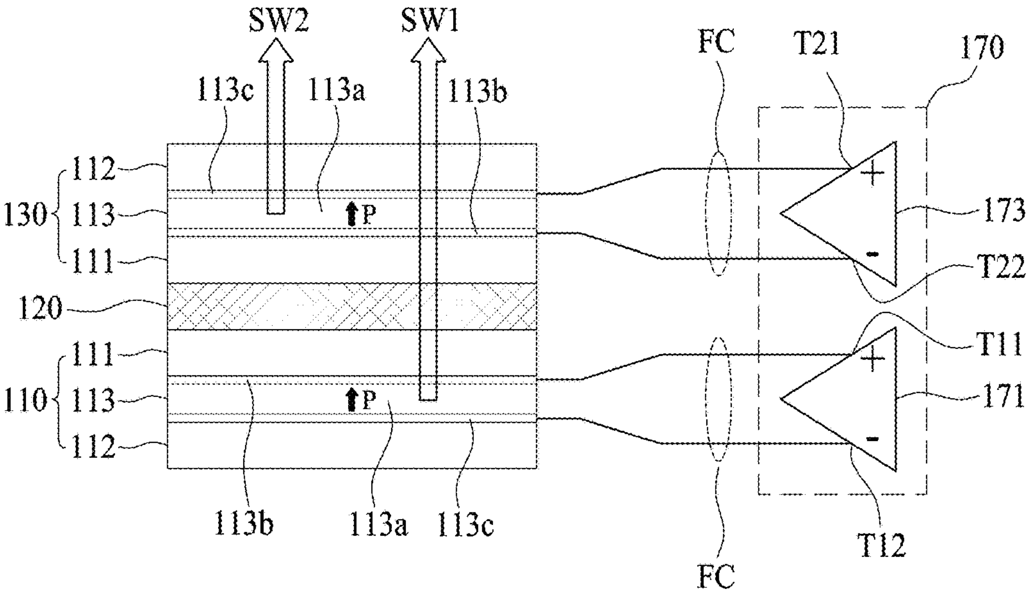
FIG. 14 illustrates a vibration driving circuit of a vibration apparatus according to another embodiment of the present disclosure.
Figure 15:
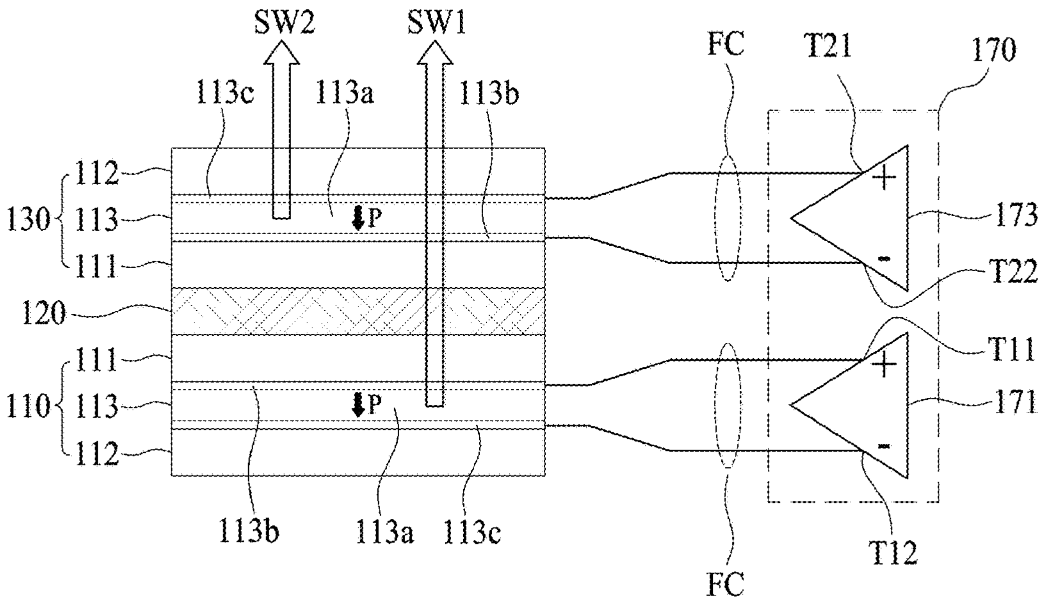
FIG. 15 illustrates a vibration driving circuit of a vibration apparatus according to another embodiment of the present disclosure.

FIG. 14 illustrates a vibration driving circuit of a vibration apparatus according to another embodiment of the present disclosure. FIG. 15 illustrates a vibration driving circuit of a vibration apparatus according to another embodiment of the present disclosure and illustrates an embodiment implemented by modifying a connection structure of a vibration structure and a first amplifier described above with reference to FIG. 12. In the following description, therefore, repetitive descriptions of elements other than a vibration structure and a first amplifier may be omitted or will be briefly given below.

With reference to FIGS. 1 and 14, in the vibration apparatus according to another embodiment of the present disclosure, a second vibration structure 130 may overlap or may be stacked on a first vibration structure 110 in a state which is vertically (or up and down) reversed or vertically turned. For example, a first base member 111 of the second vibration structure 130 may be coupled or connected to a first base member 111 of the first vibration structure 110 by an adhesive member 120. A second base member 112 of the second vibration structure 130 may be a front surface (or an upper surface) of the vibration apparatus.

Each of vibration portions 113*a* of each of a plurality of vibration generating parts 113 provided in the first vibration structure 110 may have a polarization direction P from a second electrode layer 113*c* to a first electrode layer 113*b*. Also, each of vibration portions 113*a* of a plurality of vibration generating parts 113 provided in the second vibration structure 130 may have a polarization direction P from a first electrode layer 113*b* to a second electrode layer 113*c*. For example, a polarization direction P of the vibration portion 113*a* provided in the first vibration structure 110 may be opposite to a polarization direction P of the vibration portion 113*a* provided in the second vibration structure 130.

In a vibration driving circuit 170, a first polarity signal of a first vibration driving signal output from a first output terminal T11 of a first amplifier 171 may be supplied to, through a flexible cable FC, a first electrode layer 113*b* of each of a plurality of vibration generating parts 113 provided in the first vibration structure 110, and a second polarity signal of the first vibration driving signal output from a second output terminal T12 of a first amplifier 171 may be supplied to, through the flexible cable FC, a second electrode layer 113*c* of each of a plurality of vibration generating parts 113 provided in the first vibration structure 110.

In the vibration driving circuit 170, a first polarity signal of a second vibration driving signal output from a first output terminal T21 of a second amplifier 173 may be supplied to, through the flexible cable FC, a second electrode layer 113*c* of each of a plurality of vibration generating parts 113 provided in the second vibration structure 130, and a second polarity signal of the second vibration driving signal output from a second output terminal T22 of the second amplifier 173 may be supplied to, through the flexible cable FC, a first electrode layer 113*b* of each of a plurality of vibration generating parts 113 provided in the second vibration structure 130.

Each of vibration portions 113*a* of each of the plurality of vibration generating parts 113 provided in the first vibration structure 110 illustrated in FIG. 14, as illustrated in FIG. 15, may have a polarization direction P from a first electrode layer 113*b* to a second electrode layer 113*c*. Each of vibration portions 113*a* of a plurality of vibration generating parts 113 provided in the second vibration structure 130 illustrated in FIG. 14, as illustrated in FIG. 15, may have a polarization direction P from a second electrode layer 113*c* to a first electrode layer 113*b*.

Therefore, the first vibration structure 110 and the second vibration structure 130 illustrated in FIGS. 14 and 15 may vibrate in the same direction. For example, each of the first vibration structure 110 and the second vibration structure 130 may expand or contract simultaneously, and thus, a displacement amount (or a bending force or flexural force) or an amplitude displacement of each of the first vibration structure 110 and the second vibration structure 130 may increase or may be maximized, thereby enhancing a sound pressure level characteristic of a sound and a sound characteristic of a middle-low-pitched sound band generated based on a vibration(s) of the first vibration structure 110 and/or the second vibration structure 130. Also, a first sound wave SW1 generated based on a vibration of the first vibration structure 110 and a second sound wave SW2 generated based on a vibration of the second vibration structure 110 may be output to overlap. Therefore, the vibration apparatus may output a sound having a directivity or a directional angle based on overlapping of the first sound wave SW1 and the second sound SW2. For example, an overlap region between the first sound wave SW1 and the second sound wave SW2 may be an audible region which enables a user to listen to a sound, and a non-overlap region between the first sound wave SW1 and the second sound wave SW2 may be an inaudible region which disables a user to listen to a sound. For example, the first sound wave SW1 may have a directivity or a directional angle based on the second wave SW2.

In the vibration apparatus according to another embodiment of the present disclosure, the second vibration structure 130 may overlap or may be stacked on the first vibration structure 110 in a state which is vertically reversed or vertically turned, and thus, a first signal transfer line STL1 and a second signal transfer line STL2 of the flexible cable FC connected to the second amplifier 173 may be connected to the second vibration structure 130 without changing a position.

In the vibration apparatus according to another embodiment of the present disclosure, the second vibration structure 130 may overlap or may be stacked on the first vibration structure 110 in a state which is not vertically reversed. In this case, in order to vibrate the first vibration structure 110 and the second vibration structure 120 in the same direction, the first signal transfer line STL1 and the second signal transfer line STL2 may be disposed to intersect in the flexible cable FC, or the second amplifier 173 may be disposed so that the first output terminal T21 is connected to the second signal transfer line STL2 and the second output terminal T22 is connected to the first signal transfer line STL1.

In FIGS. 14 and 15, the first polarity signal of the first vibration driving signal may be supplied to the first electrode layer 113*b* of the first vibration structure 110, the second polarity signal of the first vibration driving signal may be supplied to the second electrode layer 113*c* of the first vibration structure 110, the first polarity signal of the second vibration driving signal may be supplied to the first electrode layer 113*b* of the second vibration structure 130, and the second polarity signal of the second vibration driving signal may be supplied to the second electrode layer 113*c* of the second vibration structure 130. In this case, the first vibration structure 110 and the second vibration structure 130 may vibrate in an opposite direction. For example, when the first vibration structure 110 expands, the second vibration structure 130 may contract, and thus, a vibration of the first vibration structure 110 and a vibration of the second vibration structure 120 may be offset therebetween, whereby the vibration apparatus may not vibrate.

Figure 16:
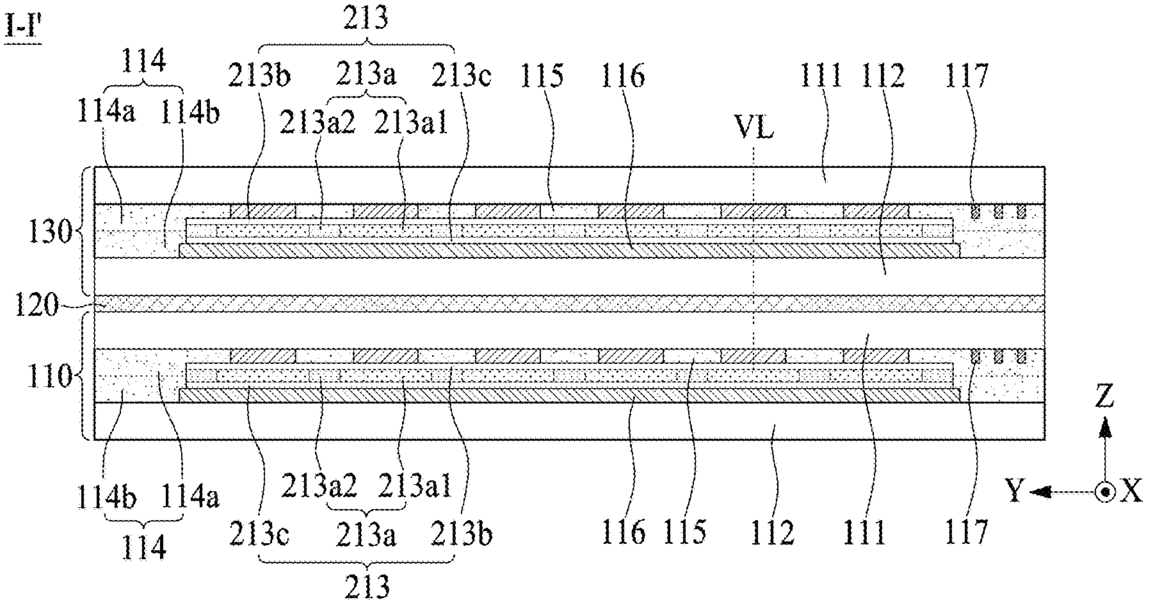
FIG. 16 is another cross-sectional view taken along line I-I' illustrated in FIG. 1.
Figure 17:
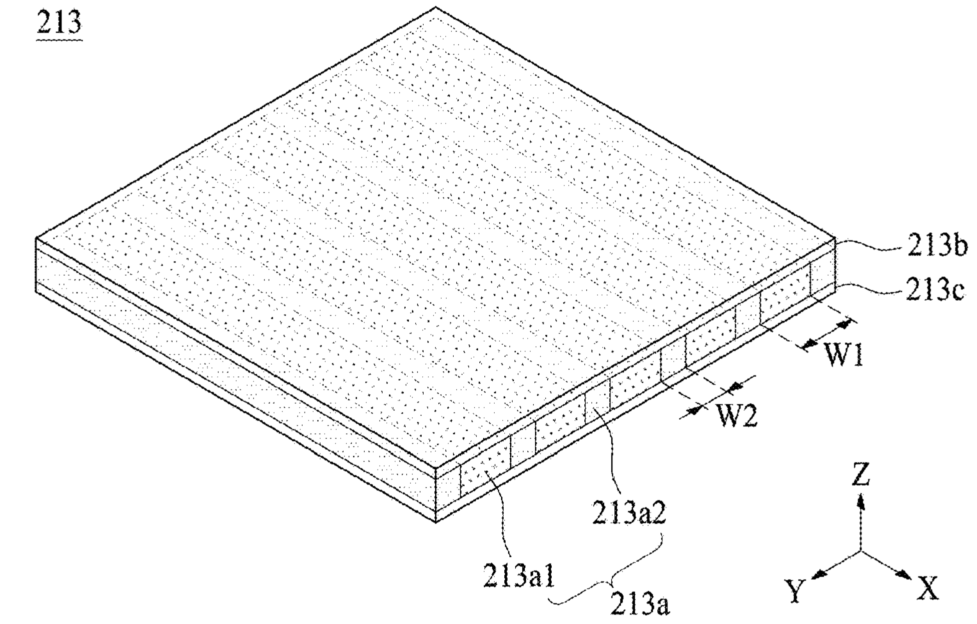
FIG. 17 illustrates a vibration generating part illustrated in FIG. 16.
Figure 18:
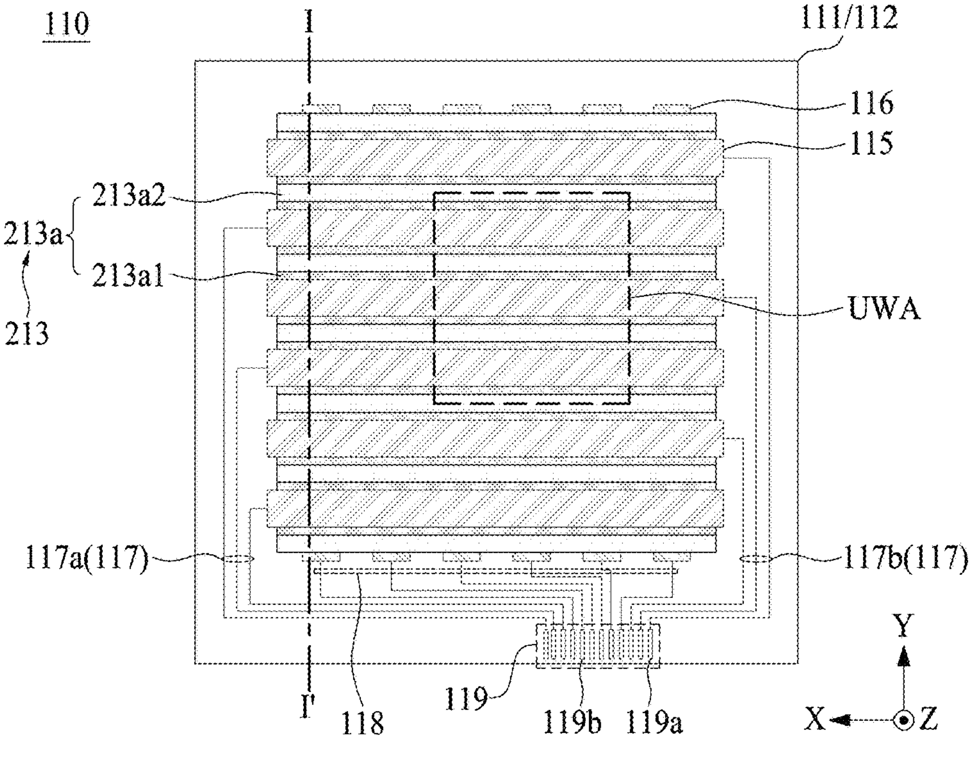
FIG. 18 is a plan view illustrating a first vibration structure illustrated in FIG. 16.
Figure 19:
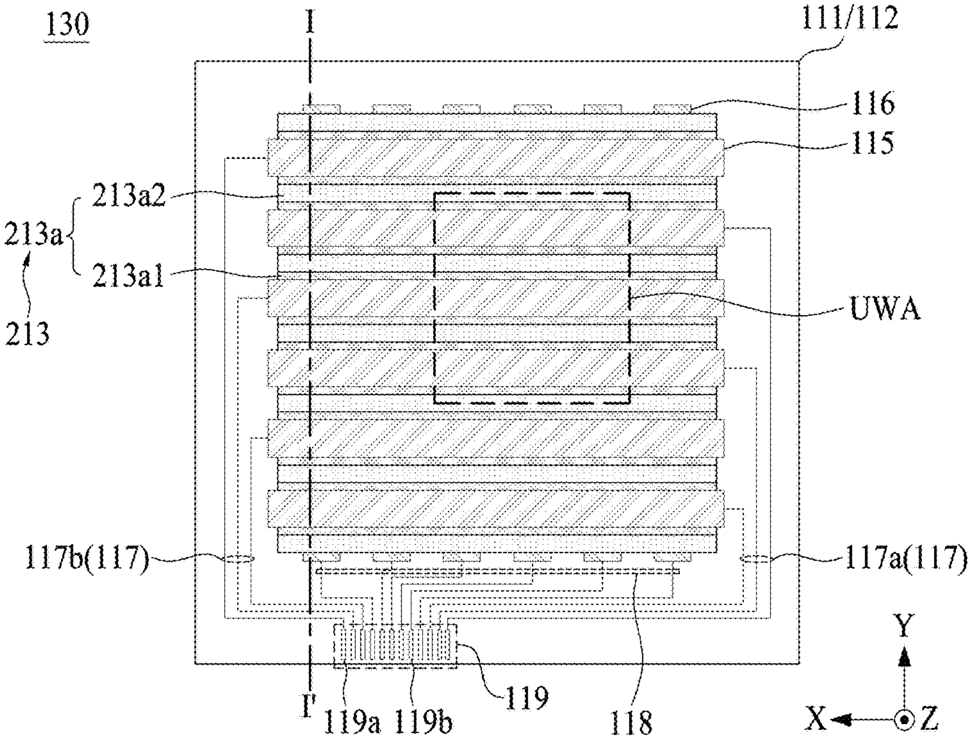
FIG. 19 is a plan view illustrating a second vibration structure illustrated in FIG. 16.

FIG. 16 is another cross-sectional view taken along line I-I' illustrated in FIG. 1, FIG. 17 illustrates a vibration generating part illustrated in FIG. 16, FIG. 18 is a plan view illustrating a first vibration structure illustrated in FIG. 16, and FIG. 19 is a plan view illustrating a second vibration structure illustrated in FIG. 16. A cross-sectional view of each of the first and second vibration structures taken along line I-I' illustrated in FIGS. 18 and 19 is illustrated in FIG. 16.

With reference to FIGS. 1, and 16 to 18, the vibration apparatus according to another embodiment of the present disclosure may include a first vibration structure 110 and a second vibration structure 130 stacked on the first vibration structure 110.

The first vibration structure 110 according to another embodiment of the present disclosure may include a first base member 111, a second base member 112, and a vibration generating part 213.

Each of the first base member 111 and the second base member 112 may be the same as the each of the first base member 111 and the second base member 112 described above with reference to FIG. 2, and thus, like reference numerals refer to like elements and their repetitive descriptions may be omitted.

The vibration generating part (or a first vibration generating portion) 213 may be disposed or interposed between the first base member 111 and the second base member 112.

The vibration generating part 213 according to an embodiment of the present disclosure may include a piezoelectric material, a composite piezoelectric material, or an electroactive material which has a piezoelectric effect. The vibration generating part 213 may include an inorganic material and an organic material. For example, the vibration generating part 213 may include a plurality of inorganic material portion configured as a piezoelectric material and at least one organic material portion configured as a flexible material. For example, the vibration generating part 213 may be referred to as a piezoelectric vibration portion, a piezoelectric composite layer, a piezoelectric composite, or a piezoelectric ceramic composite, or the like, but embodiments of the present disclosure are not limited thereto.

The vibration generating part 213 according to an embodiment of the present disclosure may include a plurality of inorganic material portions 213*a*1 and a plurality of flexible portions 213*a*2.

Each of the plurality of inorganic material portions (or a plurality of first portions) 213*a*1 may be referred to as a vibration layer, a piezoelectric layer, a piezoelectric material layer, an electroactive layer, a piezoelectric vibration portion, a piezoelectric material portion, or an electroactive portion, or the like, but embodiments of the present disclosure are not limited thereto.

Each of the plurality of flexible portions (or a plurality of second portions) 213*a*2 may be referred to as an organic material portion, an adhesive portion, an elastic portion, a bending portion, or a damping portion, or the like, but embodiments of the present disclosure are not limited thereto.

The plurality of inorganic material portions 213*a*1 and the plurality of flexible portions 213*a*2 may be alternately and repeatedly arranged in a first direction X (or a second direction Y). For example, each of the plurality of inorganic material portions 213*a*1 and the plurality of flexible portions 213*a*2 may be disposed (or arranged) on the same plane (or the same layer) in parallel.

Each of the plurality of inorganic material portions (or a plurality of first portions) 213*a*1 may include the same material as the vibration portion 113*a* of each of the plurality of vibration generating parts described above with reference to FIG. 3, and thus, their repetitive descriptions may be omitted.

Each of the plurality of inorganic material portions 213*a*1 may have a first width W1 parallel to the first direction X (or the second direction Y) and a length parallel to the second direction Y (or the first direction X). For example, each of the plurality of inorganic material portions 213*a*1 may include a line shape or a stripe shape which is extended long along the first direction X (or the second direction Y). For example, each of the plurality of inorganic material portions 213*a*1 may be disposed between the plurality of flexible portions 213*a*2.

The plurality of flexible portions 213*a*2 may be disposed (or arranged) parallel to each other with the plurality of inorganic material portions 213*a*1 therebetween. For example, the plurality of flexible portions 213*a*2 may have a second width W2 parallel to the first direction X (or the second direction Y) and a length parallel to the second direction Y (or the first direction X). The first width W1 may be the same as or different from the second width W2. Each of the plurality of flexible portions 213*a*2 may have the same size, for example, the same width, area, or volume. For example, each of the plurality of flexible portions 213*a*2 may have the same size (for example, the same width, area, or volume) within a process error range occurring in a manufacturing process. For example, the first width W1 may be greater than the second width W2. For example, the inorganic material portion 213*a*1 and the flexible portion 213*a*2 may include a line shape or a stripe shape which has the same size or different sizes. Therefore, the vibration generating part 213 may include the plurality of inorganic material portions 213*a*1 having a 2-2 type composite structure and thus may have a resonance frequency of an inaudible frequency band as well as an audible frequency, but embodiments of the present disclosure are not limited thereto. For example, a resonance frequency of the vibration generating part 213 may vary based on one or more of a length and a thickness of the inorganic material portion 213*a*1.

Each of the plurality of flexible portions (or a plurality of second portions) 213*a*2 may be configured to fill a gap between adjacent inorganic material portions 213*a*1. Each of the plurality of flexible portions 213*a*2 may be connected to or attached to adjacent inorganic material portions 213*a*1. Each of the plurality of flexible portion 213*a*2 may be configured to fill a gap between two adjacent inorganic material portions 213*a*1 and may be directly connected or directly attached to adjacent inorganic material portions 213*a*1. Thus, the vibration generating part 213 may extend by a desired size or length based on the side coupling (or connection) of the inorganic material portion 213*a*1 and the flexible portion 213*a*2.

The flexible portion 213*a*2 may have modulus and viscoelasticity that are lower than those of the inorganic material portion 213*a*1. The flexible portion 213*a*2 may enhance the reliability of the inorganic material portion 213*a*1 vulnerable to an impact due to a fragile characteristic. Therefore, in the vibration generating part 213, vibration energy by a link in a unit lattice of the inorganic material portion 213*a*1 may increase by the flexible portion 213*a*2, and thus, a vibration may increase, and a piezoelectric characteristic and flexibility may be secured.

The flexible portion 213*a*2 according to an embodiment of the present disclosure may be configured as a material having a loss coefficient of about 0.01 to about 1.0 and modulus of about 0.1 [GPa] to about 10 [GPa]. For example, the flexible portion 213*a*2 may include one or more of an epoxy-based polymer, an acrylic-based polymer, and a silicone-based polymer, but embodiments of the present disclosure are not limited thereto.

The flexible portion 213*a*2 according to an embodiment of the present disclosure may include one or more of an organic material, an organic polymer, an organic piezoelectric material, and an organic non-piezoelectric material that has a flexible characteristic in comparison with the inorganic material portion 213*a*1.

The flexible portion 213*a*2 including an organic piezoelectric material may absorb an impact applied to the inorganic material portion 213*a*1, and thus may enhance the total durability of the vibration apparatus, and may provide a piezoelectric characteristic corresponding to a certain level or more. The organic piezoelectric material according to an embodiment of the present disclosure may be an organic material having an electroactive characteristic. For example, the organic piezoelectric material of the flexible portion 213*a*2 may include at least one or more of polyvinylidene fluoride (PVDF), β-polyvinylidene fluoride (β-PVDF), and polyvinylidene-trifluoroethylene (PVDF-TrFE), but embodiments of the present disclosure are not limited thereto. For example, the flexible portion 213*a*2 including an organic non-piezoelectric material may include an adhesion promoter for adhesiveness between epoxy resin or silicone resin and the inorganic material portion 213*a*1, for a high stiffness characteristic needed for the vibration apparatus. For example, the adhesion promoter may be phosphate-based or the like, but embodiments of the present disclosure are not limited thereto.

The flexible portion 213*a*2 including the organic non-piezoelectric material may further include a reinforcing agent for a damping characteristic in addition to high stiffness of the vibration apparatus. For example, the reinforcing agent may be methylmethacrylate-butadiene-styrene (MBS) having a core shell type or the like, and a content thereof may be about 5 wt % to about 40 wt %. The reinforcing agent may be an elastic body having the core cell type, and may have a high coupling force to epoxy resin, such as an acrylic-based polymer, and thus, the reinforcing agent may enhance an impact resistance or a damping characteristic of the vibration apparatus.

The first electrode layer 213*b* may be disposed at a first surface (or an upper surface) of the vibration generating part 213. For example, the first electrode layer 213*b* may be disposed between the first surface of the vibration generating part 213 and the first base member 111. Except for that the first electrode layer 213*b* is disposed at the first surface of each of the plurality of inorganic material portions 213*a*1 and the first surface of each of the plurality of flexible portion 213*a*2 in common and is electrically connected to the first surface of each of the plurality of inorganic material portions 213*a*1, the first electrode layer 213*b* may be the same as the first electrode layer 113*b* described above with reference to FIG. 3, and thus, its repetitive description may be omitted.

The second electrode layer 213*c* may be disposed at a second surface (or a rear surface) of the vibration generating part 213. For example, the second electrode layer 213*c* may be disposed between the second surface of the vibration generating part 213 and the second base member 112. Except for that second electrode layer 213*c* is disposed at the second surface of each of the plurality of inorganic material portions 213*a*1 and the second surface of each of the plurality of flexible portion 213*a*2 in common and is electrically connected to the second surface of each of the plurality of inorganic material portions 213*a*1, the second electrode layer 213*c* may be the same as the second electrode layer 113*c* described above with reference to FIG. 3, and thus, its repetitive description may be omitted.

Each of a plurality of inorganic material portions 213*a*1 provided in the vibration generating part 213 may be polarized (or polling) by a certain voltage applied to a first electrode layer 213*b* and a second electrode layer 213*c* in a certain temperature atmosphere or a temperature atmosphere which is changed from a high temperature to a room temperature, but embodiments of the present disclosure are not limited thereto. For example, the vibration generating part 213 may alternately and repeatedly contract and expand based on a piezoelectric effect based on a vibration driving signal applied from the outside to the first electrode layer 213*b* and the second electrode layer 213*c*. For example, the vibration generating part 213 may vibrate based on a vibration $d_{33}$ in a vertical direction Z and a vibration $d_{31}$ in a planar direction (or a horizontal direction) (X, Y) by the first electrode unit 211*b* and the second electrode unit 211*c*. For example, a polarization direction of each of the plurality of inorganic material portions 213*a*1 may be formed from the first electrode layer 213*b* to the second electrode layer 213*c* as illustrated in FIGS. 13 and 14, or may be formed from the second electrode layer 213*c* to the first electrode layer 213*b* as illustrated in FIGS. 12 and 15.

When each of the plurality of flexible portions 213*a*2 provided in the vibration generating part 213 is included in an organic piezoelectric material, the organic piezoelectric material may be polarized (or poled) by a certain voltage applied to the first electrode layer 213*b* and the second electrode layer 213*c* in a certain temperature atmosphere or a temperature atmosphere which is changed from a high temperature to a room temperature, but embodiments of the present disclosure are not limited thereto. For example, a polarization direction of the organic piezoelectric material may be formed from the first electrode layer 213*b* to the second electrode layer 213*c* as illustrated in FIGS. 13 and 14, or may be formed from the second electrode layer 213*c* to the first electrode layer 213*b* as illustrated in FIGS. 12 and 15.

The first vibration structure 110 according to an embodiment of the present disclosure may further include an adhesive layer 114 which is disposed between the first base member 111 and the second base member 112 to surround side surfaces (or sidewalls) of the vibration generating part 113.

The adhesive layer 114 may opposite-bond the first base member 111 to the second base member 112 with the vibration generating part 213 therebetween. The adhesive layer 114 may be disposed in a region, other than the vibration generating part 213, of a region between the first base member 111 and the second base member 112. The adhesive layer 114 may be substantially the same as the adhesive layer 114 described above with reference to FIGS. 3 and 4, and thus, like reference numerals refer to like elements and their repetitive descriptions may be omitted.

The first vibration structure 110 according to an embodiment of the present disclosure may further include a plurality of first power supply electrodes 115 and a plurality of second power supply electrodes 116.

Each of the plurality of first power supply electrodes 115 may be disposed between the vibration generating part 213 and the first base member 111 and may be electrically connected to the first electrode layer 213*b* of the vibration generating part 213. Except for that each of the plurality of first power supply electrodes 115 is disposed at a second surface of the first base member 111 to overlap each of the plurality of inorganic material portions 2131*a* and is electrically connected to the first electrode layer 213*b* of the vibration generating part 213, each of the plurality of first power supply electrodes 115 may be the same as each of the plurality of first power supply electrodes 115 described above with reference to FIGS. 3 and 4, and thus, like reference numerals refer to like elements and their repetitive descriptions may be omitted.

According to an embodiment of the present disclosure, each of the plurality of first power supply electrodes 115 may be electrically connected to the first electrode layer 213*b* of the vibration generating part 213 by an anisotropic conductive film. According to another embodiment of the present disclosure, each of the plurality of first power supply electrodes 115 may be electrically connected to the first electrode layer 213*b* of the vibration generating part 213 by a conductive material (or particle) included in the adhesive layer 114 or the first adhesive layer 114*a*, instead of the anisotropic conductive film.

Each of the plurality of second power supply electrodes 116 may be disposed between the vibration generating part 213 and the second base member 112 and may be electrically connected to the second electrode layer 213*c* of the vibration generating part 213. Except for that each of the plurality of second power supply electrodes 116 is disposed at a first surface of the second base member 112 to cross each of the plurality of inorganic material portions 2131*a* and is disposed at the second electrode layer 213*c* of the vibration generating part 213, each of the plurality of second power supply electrodes 116 may be the same as each of the plurality of second power supply electrodes 116 described above with reference to FIGS. 3 and 4, and thus, like reference numerals refer to like elements and their repetitive descriptions may be omitted.

According to an embodiment of the present disclosure, each of the plurality of second power supply electrodes 116 may be electrically connected to the second electrode layer 213*c* of the vibration generating part 213 by an anisotropic conductive film. According to another embodiment of the present disclosure, each of the plurality of second power supply electrodes 116 may be electrically connected to the second electrode layer 213*c* of the vibration generating part 213 by a conductive material (or particle) included in the adhesive layer 114 or the second adhesive layer 114*b*, instead of the anisotropic conductive film.

The first vibration structure 110 according to an embodiment of the present disclosure may include a plurality of first power supply lines 117, a plurality of second power supply lines 118, and a pad part 119.

The plurality of first power supply lines 117, the plurality of second power supply lines 118, and the pad part 119 may respectively be the same as the plurality of first power supply lines 117, the plurality of second power supply lines 118, and the pad part 119 described above with reference to FIGS. 3 and 4, and thus, like reference numerals refer to like elements and their repetitive descriptions may be omitted.

The first vibration structure 110 according to an embodiment of the present disclosure may further include a flexible cable FC electrically connected to the pad part 119. The flexible cable FC may be the same as the flexible cable FC described above with reference to FIGS. 3 and 4, and thus, like reference numerals refer to like elements and their repetitive descriptions may be omitted.

With reference to FIGS. 1, 3, 16, 17, and 19, the second vibration structure 130 according to an embodiment of the present disclosure may include a first base member 111, a second base member 112, and a vibration generating part 213. The first base member 111, the second base member 112, and the vibration generating part 213 may respectively be the same as the first base member 111, the second base member 112, and the vibration generating part 213 described above with reference to FIGS. 16 to 18, and thus, like reference numerals refer to like elements and their repetitive descriptions may be omitted or will be briefly given below.

The vibration generating part 213 of the first vibration structure 110 and the vibration generating part 213 of the second vibration structure 130 may overlap or may be stacked on each other to be displaced in the same direction. For example, the plurality of inorganic material portions 213*a*1 provided in the vibration generating part 213 of the second vibration structure 130 may overlap or may be stacked on the plurality of inorganic material portions 213*a*1 provided in the vibration generating part 213 of the first vibration structure 110 without being staggered, respectively.

According to an embodiment of the present disclosure, each of the plurality of inorganic material portions **213*a*1 provided in each of the first vibration structure 110 and the second vibration structure 130 may have the same size within an error range of a manufacturing process. As an embodiment of the present disclosure, with respect to a first direction X or a second direction Y, a center portion of each of the plurality of inorganic material portions 213*a*1 provided in the second vibration structure 130 and a center portion of each of the plurality of inorganic material portions 213*a*1 provided in the first vibration structure 110 may be aligned or disposed at a virtual extension line VL which extends in a thickness direction Z of the vibration apparatus. As another embodiment of the present disclosure, an end of each of the plurality of inorganic material portions 213*a*1 provided in the second vibration structure 130 and an end of each of the plurality of inorganic material portions 213*a*1 provided in the first vibration structure 110** may be aligned or disposed at the virtual extension line VL.

The vibration generating part 213 of the second vibration structure 130 and the vibration generating part 213 of the first vibration structure 110 may be displaced (or driven) in the same direction and may overlap or may be stacked on each other without being staggered, and thus, an amplitude displacement of each of the first vibration structure 110 and the second vibration structure 130 may be maximized. Therefore, a sound pressure level characteristic of a sound and a sound characteristic of a middle-low-pitched sound band generated based on displacements of the first vibration structure 110 and the second vibration structure 130 may be enhanced.

The second vibration structure 130 according to an embodiment of the present disclosure may further include an adhesive layer 114 which is disposed between the first base member 111 and the second base member 112 to surround side surfaces (or sidewalls) of the vibration generating part 213, a plurality of first power supply electrodes 115 which are electrically connected to the first electrode layer **213*b* of the vibration generating part 213, a plurality of first power supply lines 117 which are electrically and respectively connected to the plurality of first power supply electrodes 115, a plurality of second power supply electrodes 116 which are electrically connected to the second electrode layer 213*c* of the vibration generating part 213, a plurality of second power supply lines 118 which are electrically and respectively connected to the plurality of second power supply electrodes 116, a pad part 119 which is electrically connected to each of the plurality of first power supply lines 117 and the plurality of second power supply lines 118, and a flexible cable FC which is electrically connected to the pad part 119. Added elements of the second vibration structure 130 may be as described above with reference to FIGS. 3 and 5**, and thus, like reference numerals refer to like elements and their repetitive descriptions may be omitted.

As described above, in the vibration apparatus according to another embodiment of the present disclosure, the first vibration structure 110 and the second vibration structure 130 including the vibration generating part 213 having a 2-2 type composite structure and flexibility may overlap or may be stacked to vibrate in the same direction, and thus, like the vibration apparatus illustrated in FIGS. 1 to 5, the vibration apparatus may output a sound having a directivity or a directional angle, vary a directivity direction of a sound and/or a directional angle of a sound, output a sound having a minimal directional angle (or a directivity), and enhance each of a vibration characteristic, a reliability characteristic, and a sound output characteristic.

Figure 20:
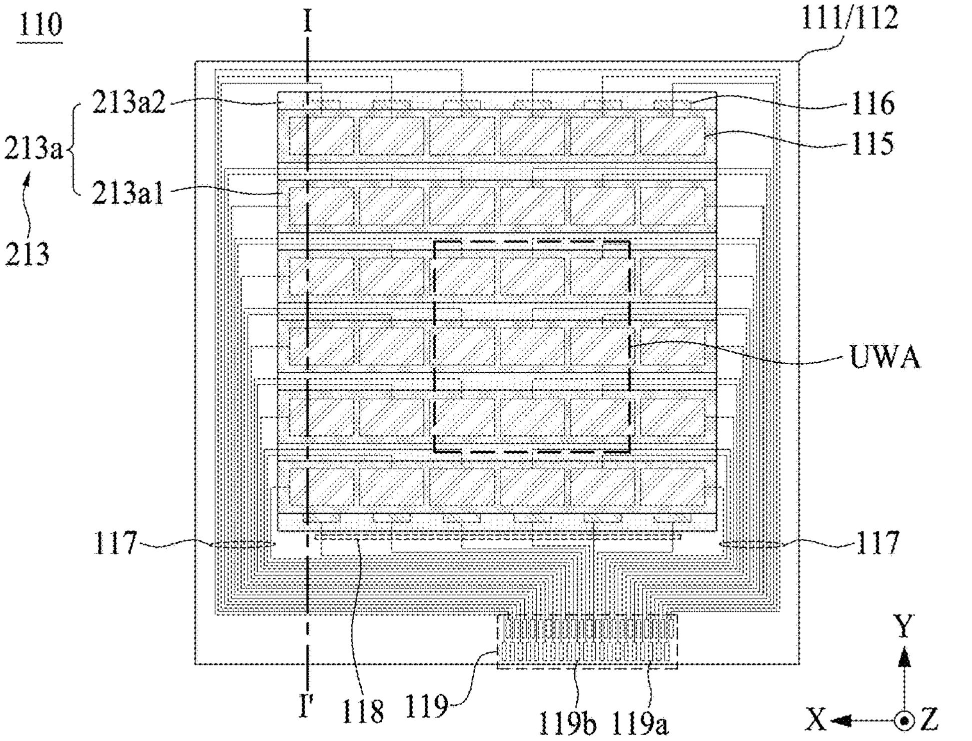
FIG. 20 is a plan view illustrating a first vibration structure according to another embodiment of the present disclosure illustrated in FIG. 18.

In FIG. 18, the plurality of first power supply electrodes 115 provided in the first vibration structure 110 may be spaced apart from one another in the first direction X and the second direction Y to respectively overlap the plurality of inorganic material portions **213*a*1 as illustrated in FIG. 20. Each of the plurality of first power supply electrodes 115 may be substantially the same as descriptions of FIGS. 3 and 8**, and thus, like reference numerals refer to like elements and their repetitive descriptions may be omitted.

Each of plurality of first power supply electrodes 115 illustrated in FIG. 20 may be electrically connected to the plurality of first power supply lines 117 in a one-to-one relationship. Each of the plurality of first power supply lines 117 may be substantially the same as descriptions of FIGS. 3 and 8, and thus, like reference numerals refer to like elements and their repetitive descriptions may be omitted.

Figure 21:
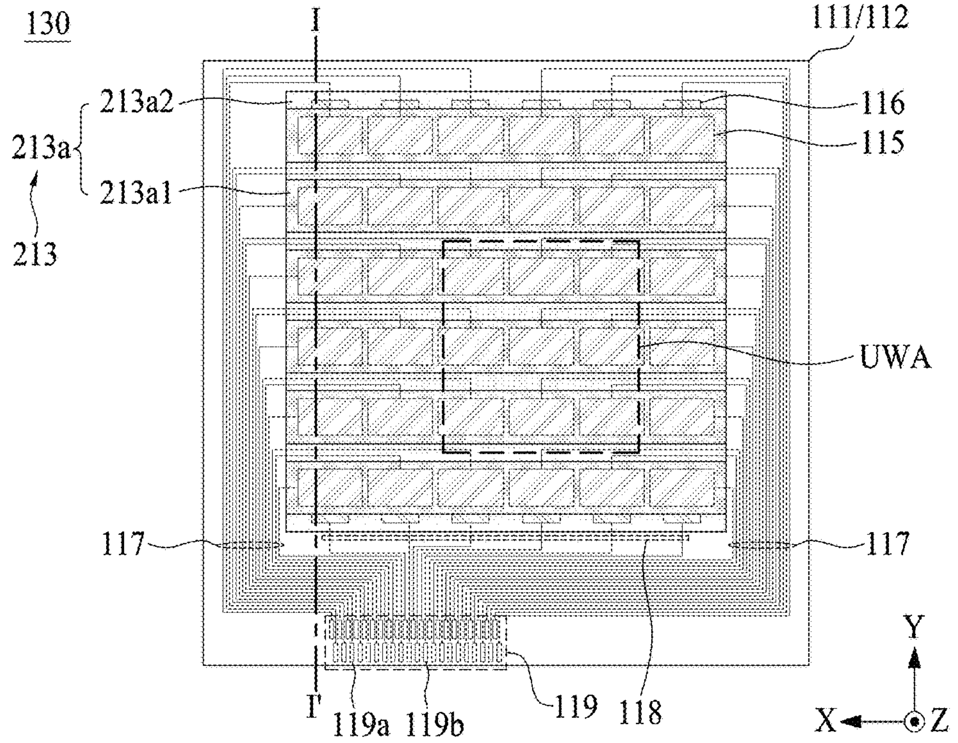
FIG. 21 is a plan view illustrating a second vibration structure according to another embodiment of the present disclosure illustrated in FIG. 19.

In FIG. 18, the plurality of first power supply electrodes 115 provided in the second vibration structure 130 may be spaced apart from one another in the first direction X and the second direction Y to respectively overlap the plurality of inorganic material portions **213*a*1 as illustrated in FIG. 21. Each of the plurality of first power supply electrodes 115 may be substantially the same as descriptions of FIGS. 3 and 9**, and thus, like reference numerals refer to like elements and their repetitive descriptions may be omitted.

Each of the plurality of first power supply electrodes 115 illustrated in FIG. 21 may be electrically connected to the plurality of first power supply lines 117 in a one-to-one relationship. Each of the plurality of first power supply lines 117 may be substantially the same as descriptions of FIGS. 3 and 9, and thus, like reference numerals refer to like elements and their repetitive descriptions may be omitted.

As described above, the vibration apparatus including the first vibration structure 110 and the second vibration structure 130 according to another embodiment of the present disclosure may generate a sound wave based on an individual vibration of each of a plurality of vibration generating regions where the plurality of inorganic material portions **213*a*1 provided in the vibration generating part 213 overlap the plurality of first power supply electrodes 115**, respectively.

Figure 22:
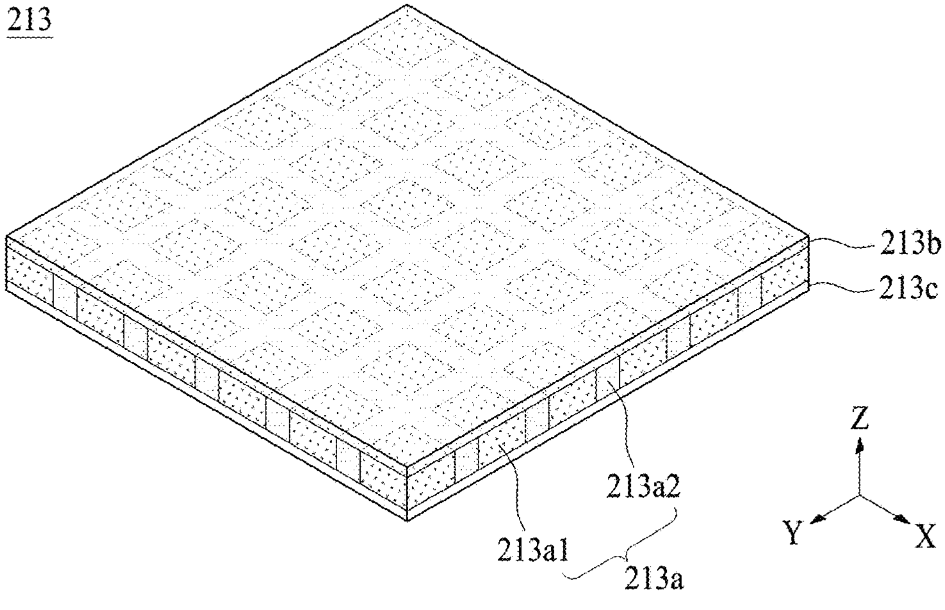
FIG. 22 illustrates a vibration generating part according to another embodiment of the present disclosure illustrated in FIG. 16.

FIG. 22 illustrates a vibration generating part according to another embodiment of the present disclosure illustrated in FIG. 16.

With reference to FIG. 22, a vibration generating part 213 of each of a first vibration structure 110 and a second vibration structure 130 according to another embodiment of the present disclosure may include a plurality of inorganic material portions **213*a*1 and a flexible portion 213*a*2 disposed between the plurality of inorganic material portions 213*a*1**.

The plurality of inorganic material portions **213*a*1 may be disposed spaced apart from one another in each of a first direction X and a second direction Y. For example, each of the plurality of inorganic material portions 213*a*1 may be arranged in a lattice shape to have a hexahedral shape having the same size. Each of the plurality of inorganic material portions (or a plurality of first portions) 213*a*1 may include the same material as the vibration portion 113*a* of each of the plurality of vibration generating parts described above with reference to FIG. 3 or may include the same material as each of the plurality of inorganic material portions 213*a*1 described above with reference to FIGS. 16 and 17**, and thus, their repetitive descriptions may be omitted.

The vibration generating part 213 may include a plurality of inorganic material portions 213*a*1 having a 1-3 type composite structure and may have a resonance frequency of an inaudible frequency band as well as an audible frequency, but embodiments of the present disclosure are not limited thereto. For example, a resonance frequency of the vibration generating part 213 may vary based on one or more of a length and a thickness of each of the inorganic material portions 213*a*1.

The flexible portion 213*a*2 may be disposed between the plurality of inorganic material portions 213*a*1 in each of the first direction X and the second direction Y. The flexible portion 213*a*2 may be configured to fill a gap between adjacent inorganic material portions 213*a*1 or to surround each of the inorganic material portions 213*a*1, and thus, may be connected to or attached on an adjacent inorganic material portion 213*a*1. According to an embodiment of the present disclosure, a width of the flexible portion 213*a*2 disposed between two inorganic material portions 213*a*1 adjacent to each other in the first direction X may be the same as or different from the inorganic material portion 213*a*1. A width of the flexible portion 213*a*2 disposed between two inorganic material portions 213*a*1 adjacent to each other in the second direction Y may be the same as or different from the inorganic material portion 213*a*1. The flexible portion 213*a*2 may include the same material as the flexible portion 213*a*2 described above with reference to FIGS. 16 and 17, and thus, like reference numerals refer to like elements and their repetitive descriptions may be omitted.

Each of the plurality of inorganic material portions 213*a*1 provided in the vibration generating part 213 of the first vibration structure 110 and each of the plurality of inorganic material portions 213*a*1 provided in the vibration generating part 213 of the second vibration structure 130 may overlap or may be stacked on each other without being staggered to vibrate in the same direction, and thus, an amplitude displacement of each of the first vibration structure 110 and the second vibration structure 130 may be maximized. Therefore, a sound pressure level characteristic of a sound and a sound characteristic of a middle-low-pitched sound band generated based on an amplitude displacement of each of the first vibration structure 110 and the second vibration structure 130 may be enhanced. Also, like the vibration apparatus illustrated in FIGS. 1 to 5, the vibration apparatus including the vibration generating part 213 according to another embodiment of the present disclosure may output a sound having a directivity or a directional angle, vary a directivity direction of a sound and/or a directional angle of a sound, output a sound having a minimal directional angle (or a directivity), and enhance each of a vibration characteristic, a reliability characteristic, and a sound output characteristic.

The vibration generating part 213 according to another embodiment of the present disclosure illustrated in FIG. 22 may be applied to at least one or more of the first vibration structure 110 illustrated in FIG. 18, the second vibration structure 130 illustrated in FIG. 19, the first vibration structure 110 illustrated in FIG. 20, and the second vibration structure 130 illustrated in FIG. 21. For example, at least one or more of the vibration generating part 213 illustrated in FIGS. 18 to 21 may be replaced by the vibration generating part 213 illustrated in FIG. 22. For example, some of the vibration generating part 213 illustrated in FIGS. 18 to 21 may be replaced to the vibration generating part 213 illustrated in FIG. 22. For example, the vibration generating part 213 of the second vibration structures 130 illustrated in FIGS. 18 to 21 may be replaced by the vibration generating part 213 illustrated in FIG. 22.

In the vibration generating part 213 according to another embodiment of the present disclosure applied to FIGS. 20 and 21, a plurality of first power supply electrodes 115 may be spaced apart from one another in each of a first direction X and a second direction Y to respectively overlap a plurality of inorganic material portions 213*a*1. The plurality of first power supply electrodes 115 may be electrically and respectively connected to a plurality of first power supply lines 117 in a one-to-one relationship. Therefore, the vibration generating part 213 according to another embodiment of the present disclosure may generate a sharp and accurate sound wave without noise caused by parasitic interference between the plurality of inorganic material portions 213*a*1 based on an individual vibration of each of the plurality of inorganic material portions 213*a*1.

Figure 23:
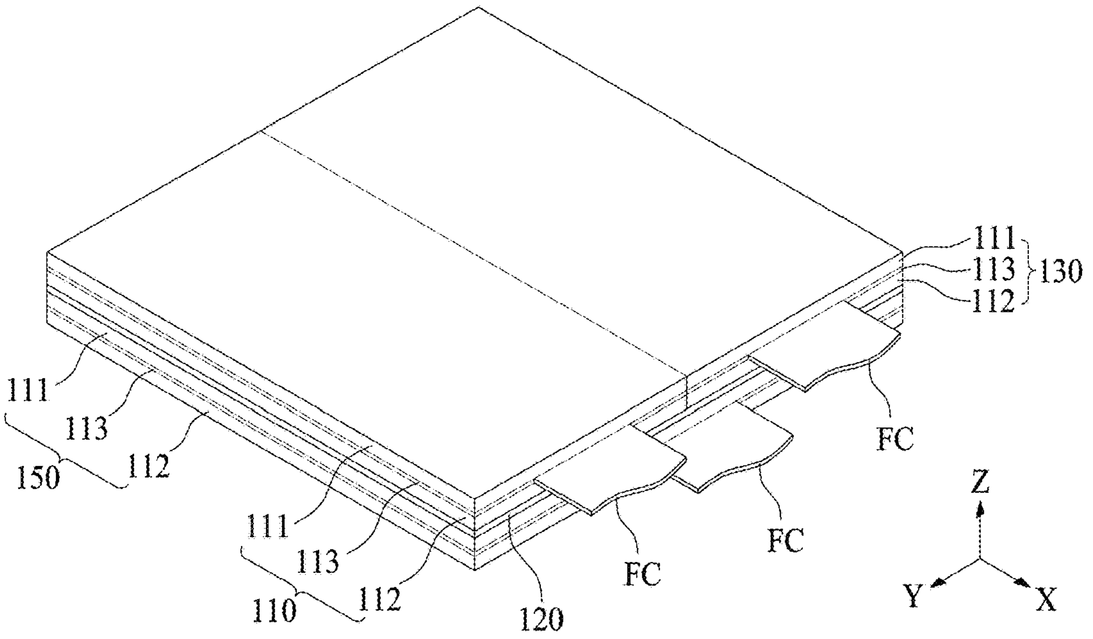
FIG. 23 illustrates a vibration apparatus according to another embodiment of the present disclosure.
Figure 24:
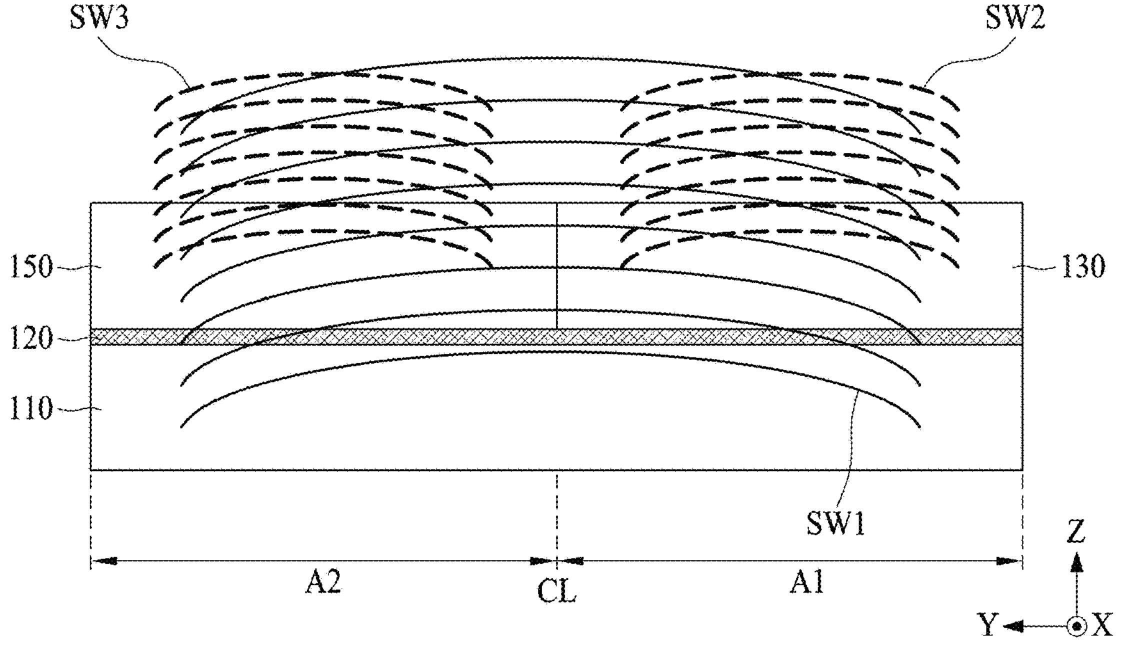
FIG. 24 illustrates a sound output of the vibration apparatus illustrated in FIG. 23.

FIG. 23 illustrates a vibration apparatus according to another embodiment of the present disclosure, and FIG. 24 illustrates a sound output of the vibration apparatus illustrated in FIG. 23.

With reference to FIGS. 23 and 24, the vibration apparatus according to another embodiment of the present disclosure may include a first vibration structure 110, a second vibration structure 130, and a third vibration structure 150.

The first vibration structure 110 may be a lower vibration structure, but embodiments of the present disclosure are not limited thereto. The second vibration structure 130 and the third vibration structure 150 may each be an upper vibration structure, but embodiments of the present disclosure are not limited thereto. For example, the second vibration structure 130 may be a first upper vibration structure and the third vibration structure 150 may be a second upper vibration structure, but embodiments of the present disclosure are not limited thereto.

The first vibration structure 110 may vibrate based on a first vibration driving signal supplied from a first amplifier of a vibration driving circuit to generate a first sound wave SW1. The first vibration structure 110 may be any one or more of the first vibration structures 110 described above with reference to FIGS. 1 to 22, and thus, their repetitive descriptions may be omitted or will be briefly given below.

The first vibration structure 110 may include a first region A1 and a second region A2.

The first region A1 may be between a center line CL and one side (or a first portion) of a first vibration structure 100 with respect to a first direction X. The second region A2 may be between the center line CL and the other side (or a second portion) of the first vibration structure 100 with respect to the first direction X. For example, the first region A1 may be a right region or a right half region of the first vibration structure 110. The second region A2 may be a left region or a left half region of the first vibration structure 110. For example, the first region A1 and the second region A2 of the first vibration structure 100 may be a left-right symmetrical with respect to the center line CL in the first direction X.

The second vibration structure 130 may overlap or may be stacked at the first region A1 of the first vibration structure 110. The second vibration structure 130 may be implemented to have a size corresponding to the first region A1 of the first vibration structure 110. The second vibration structure 130 may vibrate based on a second vibration driving signal supplied from a second amplifier of the vibration driving circuit to generate a second sound wave SW2. For example, the second sound wave SW2 may differ from the first sound wave SW1, but embodiments of the present disclosure are not limited thereto. Except for that the second vibration structure 130 has a size corresponding to the first region A1 of the first vibration structure 110, the second vibration structure 130 may be any one or more of the second vibration structures 130 described above with reference to FIGS. 1 to 22, and thus, their repetitive descriptions may be omitted or will be briefly given below.

The third vibration structure 150 may overlap or may be stacked at the second region A2 of the first vibration structure 110. The third vibration structure 150 may be implemented to have a size corresponding to the second region A2 of the first vibration structure 110. The third vibration structure 150 may vibrate based on a third vibration driving signal supplied from a third amplifier of the vibration driving circuit to generate a third sound wave SW3. For example, the third sound wave SW3 may differ from the second sound wave SW2, but embodiments of the present disclosure are not limited thereto. Except for that the third vibration structure 150 has a size corresponding to the second region A2 of the first vibration structure 110, the third vibration structure 150 may be any one or more of the second vibration structures 130 described above with reference to FIGS. 1 to 22, and thus, their repetitive descriptions may be omitted or will be briefly given below.

According to an embodiment of the present disclosure, each of the first sound wave, the second sound wave, and the third sound wave may be any one or more of an audible frequency, an ultrasonic wave of an inaudible frequency band without audible frequency, and an ultrasonic wave of an inaudible frequency band including an audible frequency.

According to an embodiment of the present disclosure, the first sound wave SW1 generated in the first vibration structure 110 may be an ultrasonic wave (or a reference ultrasonic wave) of an inaudible frequency band, the second sound wave SW2 generated in the second vibration structure 130 may be an ultrasonic wave (or a first sound ultrasonic wave) including an audible frequency, and the third sound wave SW3 generated in the third vibration structure 150 may be an ultrasonic wave (or a second sound ultrasonic wave) including an audible frequency which is the same as or different from the second sound SW2. For example, the first sound wave SW1 may correspond to first and second polarity signals of the first vibration driving signal. The second sound wave SW2 may correspond to a first polarity signal or a second polarity signal of the second vibration driving signal. The third sound wave SW3 may correspond to a first polarity signal or a second polarity signal of the third vibration driving signal. For example, the second sound wave SW2 and the third sound wave SW3 may have the same frequency (or a resonance frequency), or may have different frequencies.

Each of the second vibration structure 130 and the third vibration structure 150 may be coupled to a front surface (or an upper surface) of the first vibration structure 110 by an adhesive member 120, and thus, may overlap or stack with the first vibration structure 110.

In the vibration apparatus according to another embodiment of the present disclosure, the first to third vibration structures 110, 130, and 150 may be displaced (or driven or vibrated) in the same direction and may overlap or may be stacked on each other without being staggered, and thus, an amplitude displacement of each of the first to third vibration structures 110, 130, and 150 may be maximized. Accordingly, the vibration apparatus according to another embodiment of the present disclosure may output a sound having an enhanced sound pressure level characteristic of a middle-low-pitched sound band, or may output a sound having a directivity or a directional angle.

Moreover, as a beating phenomenon between the first to third sound waves SW1 to SW3 output based on vibrations of the first to third vibration structures 110, 130, and 150 occurs, the vibration apparatus according to another embodiment of the present disclosure may output a sound having a directivity or a directional angle in a specific direction. For example, an overlap region between the first sound wave SW1 and the second sound wave SW2 may form a first audible region which enables a user to listen to a sound, based on a beating phenomenon where an envelope of an audible frequency corresponding to a difference between the first sound wave SW1 and the second sound wave SW2 is formed. Also, an overlap region between the first sound wave SW1 and the third sound wave SW3 may form a second audible region which enables a user to listen to a sound, based on a beating phenomenon where an envelope of an audible frequency corresponding to a difference between the first sound wave SW1 and the third sound wave SW3 is formed. Accordingly, the vibration apparatus according to another embodiment of the present disclosure may output a sound having a directivity or a directional angle in a specific direction through the overlap region between the first sound wave SW1 and the second sound wave SW2 and the overlap region between the first sound wave SW1 and the third sound wave SW3.

In the vibration apparatus according to another embodiment of the present disclosure, the second vibration structure 130 may vibrate based on the first polarity signal of the second vibration driving signal to output the second sound SW2 and the third vibration structure 150 may vibrate based on the second polarity signal of the third vibration driving signal to output the third sound SW3, and thus, based on an envelope formed in the second region A2 of the first vibration structure 110, an audible region of the second region A2 of the first vibration structure 110 may be formed.

In the vibration apparatus according to another embodiment of the present disclosure, the second vibration structure 130 may vibrate based on the second polarity signal of the second vibration driving signal to output the second sound SW2 and the third vibration structure 150 may vibrate based on the first polarity signal of the third vibration driving signal to output the third sound SW3, and thus, based on an envelope formed in the first region A1 of the first vibration structure 110, an audible region of the first region A1 of the first vibration structure 110 may be formed.

Figure 25:
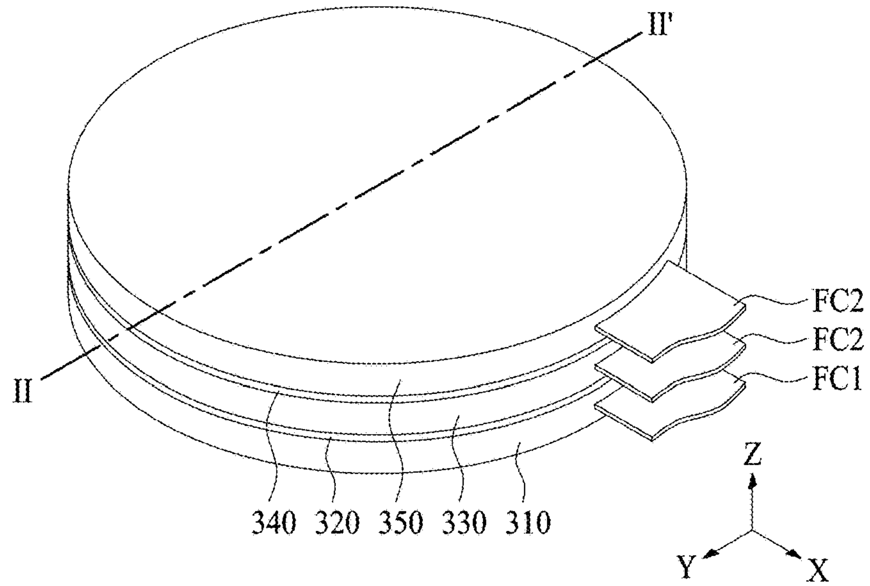
FIG. 25 illustrates a vibration apparatus according to another embodiment of the present disclosure.
Figure 26:
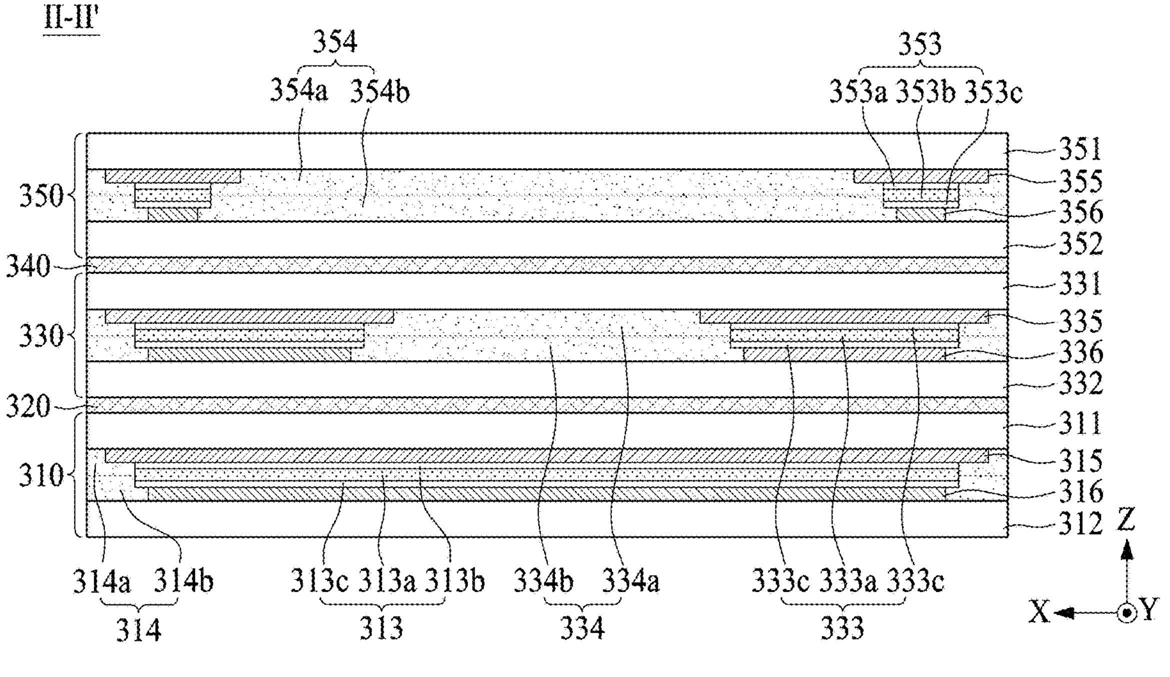
FIG. 26 is a cross-sectional view taken along line II-II' illustrated in FIG. 15.
Figure 27:
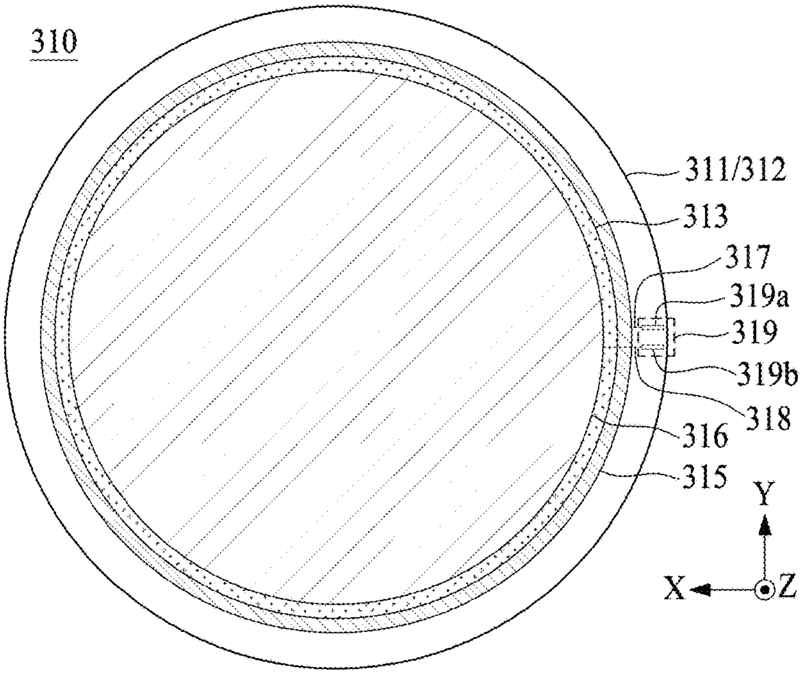
FIG. 27 illustrates a first vibration structure illustrated in FIGS. 25 and 26.
Figure 28:
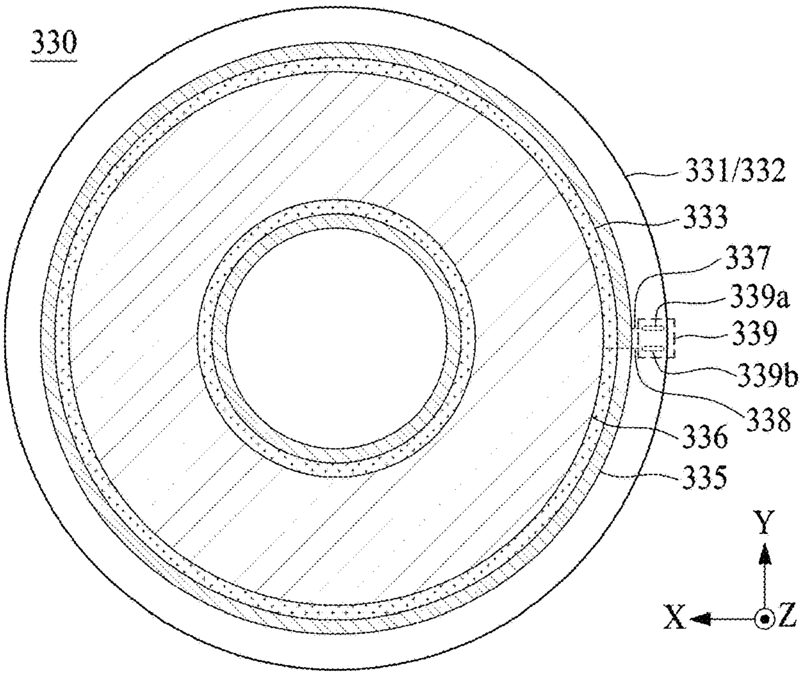
FIG. 28 illustrates a second vibration structure illustrated in FIGS. 25 and 26.
Figure 29:
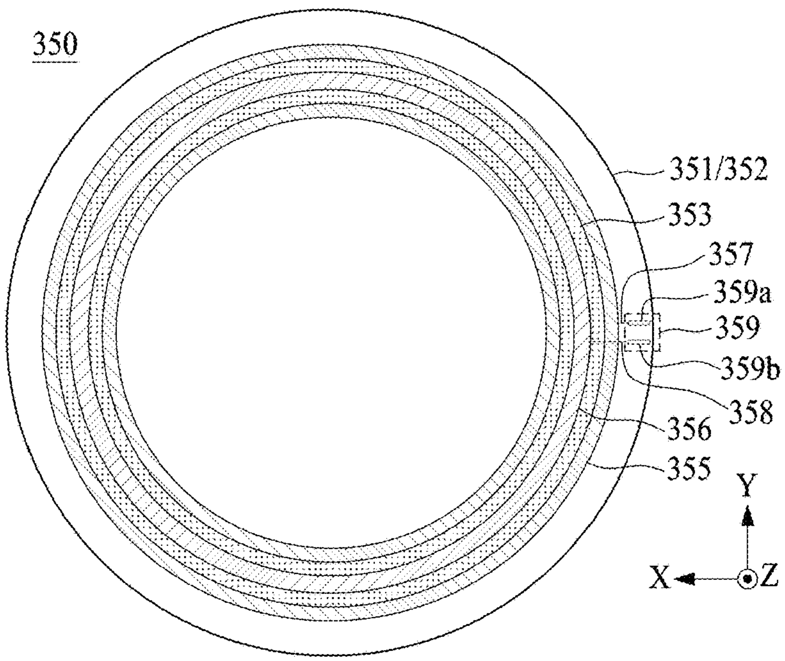
FIG. 29 illustrates a third vibration structure illustrated in FIGS. 25 and 26.

FIG. 25 illustrates a vibration apparatus according to another embodiment of the present disclosure, FIG. 26 is a cross-sectional view taken along line II-II' illustrated in FIG. 25, FIG. 27 illustrates a first vibration structure illustrated in FIGS. 25 and 26, FIG. 28 illustrates a second vibration structure illustrated in FIGS. 25 and 26, and FIG. 29 illustrates a third vibration structure illustrated in FIGS. 25 and 26.

With reference to FIGS. 25 and 26, the vibration apparatus according to another embodiment of the present disclosure may include a first vibration structure 310, a second vibration structure 330, and a third vibration structure 350.

The first vibration structure 310 may be a lower vibration structure, but embodiments of the present disclosure are not limited thereto. The second vibration structure 330 may be an intermediate vibration structure, but embodiments of the present disclosure are not limited thereto. The third vibration structure 350 may be an upper vibration structure, but embodiments of the present disclosure are not limited thereto.

Each of the first to third vibration structures 310, 330, and 350 may have a circular shape (or an oval shape) and may overlap or stack on each other. Each of the first to third vibration structures 310, 330, and 350 may have the same shape or the same size. The first to third vibration structures 310, 330, and 350 may be implemented to be displaced or vibrated in the same direction.

The first vibration structure 310 may generate or output a first sound wave. The second vibration structure 330 may generate or output a second sound wave which differs from the first sound wave. The second vibration structure 350 may generate or output a third sound wave which is the same as or differs from the second sound wave. According to an embodiment of the present disclosure, each of the first sound wave, the second sound wave, and the third sound wave may be any one or more of an audible frequency, an ultrasonic wave of an inaudible frequency band without audible frequency, and an ultrasonic wave of an inaudible frequency band including an audible frequency.

According to an embodiment of the present disclosure, the first vibration structure 310 may generate or output a first sound wave SW1 in a whole region, but embodiments of the present disclosure are not limited thereto. The second vibration structure 330 may generate or output a second sound wave SW2 over a periphery portion of the first vibration structure 310. The third vibration structure 350 may generate or output a third sound wave SW3 over a periphery portion of the second vibration structure 330.

According to an embodiment of the present disclosure, the first sound wave SW1 generated in the first vibrations structure 310 may be an ultrasonic wave (or a reference ultrasonic wave) of an inaudible frequency band, the second sound wave SW2 generated in the second vibration structure 330 may be an ultrasonic wave (or a first sound ultrasonic wave) including an audible frequency, and the third sound wave SW3 generated in the third vibration structure 350 may be an ultrasonic wave (or a second sound ultrasonic wave) including an audible frequency. For example, the first sound wave SW1 may correspond to first and second polarity signals of the first vibration driving signal. The second sound wave SW2 may correspond to a first polarity signal or a second polarity signal of the second vibration driving signal. The third sound wave SW3 may correspond to a first polarity signal or a second polarity signal of the third vibration driving signal. For example, the second sound wave SW2 and the third sound wave SW3 may have the same frequency (or a resonance frequency), or may have different frequencies.

The vibration apparatus according to another embodiment of the present disclosure may further include a first adhesive member 320 and a second adhesive member 340.

The first adhesive member 320 may be disposed or interposed between the first vibration structure 310 and the second vibration structure 330. The first adhesive member 320 may be the same as the adhesive member 120 described above with reference to FIG. 3, and thus, its repetitive description may be omitted.

The second adhesive member 340 may be disposed or interposed between the second vibration structure 330 and the third vibration structure 350. The second adhesive member 340 may be the same as the adhesive member 120 described above with reference to FIG. 3, and thus, its repetitive description may be omitted.

With reference to FIGS. 25 to 27, a first vibration structure 310 according to an embodiment of the present disclosure may include a first base member 311, a second base member 312, and a vibration generating part 313.

The first base member 311 and the second base member 312 may be disposed to overlap each other. Except for that each of the first base member 311 and the second base member 312 has a circular plate shape, the first base member 311 and the second base member 312 may be the same as the first base member 111 or the second base member 112 of the first vibration structure 110 described above with reference to FIGS. 3 and 4, and thus, their repetitive descriptions may be omitted or will be given below.

The vibration generating part (or a first vibration generating part) 313 may be disposed or interposed between the first base member 311 and the second base member 312. The vibration generating part 313 may have a circular shape, but embodiments of the present disclosure are not limited thereto, and may have an oval shape.

The vibration generating part 313 according to an embodiment of the present disclosure may include a vibration portion 313*a* including a piezoelectric material, a first electrode layer 313*b* disposed at a first surface of the vibration portion 313*a*, and a second electrode layer 313*c* disposed at a second surface, which is opposite to or different from the first surface, of the vibration portion 313*a*.

Except for that the vibration portion 313*a* has a circular shape (or an oval shape), the vibration portion 313*a* may include the same piezoelectric material as the vibration portion 113*a* of the first vibration structure 110 described above with reference to FIGS. 3 and 4, and thus, its repetitive description may be omitted.

The first electrode layer 313*b* may be disposed between the vibration portion 313*a* and the first base member 311. The first electrode layer 313*b* may be electrically and directly connected to the first surface of the vibration portion 313*a*. For example, the first electrode layer 313*b* may have the same shape as the vibration portion 313*a*, but embodiments of the present disclosure are not limited thereto.

The second electrode layer 313*c* may be disposed between the vibration portion 313*a* and the second base member 312. The second electrode layer 313*c* may be electrically and directly connected to the second surface of the vibration portion 313*a*. For example, the second electrode layer 313*c* may have the same shape as the vibration portion 313*a*, but embodiments of the present disclosure are not limited thereto.

The first vibration structure 310 according to an embodiment of the present disclosure may further include an adhesive layer 314 which is disposed between the first base member 311 and the second base member 312 to surround side surfaces (or sidewalls) of the vibration generating part 313.

The adhesive layer 114 according to an embodiment of the present disclosure may include a first adhesive layer 314*a* disposed at a second surface (or a rear surface) of the first base member 311, and a second adhesive layer 314*b* disposed at a first surface (or an upper surface) of the second base member 312. The first adhesive layer 314*a* and the second adhesive layer 314*b* may be coupled or bonded to each other between the first base member 311 and the second base member 312 and may be implemented as one adhesive layer. The first adhesive layer 314*a* or the second adhesive layer 314*b* may be omitted.

The first vibration structure 310 according to an embodiment of the present disclosure may further include a plurality of first power supply electrodes 315 and a plurality of second power supply electrodes 316.

The first power supply electrode 315 may be disposed between the vibration generating part 313 and the first base member 311 and may be electrically connected to the first electrode layer 313*b* of the vibration generating part 313. The first power supply electrode 315 may be disposed at a second surface (or a rear surface) of the first base member 311. For example, the first power supply electrode 315 may have the same circular shape (or oval shape) as the vibration generating part 313.

The first power supply electrode 315 may be electrically connected to the first electrode layer 313*b* of the vibration generating part 313 by an anisotropic conductive film, or may be electrically connected to the first electrode layer 313*b* of the vibration generating part 313 by a conductive material (or particle) included in the adhesive layer 314 (or the first adhesive layer 314*a*).

The second power supply electrode 316 may be disposed between the vibration generating part 313 and the second base member 312 and may be electrically connected to the second electrode layer 313*c* of the vibration generating part 313. The second power supply electrode 316 may be disposed at a first surface (or a front surface) of the second base member 312. For example, the second power supply electrode 316 may have the same circular shape (or oval shape) as the vibration generating part 313.

The second power supply electrode 316 may be electrically connected to the second electrode layer 313*c* of the vibration generating part 313 by an anisotropic conductive film, or may be electrically connected to the second electrode layer 313*c* of the vibration generating part 313 by a conductive material (or particle) included in the adhesive layer 314 (or the second adhesive layer 314*b*).

The first vibration structure 310 according to an embodiment of the present disclosure may include a plurality of first power supply lines 317, a plurality of second power supply lines 318, and a pad part 319.

The first power supply line 317 may be electrically connected to the first power supply electrode 315. The first power supply line 317 may be directly formed at a second surface (or a rear surface) of the first base member 311 along with the first power supply electrode 315.

The second power supply line 318 may be electrically connected to the second power supply electrode 316. The second power supply line 318 may be directly formed at a first surface (or a front surface) of the second base member 312 along with the second power supply electrode 316.

The pad part 319 (or a first pad part) may be disposed at a first periphery portion of a second surface periphery portion of the first base member 111 and a first periphery portion of a first surface periphery portion of the second base member 112.

The pad part 319 according to an embodiment of the present disclosure may include a plurality of first pads 319*a* disposed in parallel at the first periphery portion of the second surface periphery portion of the first base member 311, and a plurality of second pads 319*b* disposed in parallel at the first periphery portion of the first surface periphery portion of the second base member 312.

The first pad 319*a* may be electrically connected to an end (or one side) of the first power supply line 317. Accordingly, the first pad 319*a* may be electrically connected to the first power supply electrode 315 through the first power supply line 317.

The second pad 319*b* may be electrically connected to an end of the second power supply line 318. Accordingly, the second pad 319*b* may be electrically connected to the second power supply electrode 316 through the second power supply line 318.

The first vibration structure 110 according to an embodiment of the present disclosure may further include a flexible cable FC1. The flexible cable FC1 may be electrically connected to the pad part 319. Therefore, the flexible cable FC1 may supply a first vibration driving signal supplied from a first amplifier of a vibration driving circuit to a corresponding pad part 319.

As described above, the first vibration structure 110 according to an embodiment of the present disclosure may be vibrated or displaced based on the first vibration driving signal supplied from the first amplifier of the vibration driving circuit to the first and second electrode layers 313*b* and 313*c* of the vibration generating part 313 through the flexible cable FC1 and the pad part 319, thereby generating or outputting a first sound wave.

With reference to FIGS. 25, 26, and 27, the second vibration structure 330 according to another embodiment of the present disclosure may include a first base member 331, a second base member 332, and a vibration generating part 333.

The first base member 331 and the second base member 332 may be disposed to overlap each other. Each of the first base member 331 and the second base member 332 may be the same as the first base member 311 or the second base member 312 described above with reference to FIGS. 25 and 27, and thus, like reference numerals refer to like elements and their repetitive descriptions may be omitted or will be briefly given below.

According to an embodiment of the present disclosure, any one or more of the first base member 331 and the second base member 332 may be coupled or connected to the first vibration structure 310 by an adhesive member 320. For example, a second surface (or a rear surface) of the second base member 332 may be coupled or connected to the first base member 311 of the first vibration structure 310 by the adhesive member 320. For example, a first surface (or a front surface) of the first base member 331 may be coupled or connected to the first base member 311 of the first vibration structure 310 by the adhesive member 320.

The vibration generating part (or a second vibration generating part) 333 may be disposed or interposed between the first base member 331 and the second base member 332. The vibration generating part 333 may have a circular band shape or a donut shape having an opening portion (or a hollow portion), but embodiments of the present disclosure are not limited thereto and may have an oval band shape or an oval donut shape.

The vibration generating part 333 may overlap a periphery portion of the vibration generating part 313 provided in the first vibration structure 310. According to an embodiment of the present disclosure, the vibration generating part 333 may overlap a periphery portion, other than a center region, of the vibration generating part 313 provided in the first vibration structure 310. Accordingly, the vibration generating part 333 of the second vibration structure 330 and the vibration generating part 313 of the first vibration structure 310 may overlap or stack to be displaced (or driven or vibrated) in the same direction.

The vibration generating part 333 according to an embodiment of the present disclosure may include a vibration portion 333*a* including a piezoelectric material, a first electrode layer 333*b* disposed at a first surface of the vibration portion 333*a*, and a second electrode layer 333*c* disposed at a second surface, which is opposite to or different from the first surface, of the vibration portion 333*a*.

Except for that the vibration portion 333*a* has a circular band shape (or an oval band shape), the vibration portion 333*a* may include the same piezoelectric material as the vibration portion 313*a* of the first vibration structure 310 described above with reference to FIGS. 26 and 27, and thus, its repetitive description may be omitted.

The first electrode layer 333*b* may be disposed between the vibration portion 333*a* and the first base member 331. The first electrode layer 333*b* may be electrically and directly connected to the first surface of the vibration portion 333*a*. For example, the first electrode layer 333*b* may have the same shape as the vibration portion 333*a*, but embodiments of the present disclosure are not limited thereto.

The second electrode layer 333*c* may be disposed between the vibration portion 333*a* and the second base member 332. The second electrode layer 333*c* may be electrically and directly connected to the second surface of the vibration portion 333*a*. For example, the second electrode layer 333*c* may have the same shape as the vibration portion 333*a*, but embodiments of the present disclosure are not limited thereto.

The second vibration structure 330 according to an embodiment of the present disclosure may further include an adhesive layer 334 which is disposed between the first base member 331 and the second base member 332 to surround side surfaces (or sidewalls) of the vibration generating part 333.

The adhesive layer 334 according to an embodiment of the present disclosure may include a first adhesive layer 334*a* disposed at a second surface (or a rear surface) of the first base member 331, and a second adhesive layer 334*b* disposed at a first surface (or an upper surface) of the second base member 332. The first adhesive layer 334*a* and the second adhesive layer 334*b* may be coupled or bonded to each other between the first base member 331 and the second base member 332 and may be implemented as one adhesive layer. The first adhesive layer 334*a* or the second adhesive layer 334*b* may be omitted.

The second vibration structure 330 according to an embodiment of the present disclosure may further include a first power supply electrode 335 and a second power supply electrode 336.

The first power supply electrode 335 may be disposed between the vibration generating part 333 and the first base member 331 and may be electrically connected to the first electrode layer 333*b* of the vibration generating part 333. The first power supply electrode 335 may be disposed at a second surface (or a rear surface) of the first base member 331. For example, the first power supply electrode 335 may have the same circular band shape (or oval band shape) as the vibration generating part 333.

The first power supply electrode 335 may be electrically connected to the first electrode layer 333*b* of the vibration generating part 333 by an anisotropic conductive film, or may be electrically connected to the first electrode layer 333*b* of the vibration generating part 333 by a conductive material (or particle) included in the adhesive layer 334 (or the first adhesive layer 334*a*).

The second power supply electrode 336 may be disposed between the vibration generating part 333 and the second base member 332 and may be electrically connected to the second electrode layer 333*c* of the vibration generating part 333. The second power supply electrode 336 may be disposed at a first surface (or a front surface) of the second base member 332. For example, the second power supply electrode 336 may have the same circular band shape (or oval band shape) as the vibration generating part 333.

The second power supply electrode 336 may be electrically connected to the second electrode layer 333*c* of the vibration generating part 333 by an anisotropic conductive film, or may be electrically connected to the second electrode layer 333*c* of the vibration generating part 333 by a conductive material (or particle) included in the adhesive layer 334 (or the second adhesive layer 334*b*).

The second vibration structure 330 according to an embodiment of the present disclosure may further include a first power supply line 337, a second power supply line 338, and a pad part 339.

The first power supply line 337 may be electrically connected to the first power supply electrode 335. The first power supply line 337 may be directly formed at a second surface (or a rear surface) of the first base member 331 along with the first power supply electrode 335.

The second power supply line 338 may be electrically connected to the second power supply electrode 336. The second power supply line 338 may be directly formed at a first surface (or a front surface) of the second base member 332 along with the second power supply electrode 336.

The pad part 339 (or a second pad part) may be disposed at a first periphery portion of a second surface periphery portion of the first base member 331 and a first periphery portion of a first surface periphery portion of the second base member 332.

The pad part 339 according to an embodiment of the present disclosure may include a first pad 339*a* disposed at the first periphery portion of the second surface periphery portion of the first base member 331, and a second pad 339*b* disposed at the first periphery portion of the first surface periphery portion of the second base member 332.

The first pad 339*a* may be electrically connected to an end (or one side) of the first power supply line 337. Accordingly, the first pad 339*a* may be electrically connected to the first power supply electrode 335 through the first power supply line 337.

The second pad 339*b* may be electrically connected to an end of the second power supply line 338. Accordingly, the second pad 339*b* may be electrically connected to the second power supply electrode 336 through the second power supply line 338.

The second vibration structure 330 according to an embodiment of the present disclosure may further include a flexible cable FC2. The flexible cable FC2 may be electrically connected to the pad part 339. Therefore, the flexible cable FC2 may supply a second vibration driving signal supplied from a second amplifier of a vibration driving circuit to a corresponding pad part 339.

As described above, the second vibration structure 330 according to an embodiment of the present disclosure may be vibrated or displaced based on the second vibration driving signal supplied from the second amplifier of the vibration driving circuit to the first and second electrode layers 333*b* and 333*c* of the vibration generating part 333 through the flexible cable FC2 and the pad part 339, thereby generating or outputting a second sound wave. For example, the second sound wave output from the second vibration structure 330 may overlap the first sound wave output from a periphery portion of the first vibration structure 310.

With reference to FIGS. 25, 26, and 29, the third vibration structure 350 according to an embodiment of the present disclosure may include a first base member 351, a second base member 352, and a vibration generating part 353.

The first base member 351 and the second base member 352 may be disposed to overlap each other. Each of the first base member 351 and the second base member 352 may be the same as the first base member 311 or the second base member 312 of the first vibration structure 310 described above with reference to FIGS. 25 and 27, and thus, like reference numerals refer to like elements and their repetitive descriptions may be omitted or will be briefly given below.

According to an embodiment of the present disclosure, any one or more of the first base member 351 and the second base member 352 may be coupled or connected to the second vibration structure 330 by a second adhesive member 340. For example, a second surface (or a rear surface) of the second base member 352 may be coupled or connected to the first base member 331 of the second vibration structure 330 by the second adhesive member 340. For example, a first surface (or a front surface) of the first base member 351 may be coupled or connected to the first base member 331 of the second vibration structure 330 by the second adhesive member 340.

The vibration generating part (or a third vibration generating part) 353 may be disposed or interposed between the first base member 351 and the second base member 352. The vibration generating part 353 may have a circular band shape or a donut shape having an opening portion (or a hollow portion), but is not limited thereto and may have an oval band shape or an oval donut shape.

The vibration generating part 353 may overlap a periphery portion of the vibration generating part 333 provided in the second vibration structure 330. Therefore, the vibration generating part 353 of the third vibration structure 350 and the vibration generating part 333 of the second vibration structure 330 may overlap or stack to be displaced (or driven or vibrated) in the same direction. Accordingly, the vibration generating parts 313, 333, and 353 of the first to third vibration structures 310, 330, and 350 may overlap or stack to be displaced (or driven or vibrated) in the same direction.

The vibration generating part 353 according to an embodiment of the present disclosure may include a vibration portion **353*a* including a piezoelectric material, a first electrode layer 353*b* disposed at a first surface of the vibration portion 353*a*, and a second electrode layer 353*c* disposed at a second surface, which is opposite to or different from the first surface, of the vibration portion 353*a***.

Except for that the vibration portion **353*a* has a circular band shape (or an oval band shape), the vibration portion 353*a* may include the same piezoelectric material as each of the vibration portions 313*a* and 333*a* of the first vibration structure 310 described above with reference to FIGS. 27 and 28**, and thus, its repetitive description may be omitted.

The first electrode layer **353*b* may be disposed between the vibration portion 353*a* and the first base member 351. The first electrode layer 353*b* may be electrically and directly connected to the first surface of the vibration portion 353*a*. For example, the first electrode layer 353*b* may have the same shape as the vibration portion 353*a***, but embodiments of the present disclosure are not limited thereto.

The second electrode layer **353*c* may be disposed between the vibration portion 353*a* and the second base member 352. The second electrode layer 353*c* may be electrically and directly connected to the second surface of the vibration portion 353*a*. For example, the second electrode layer 353*c* may have the same shape as the vibration portion 353*a***, but embodiments of the present disclosure are not limited thereto.

The third vibration structure 350 according to an embodiment of the present disclosure may further include an adhesive layer 354 which is disposed between the first base member 351 and the second base member 352 to surround side surfaces (or sidewalls) of the vibration generating part 353.

The adhesive layer 354 according to an embodiment of the present disclosure may include a first adhesive layer **354*a* disposed at a second surface (or a rear surface) of the first base member 351, and a second adhesive layer 354*b* disposed at a first surface (or an upper surface) of the second base member 352. The first adhesive layer 354*a* and the second adhesive layer 354*b* may be coupled or bonded to each other between the first base member 351 and the second base member 352 and may be implemented as one adhesive layer. The first adhesive layer 354*a* or the second adhesive layer 354*b*** may be omitted.

The third vibration structure 350 according to an embodiment of the present disclosure may further include a first power supply electrode 355, a second power supply electrode 356, a first power supply line 357, a second power supply line 358, a pad part 359, and a flexible cable FC3. Added elements of the first vibration structure 350 may respectively be the first power supply electrode 335, the second power supply electrode 336, the first power supply line 337, the second power supply line 338, the pad part 339, and the flexible cable FC2 described above with reference to FIGS. 26 and 27, and thus, like reference numerals refer to like elements and their repetitive descriptions may be omitted.

As described above, the third vibration structure 350 according to an embodiment of the present disclosure may be vibrated or displaced based on the second vibration driving signal supplied from the third amplifier of the vibration driving circuit to the first and second electrode layers **353*b* and 353*c* of the vibration generating part 353 through the flexible cable FC3 and the pad part 359, thereby generating or outputting a third sound wave. For example, the third sound wave output from the third vibration structure 350 may overlap each of the first sound wave output from a periphery portion of the first vibration structure 310 and the second sound wave output from a periphery portion of the second vibration structure 330**.

In the vibration apparatus according to another embodiment of the present disclosure, the first to third vibration structures 310, 330, and 350 may be displaced (or driven or vibrated) in the same direction and may overlap or may be stacked on each other without being staggered, and thus, an amplitude displacement of each of the first to third vibration structures 310, 330, and 350 may be maximized. Accordingly, the vibration apparatus according to another embodiment of the present disclosure may output a sound having an enhanced sound pressure level characteristic of a middle-low-pitched sound band, or may output a sound having an orientation or an orientation angle.

Figure 30:
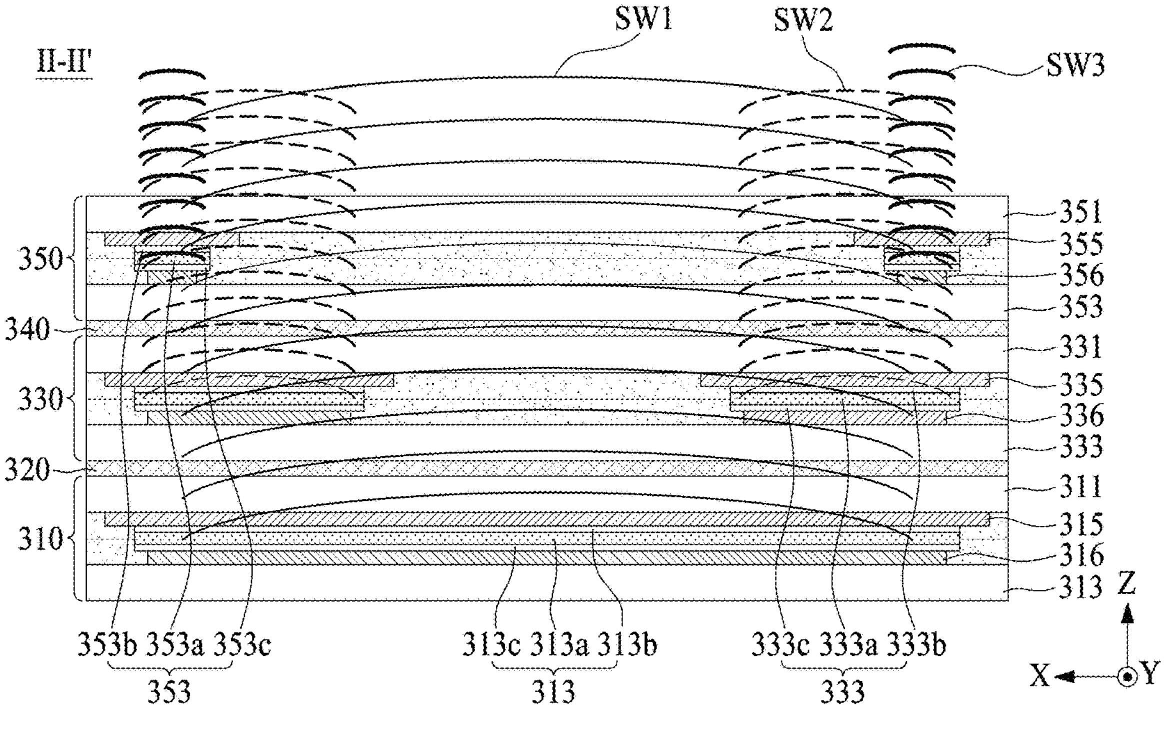
FIG. 30 illustrates a sound output of the vibration apparatus illustrated in FIG. 25.

Moreover, as a beating phenomenon between the first to third sound waves SW1 to SW3 output based on vibrations of the first to third vibration structures 310, 330, and 350 occurs, as illustrated in FIG. 30, the vibration apparatus according to another embodiment of the present disclosure may output a sound having a directivity or a directional angle in a specific direction. For example, an overlap region between the first sound wave SW1 and the second sound wave SW2 may form a first audible region which enables a user to listen to a sound, based on a beating phenomenon where an envelope of an audible frequency corresponding to a difference between the first sound wave SW1 and the second sound wave SW2 is formed. Also, an overlap region between the first sound wave SW1 and the third sound wave SW3 may form a second audible region which enables a user to listen to a sound, based on a beating phenomenon where an envelope of an audible frequency corresponding to a difference between the first sound wave SW1 and the third sound wave SW3 is formed. Accordingly, the vibration apparatus according to another embodiment of the present disclosure may output a sound having a directivity or a directional angle in a specific direction through the overlap region between the first sound wave SW1 and the second sound wave SW2 and the overlap region between the first sound wave SW1 and the third sound wave SW3.

Figure 31:
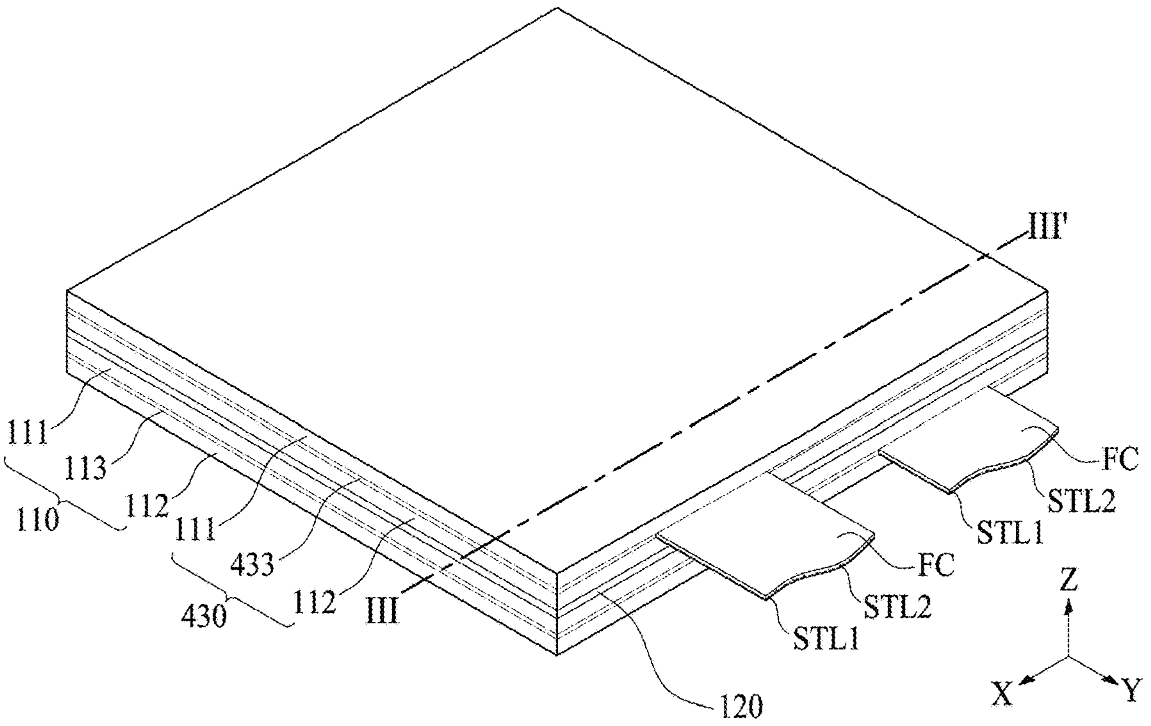
FIG. 31 illustrates a vibration apparatus according to another embodiment of the present disclosure.
Figure 32:
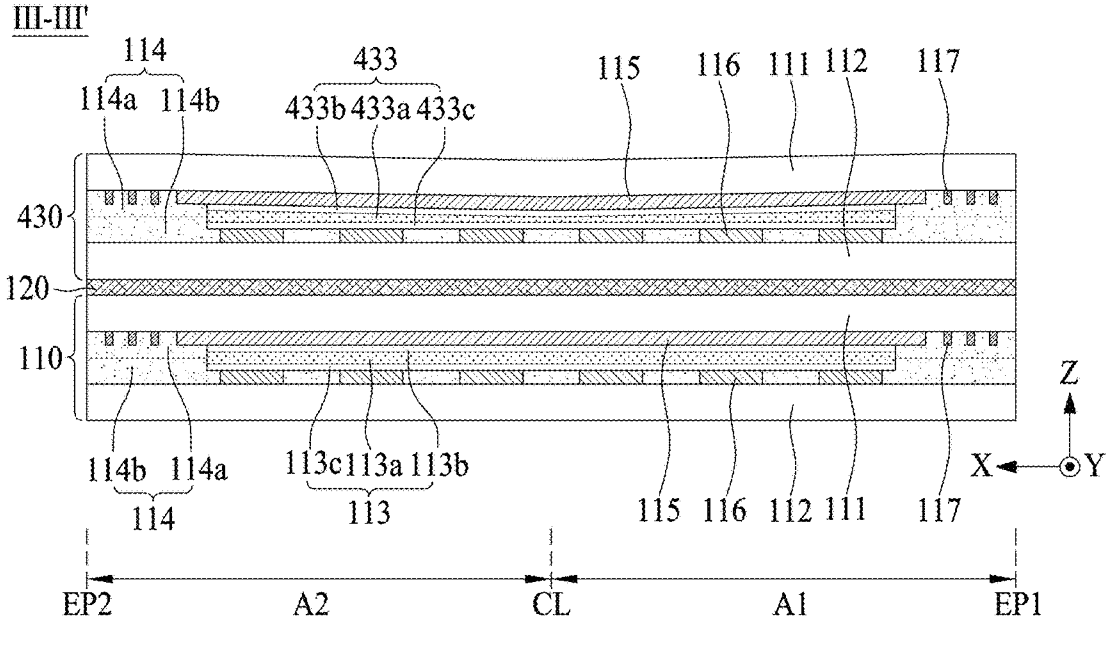
FIG. 32 is a cross-sectional view taken along line III-III' illustrated in FIG. 31.
Figure 33:
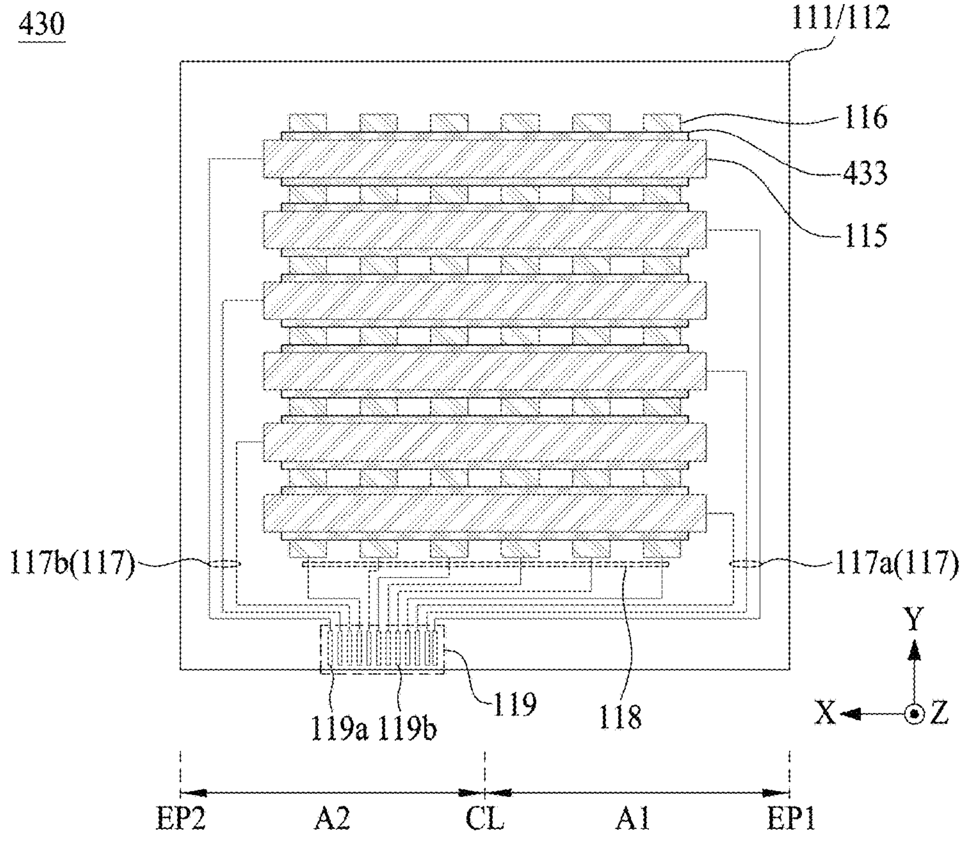
FIG. 33 is a plan view illustrating a second vibration structure illustrated in FIGS. 31 and 32.
Figure 34:
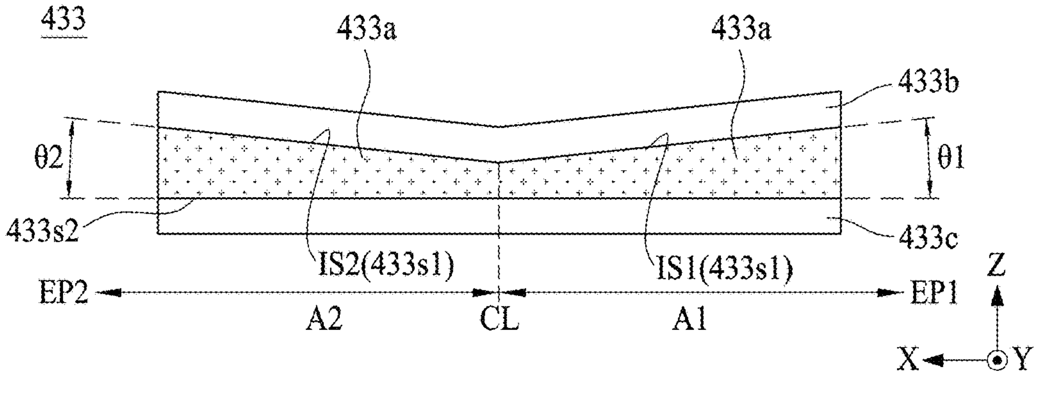
FIG. 34 illustrates a vibration generating part illustrated in FIGS. 32 and 33.

FIG. 31 illustrates a vibration apparatus according to another embodiment of the present disclosure, FIG. 32 is a cross-sectional view taken along line III-III' illustrated in FIG. 31, FIG. 33 is a plan view illustrating a second vibration structure illustrated in FIGS. 31 and 32, and FIG. 34 is a cross-sectional view illustrating a vibration generating part illustrated in FIGS. 32 and 33. FIGS. 31 to 34 illustrate an embodiment implemented by modifying a second vibration structure in the vibration apparatus described above with reference to FIGS. 1 to 4. In the following description, in elements other than a first vibration structure and elements relevant thereto, like reference numerals refer to like elements and their repetitive descriptions may be omitted or will be briefly given below.

With reference to FIGS. 31 to 34, in the vibration apparatus according to another embodiment of the present disclosure, a second vibration structure 430 may be implemented to output a directional sound wave (or a second sound wave) having a directivity in a specific direction. For example, the second vibration structure 430 may be implemented to output a directional sound wave toward a center portion of the vibration apparatus without being parallel to a front surface of the vibration apparatus.

The second vibration structure 430 according to an embodiment of the present disclosure may include a first base member 111, a second base member 112, and a plurality of vibration generating parts 433.

The first base member 111 and the second base member 112 may be disposed to overlap each other. Each of the first base member 111 and the second base member 112 may be the same as the first base member 111 or the second base member 112 of the first vibration structure 110 described above with reference to FIGS. 3 and 4, and thus, their repetitive descriptions may be omitted or will be briefly given.

The first base member 111 and the second base member 112 may be opposite-bonded to each other with a plurality of vibration generating parts 433 therebetween by an adhesive layer 114.

Each of the plurality of vibration generating parts 433 may be disposed or interposed between the first base member 111 and the second base member 112. Each of the plurality of vibration generating parts 433 may include an inclined surface which is inclined in a specific direction. Each of the plurality of vibration generating parts 433 may generate a directional sound wave in a specific direction by the inclined surface. For example, each of the plurality of vibration generating parts 433 may have an orientation where a sound wave generated based on a vibration (or displacement or driving) is output in a forward direction of a center portion of the vibration apparatus.

Each of the plurality of vibration generating parts 433 according to an embodiment of the present disclosure may include a vibration portion 433*a* including a piezoelectric material, a first electrode layer 433*b* disposed at a first surface of the vibration portion 433*a*, and a second electrode layer 433*c* disposed at a second surface of the vibration portion 433*a*.

The vibration portion 433*a* may include the same piezoelectric material as the vibration portion 113*a* described above with reference to FIG. 3, and thus, its repetitive description may be omitted.

With reference to FIG. 34, the vibration portion 433*a* according to an embodiment of the present disclosure may include a first surface 433*s*1 having an inclined-surface structure, and a second surface 433*s*2 having a planar structure.

The second surface 433*s*2 of the vibration portion 433*a* may include a planar surface or a flat surface. For example, the second surface 433*s*2 of the vibration portion 433*a* may be parallel to a first surface (or an upper surface) of a second base member 112.

The first surface 433*s*1 of the vibration portion 433*a* may have an inclined-surface structure which is inclined from both ends EP1 and EP2 of the vibration portion 433*a* to a center line CL, with respect to a first direction X. A distance (or a thickness) between the first surface 433*s*1 and the second surface 433*s*2 of the vibration portion 433*a* may decrease progressively in a direction from the both ends (or both sides) to the center line.

The first surface 433*s*1 of the vibration portion 433*a* according to an embodiment of the present disclosure may include a first inclined surface IS1 and a second inclined surface IS2, which are inclined to have a predetermined slope. For example, the first surface 433*s*1 of the vibration portion 433*a* may include the first inclined surface IS1 and the second inclined surface IS2, which are formed by a molding process using a piezoelectric material.

The first inclined surface IS1 may be implemented in a region A1 between the center line CL and a first side (or one end) of the vibration portion 433*a* of the first surface 433*s*1 of the vibration portion 433*a*, with respect to the first direction X.

According to an embodiment of the present disclosure, in the vibration portion 433*a*, a first included angle θ1 between the first inclined surface IS1 and the second surface 433*s*2 may be an acute angle. For example, the first included angle θ1 between the first inclined surface IS1 and the second surface 433*s*2 may be set to a range of 10 degrees to 75 degrees, but embodiments of the present disclosure are not limited thereto. For example, the first included angle θ1 may be set based on a focal length of beamforming of a directional sound wave and/or a directional angle of a sound wave having a directivity.

According to an embodiment of the present disclosure, a height of the first inclined surface IS1 may be lowered progressively in a direction from the first side (or the one end) of the vibration portion 433*a* to the center line CL, with respect to the first direction X. The first inclined surface IS1 may be inclined with respect to the second surface 433*s*2, and thus, with respect to a thickness direction Z of the vibration apparatus, a distance or a thickness between the first inclined surface IS1 and the second surface 433*s*2 may decrease progressively in a direction from the first side (or the one end) of the vibration portion 433*a* to the center line CL.

The second inclined surface IS2 may be implemented in a region A2 between the center line CL and a second side (or the other end) of the vibration portion 433*a* of the first surface 433*s*1 of the vibration portion 433*a*, with respect to the first direction X.

According to an embodiment of the present disclosure, in the vibration portion 433*a*, a second included angle θ2 between the second inclined surface IS2 and the second surface 433*s*2 may be an acute angle. For example, the second included angle θ2 between the second inclined surface IS2 and the second surface 433*s*2 may be set to a range of 10 degrees to 75 degrees, but embodiments of the present disclosure are not limited thereto. For example, the second included angle θ2 may be set based on a focal length of beamforming of a directional sound wave and/or a directional angle of a sound wave having a directivity.

According to an embodiment of the present disclosure, a height of the second inclined surface IS2 may be lowered progressively in a direction from the first side (or the one end) of the vibration portion 433*a* to the center line CL, with respect to the first direction X. For example, the second inclined surface IS2 may be inclined with respect to the second surface 433*s*2, and thus, with respect to the thickness direction Z of the vibration apparatus, a distance or a thickness between the second inclined surface IS2 and the second surface 433*s*2 may decrease progressively in a direction from the second side (or the one end) of the vibration portion 433*a* to the center line CL.

According to an embodiment of the present disclosure, the first included angle θ1 between the first inclined surface IS1 and the second surface 433*s*2 may be the same as the second included angle θ2 between the second inclined surface IS2 and the second surface 433*s*2. For example, the first included angle θ1 between the second inclined surface IS2 and the second surface 433*s*2 may be the same as the second included angle θ2 between the second inclined surface IS2 and the second surface 433*s*2 within an error range of a manufacturing process. Accordingly, the vibration portion 433*a* may have a symmetrical structure with respect to the center line CL in the first direction X.

According to another embodiment of the present disclosure, the first included angle θ1 between the first inclined surface IS1 and the second surface 433*s*2 may be different from the second included angle θ2 between the second inclined surface IS2 and the second surface 433*s*2. Accordingly, the vibration portion 433*a* may have an asymmetrical structure with respect to the center line CL in the first direction X.

The first electrode layer 433*b* may be disposed at the first surface 433*s*1 of the vibration portion 433*a*. The first electrode layer 433*b* may directly contact the first surface 433*s*1 of the vibration portion 433*a*, and thus, may include an inclined surface which is inclined to be identical to the first surface 433*s*1 of the vibration portion 433*a*. Except for that the first electrode layer 433*b* includes the inclined surface, the first electrode layer 433*b* may be substantially the same as the first electrode layer 113*b* described above with reference to FIG. 3, and thus, its repetitive description may be omitted.

The second electrode layer 433*c* may be disposed at the second surface 433*s*2 of the vibration portion 433*a*. The second electrode layer 433*c* may directly contact the second surface 433*s*2 of the vibration portion 433*a*, and thus, may have the same planar structure as the second surface 433*s*2 of the vibration portion 433*a*. The second electrode layer 433*c* may be substantially the same as the second electrode layer 113*c* described above with reference to FIG. 3, and thus, its repetitive description may be omitted.

The vibration portion 433*a* of each of the plurality of vibration generating parts 433 may vibrate based on a second vibration driving signal supplied to the first electrode layer 433*b* and the second electrode layer 433*c* to generate an orientation sound wave which travels toward the center line CL of the vibration apparatus. For example, the orientation sound wave may be output in a direction parallel to the inclined surface of the vibration portion 433*a*, and thus, may have a directivity which concentrates on a forward region apart from the center line CL of the vibration apparatus.

The second vibration structure 430 according to an embodiment of the present disclosure may further include an adhesive layer 114 which is disposed between the first base member 111 and the second base member 112 to surround side surfaces (or sidewalls) of each of the plurality of vibration generating parts 433, a plurality of first power supply electrodes 115 which are electrically connected to the first electrode layers 433*b* of each of the plurality of vibration generating parts 433, a plurality of first power supply lines 117 which are electrically connected to the plurality of first power supply electrodes 115, a plurality of second power supply electrodes 116 which are electrically connected to the second electrode layers 213*c* of each of the plurality of vibration generating parts 433, a plurality of second power supply lines 118 which are electrically connected to the plurality of second power supply electrodes 116, a pad part 119 which is electrically connected to each of the plurality of first power supply lines 117 and the plurality of second power supply lines 118, and a flexible cable FC which is electrically connected to the pad part 119. Added elements of the second vibration structure 430 may be as described above with reference to FIGS. 3 and 5, and thus, like reference numerals refer to like elements and their repetitive descriptions may be omitted.

Figure 35:
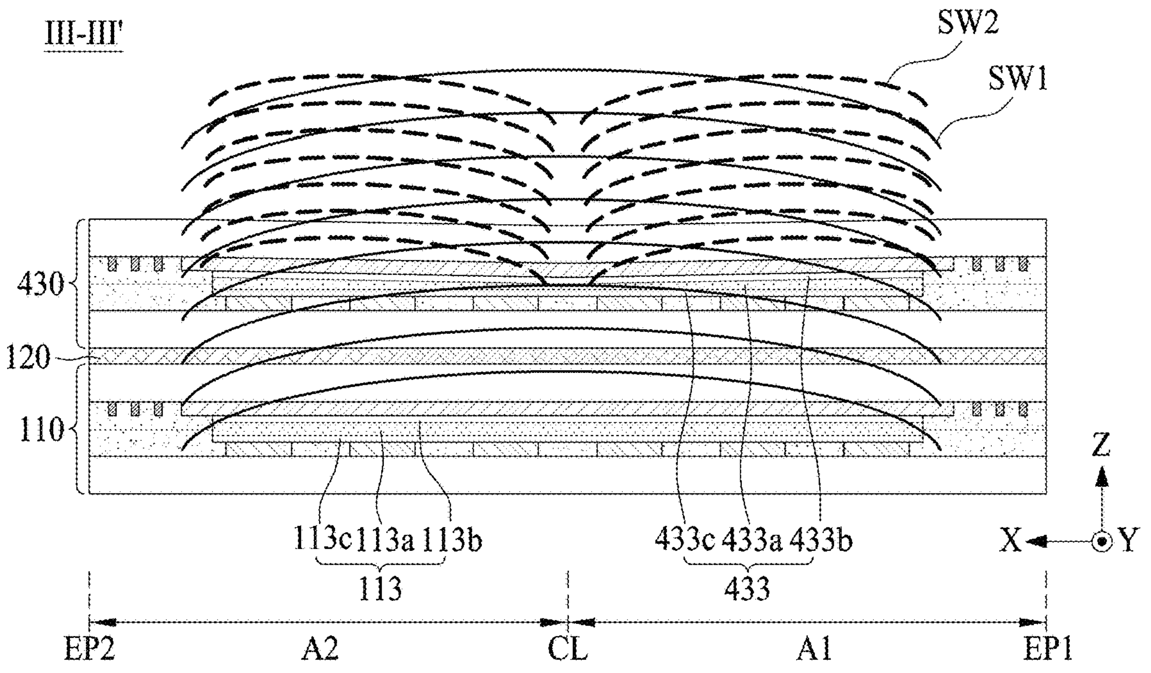
FIG. 35 illustrates a sound output of the vibration apparatus illustrated in FIG. 31.

As described above, in the vibration apparatus according to another embodiment of the present disclosure, as illustrated in FIG. 35, the second vibration structure 430 and the first vibration structure 110 may overlap or may be stacked on each other, and the vibration apparatus may output a sound having a directivity or a directional angle based on the first sound wave SW1 generated from the first vibration structure 110 and a directional sound wave (or the second sound wave) SW2 generated from the second vibration structure 430. Therefore, in the vibration apparatus according to another embodiment of the present disclosure, an overlap region between the first sound wave SW1 and the directional sound wave SW2 may form (or implement) an audible region which enables a user to listen to a sound, based on a beating phenomenon between the first sound wave SW1 and the directional sound wave SW2, and a region outside a focal length of the directional sound wave SW2 or a non-overlap region between the first sound wave SW1 and the directional sound wave SW2 may form (or implement) an inaudible region which disables a user to listen to a sound.

Figure 36:
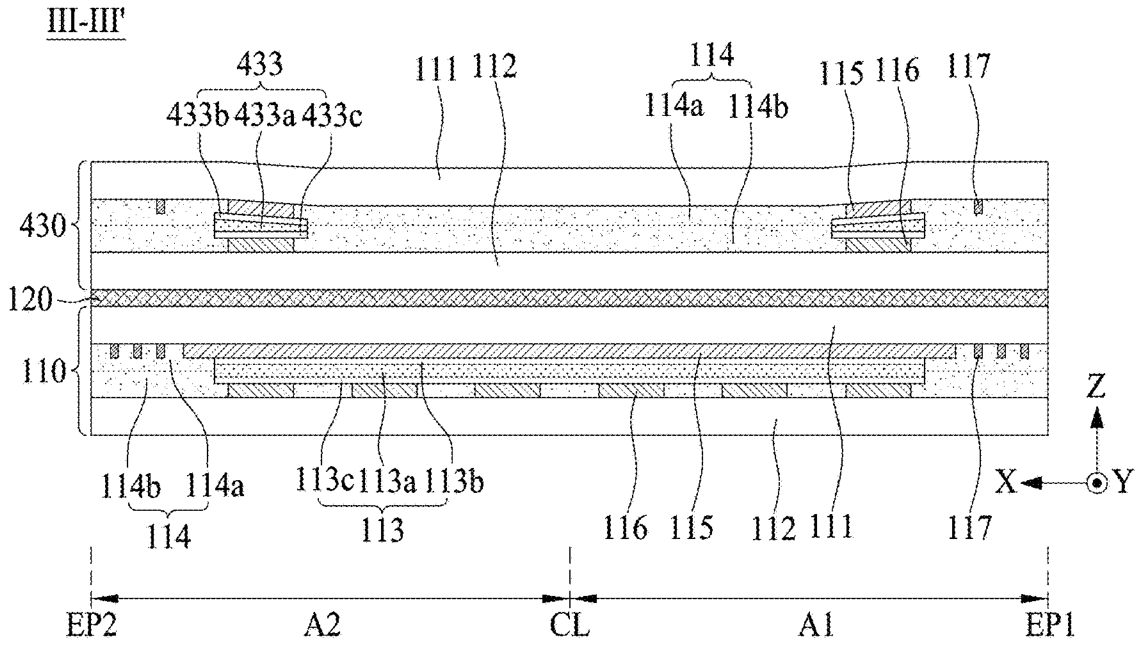
FIG. 36 is another cross-sectional view taken along line III-III' illustrated in FIG. 31.
Figure 37:
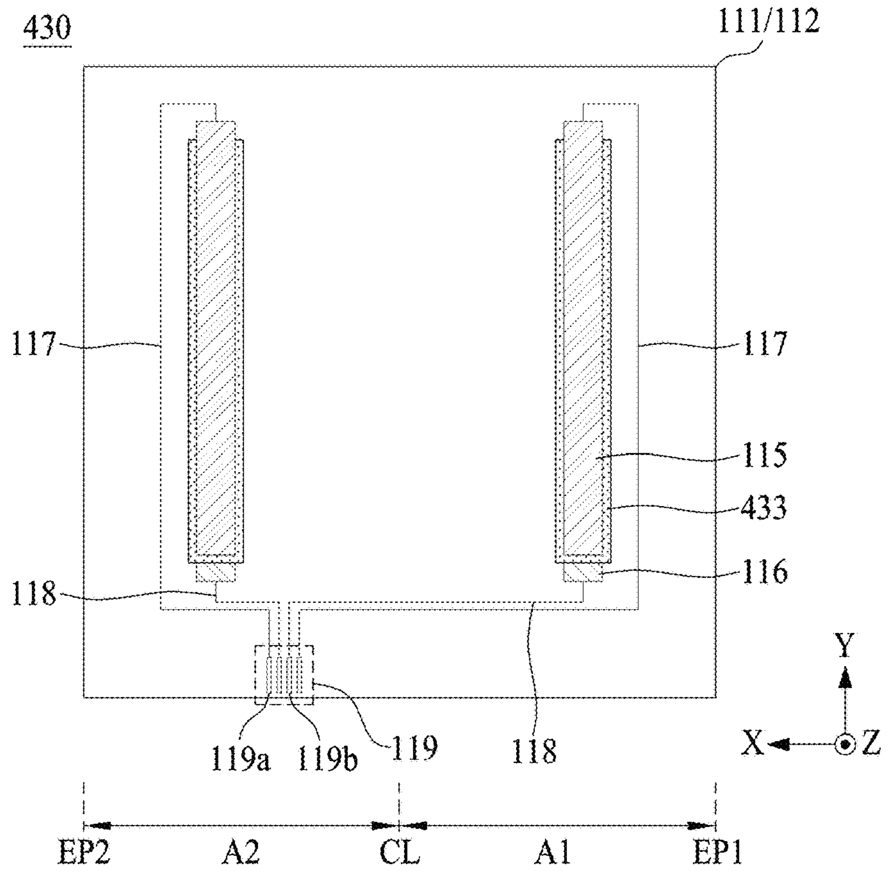
FIG. 37 is a plan view illustrating a second vibration structure illustrated in FIGS. 31 and 36.
Figure 38:
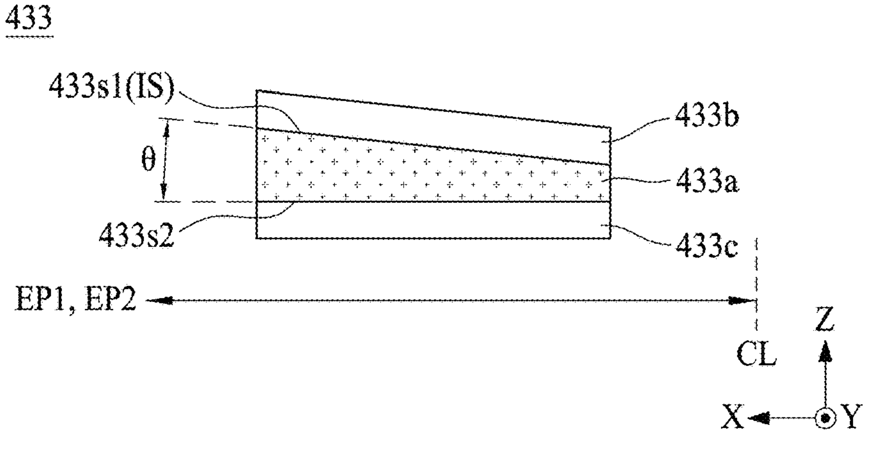
FIG. 38 illustrates a vibration generating part illustrated in FIGS. 36 and 37.

FIG. 36 is another cross-sectional view taken along line III-III' illustrated in FIG. 31, FIG. 37 is a plan view illustrating a second vibration structure illustrated in FIGS. 31 and 36, and FIG. 38 is a cross-sectional view illustrating a vibration generating part illustrated in FIGS. 36 and 37. FIGS. 36 to 38 illustrate an embodiment implemented by modifying a second vibration structure in the vibration apparatus described above with reference to FIGS. 1 to 4. In the following description, in elements other than a first vibration structure and elements relevant thereto, like reference numerals refer to like elements and their repetitive descriptions may be omitted or will be briefly given below.

With reference to FIGS. 36 to 38, in the vibration apparatus according to another embodiment of the present disclosure, a second vibration structure 430 may be implemented to output an orientation sound wave (or a second sound wave) having an orientation in a specific direction. For example, the second vibration structure 430 may be implemented to output an orientation sound wave toward a center portion of the vibration apparatus without being parallel to a front surface of the vibration apparatus.

The second vibration structure 430 according to an embodiment of the present disclosure may include a first base member 111, a second base member 112, and a pair of vibration generating parts 433.

The first base member 111 and the second base member 112 may be disposed to overlap each other. Each of the first base member 111 and the second base member 112 may be the same as the first base member 111 or the second base member 112 of the first vibration structure 110 described above with reference to FIGS. 3 and 4, and thus, their repetitive descriptions may be omitted or will be briefly given.

Each of the pair of vibration generating parts 433 may be disposed or interposed between the first base member 111 and the second base member 112. Each of the pair of vibration generating parts 433 may include an inclined surface which is inclined in a specific direction. Each of the pair of vibration generating parts 433 may generate an orientation sound wave in a specific direction by the inclined surface. For example, a sound wave generated based on a vibration (or displacement or driving) of each of the pair of vibration generating parts 433 may have an orientation where a sound wave travels in a forward direction of a center portion of the vibration apparatus.

Each of the pair of vibration generating parts 433 may overlap or stack with vibration generating parts dispose at both periphery portions of the plurality of vibration generating parts 113 provided in the first vibration structure 110. According to an embodiment of the present disclosure, a first vibration generating part of the pair of vibration generating parts 433 may be disposed at a first region A1 between a first side (or one end) EP1 of the second vibration structure 430 and the center line CL, with respect to the first direction X. For example, the first vibration generating part of the pair of vibration generating parts 433 may be disposed at a right periphery portion (or a second periphery portion) of the second vibration structure 430, with respect to the first direction X. For example, the first vibration generating part of the pair of vibration generating parts 433 may overlap or stack with the vibration generating part 113 disposed at a right periphery portion of the first vibration structure 110 without being staggered.

According to an embodiment of the present disclosure, a second vibration generating part of the pair of vibration generating parts 433 may be disposed at a second region A2 between a second side (or the other end) EP2 of the second vibration structure 430 and the center line CL, with respect to the first direction X. For example, the second vibration generating part of the pair of vibration generating parts 433 may be disposed at a left periphery portion (or a third periphery portion) of the second vibration structure 430, with respect to the first direction X. For example, the second vibration generating part of the pair of vibration generating parts 433 may overlap or stack with the vibration generating part 113 disposed at a left periphery portion of the first vibration structure 110 without being staggered.

Each of the pair of vibration generating parts 433 according to an embodiment of the present disclosure may include a vibration portion 433*a* including a piezoelectric material, a first electrode layer 433*b* disposed at a first surface of the vibration portion 433*a*, and a second electrode layer 433*c* disposed at a second surface of the vibration portion 433*a*.

The vibration portion 433*a* may include the same piezoelectric material as the vibration portion 113*a* described above with reference to FIG. 3, and thus, its repetitive description may be omitted.

The vibration portion 433*a* according to an embodiment of the present disclosure may include a first surface 433*s*1 having an inclined-surface structure, and a second surface 433*s*2 having a planar structure.

The second surface 433*s*2 of the vibration portion 433*a* may include a planar surface or a flat surface. For example, the second surface 433*s*2 of the vibration portion 433*a* may be parallel to a first surface (or an upper surface) of a second base member 112.

The first surface 433*s*1 of the vibration portion 433*a* may have an inclined-surface structure which is inclined from ends EP1 and EP2 (or one side) of the second vibration structure 430 to the center line CL, with respect to the first direction X. A distance (or a thickness) between the first surface 433*s*1 and the second surface 433*s*2 of the vibration portion 433*a* may decrease progressively in a direction from the ends EP1 and EP2 (or one side) of the second vibration structure 430 to the center line CL.

The first surface 433*s*1 of the vibration portion 433*a* according to an embodiment of the present disclosure may include an inclined surface IS which is inclined to have a predetermined slope. For example, the first surface 433*s*1 of the vibration portion 433*a* may include the inclined surface IS which is formed by a molding process using a piezoelectric material.

According to an embodiment of the present disclosure, in the vibration portion 433*a*, an included angle θ between the inclined surface IS of the first surface 433*s*1 and the second surface 433*s*2 may be an acute angle. For example, the included angle θ between the inclined surface IS of the first surface 433*s*1 and the second surface 433*s*2 may be set to a range of 10 degrees to 75 degrees, but embodiments of the present disclosure are not limited thereto. For example, the included angle θ may be adjusted based on a focal length of beamforming of a directional sound wave and/or a directional angle of a sound wave having a directivity.

According to an embodiment of the present disclosure, a height of the inclined surface IS of the first surface 433*s*1 may be lowered progressively in a direction from the ends EP1 and EP2 (or the one side) of the second vibration structure 430 to the center line CL, with respect to the first direction X. For example, the inclined surface IS of the first surface 433*s*1 may be inclined with respect to the second surface 433*s*2, and thus, with respect to the thickness direction Z of the vibration apparatus, a distance or a thickness between the inclined surface IS of the first surface 433*s*1 and the second surface 433*s*2 may decrease progressively in a direction from the ends EP1 and EP2 (or the one side) of the second vibration structure 430 to the center line CL.

According to an embodiment of the present disclosure, in the first vibration generating part of the pair of vibration generating parts 433, a height of the inclined surface IS of the first surface 433*s*1 may be lowered progressively in a direction from a first side EP1 of the second vibration structure 430 to the center line CL. In the second vibration generating part of the pair of vibration generating parts 433, a height of the inclined surface IS of the first surface 433*s*1 may be lowered progressively in a direction from a second side EP2 of the second vibration structure 430 to the center line CL. Accordingly, the pair of vibration generating parts 433 may have a symmetrical structure with respect to the center line CL in the first direction X.

The first electrode layer 433*b* may be disposed at the first surface 433*s*1 of the vibration portion 433*a*. The first electrode layer 433*b* may directly contact the first surface 433*s*1 of the vibration portion 433*a*, and thus, may include an inclined surface which is inclined to be identical to the first surface 433*s*1 of the vibration portion 433*a*. Except for that the first electrode layer 433*b* includes the inclined surface, the first electrode layer 433*b* may be substantially the same as the first electrode layer 113*b* described above with reference to FIG. 3, and thus, its repetitive description may be omitted.

The second electrode layer 433*c* may be disposed at the second surface 433*s*2 of the vibration portion 433*a*. The second electrode layer 433*c* may directly contact the second surface 433*s*2 of the vibration portion 433*a*, and thus, may have the same planar structure as the second surface 433*s*2 of the vibration portion 433*a*. The second electrode layer 433*c* may be substantially the same as the second electrode layer 113*c* described above with reference to FIG. 3, and thus, its repetitive description may be omitted.

The vibration portion 433*a* of each of the pair of vibration generating parts 433 may vibrate based on a second vibration driving signal supplied to the first electrode layer 433*b* and the second electrode layer 433*c* to generate an orientation sound wave which travels toward the center line CL of the vibration apparatus. For example, the orientation sound wave may be output in a direction parallel to the inclined surface of the vibration portion 433*a*, and thus, may have an orientation which concentrates on a forward region apart from the center line CL of the vibration apparatus.

The second vibration structure 430 according to an embodiment of the present disclosure may further include an adhesive layer 114 which is disposed between the first base member 111 and the second base member 112 to surround side surfaces (or sidewalls) of the pair of vibration generating parts 433.

The adhesive layer 114 may opposite-bond the first base member 111 to the second base member 112 with the pair of vibration generating parts 433 therebetween. The adhesive layer 114 may be disposed in a region, other than the pair of vibration generating parts 433, of a region between the first base member 111 and the second base member 112. The adhesive layer 114 may be substantially the same as the adhesive layer 114 described above with reference to FIGS. 3 and 4, and thus, like reference numerals refer to like elements and their repetitive descriptions may be omitted.

The second vibration structure 130 according to an embodiment of the present disclosure may further include a pair of first power supply electrodes 115 and a pair of second power supply electrodes 116.

Each of the pair of first power supply electrodes 115 may be disposed between the pair of vibration generating parts 433 and the first base member 111 and may be electrically connected to the first electrode layer 433*b* of each of the pair of vibration generating parts 433. Except for that each of the pair of first power supply electrodes 115 may be disposed at the second surface of the first base member 111 to overlap each of the pair of vibration generating parts 433 and is electrically connected to the first electrode layer 433*b* of each of the pair of vibration generating parts 433, each of the pair of first power supply electrodes 115 may be substantially the same as each of the plurality of first power supply electrodes 115 described above with reference to FIGS. 3 and 4, and thus, like reference numerals refer to like elements and their repetitive descriptions may be omitted.

According to an embodiment of the present disclosure, each of the pair of first power supply electrodes 115 may be electrically connected to the first electrode layer 433*b* of each of the pair of vibration generating parts 433 by an anisotropic conductive film. According to another embodiment of the present disclosure, each of the pair of first power supply electrodes 115 may be electrically connected to the first electrode layer 433*b* of each of the pair of vibration generating parts 433 through a conductive material (or particle) included in the adhesive layer 114 or the first adhesive layer 114*a*, instead of the anisotropic conductive film.

Each of the pair of second power supply electrodes 116 may be disposed between the pair of vibration generating parts 433 and the second base member 112 and may be electrically connected to the second electrode layer 433*c* of each of the pair of vibration generating parts 433. Except for that each of the pair of second power supply electrodes 116 may be disposed at the first surface of the second base member 112 to overlap each of the pair of vibration generating parts 433 and is electrically connected to the second electrode layer 433*c* of each of the pair of vibration generating parts 433, each of the pair of second power supply electrodes 116 may be substantially the same as each of the plurality of second power supply electrodes 116 described above with reference to FIGS. 3 and 4, and thus, like reference numerals refer to like elements and their repetitive descriptions may be omitted.

According to an embodiment of the present disclosure, each of the pair of second power supply electrodes 116 may be electrically connected to the second electrode layer 433*c* of each of the pair of vibration generating parts 433 by an anisotropic conductive film. According to another embodiment of the present disclosure, each of the pair of second power supply electrodes 116 may be electrically connected to the second electrode layer 433*c* of each of the pair of vibration generating parts 433 through a conductive material (or particle) included in the adhesive layer 114 or the second adhesive layer 114*b*, instead of the anisotropic conductive film.

The second vibration structure 430 according to an embodiment of the present disclosure may include a pair of first power supply lines 117, a pair of second power supply lines 118, and a pad part 119.

Each of the pair of first power supply lines 117 may be electrically connected to each of the pair of first power supply electrodes 115. Each of the pair of first power supply lines 117 may be directly formed at a second surface (or a rear surface) of the first base member 111 along with each of the pair of first power supply electrodes 115.

Each of the pair of second power supply lines 118 may be electrically connected to each of the pair of second power supply electrodes 116. Each of the pair of second power supply lines 118 may be directly formed at a first surface (or a front surface) of the second base member 112 along with each of the pair of second power supply electrodes 116.

The pad part 119 may be disposed at the first periphery portion of the second surface periphery portion of the first base member 111 and the first periphery portion of the first surface periphery portion of the second base member 112.

The pad part 119 according to an embodiment of the preset disclosure may include a pair of first pads 119*a* electrically connected to each of the pair of first power supply lines 117, and a pair of second pads 119*b* electrically connected to each of the pair of second power supply lines 118.

Each of the pair of first pads 119*a* and the pair of second pads 119*a* may be exposed at the outside through a pad hole formed at any one or more of the first base member 111 and the second base member 112.

The second vibration structure 430 according to an embodiment of the present disclosure may further include a flexible cable FC connected to the pad part 119. The flexible cable FC may be electrically connected to the pad part 119. Therefore, the flexible cable FC may transfer a second vibration driving signal supplied from a vibration driving circuit to a corresponding pad part 119. Except for that the flexible cable FC includes a plurality of first signal transfer lines STL1 electrically connected to each of the pair of first pads 119*a* and a plurality of second signal transfer lines STL1 electrically connected to each of the pair of second pads 119*b*, the flexible cable FC may be substantially the same as the flexible cable FC described above with reference to FIGS. 3 and 4, and thus, like reference numerals refer to like elements and its repetitive description may be omitted.

Figure 39:
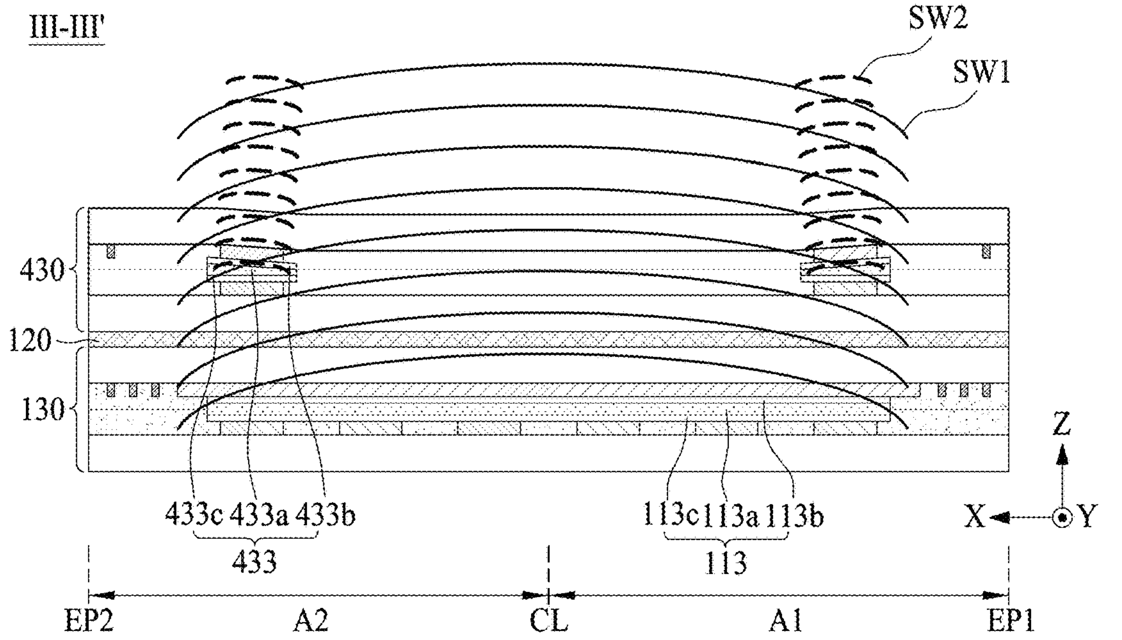
FIG. 39 illustrates a sound output of the vibration apparatus illustrated in FIG. 31.

As described above, in the vibration apparatus according to another embodiment of the present disclosure, as illustrated in FIG. 39, the second vibration structure 430 and the first vibration structure 110 may overlap or may be stacked, and the vibration apparatus may output a sound having a directivity or a directional angle based on the first sound wave SW1 generated from the first vibration structure 110 and a directional sound wave (or the second sound wave) SW2 generated from the second vibration structure 430. Therefore, in the vibration apparatus according to another embodiment of the present disclosure, an overlap region between the first sound wave SW1 and the orientation sound wave SW2 may form (or implement) an audible region which enables a user to listen to a sound, based on a beating phenomenon between the first sound wave SW1 and the directional sound wave SW2, and a region outside a focal length of the orientation sound wave SW2 or a non-overlap region between the first sound wave SW1 and the directional sound wave SW2 may form (or implement) an inaudible region which disables a user to listen to a sound.

Figure 40:
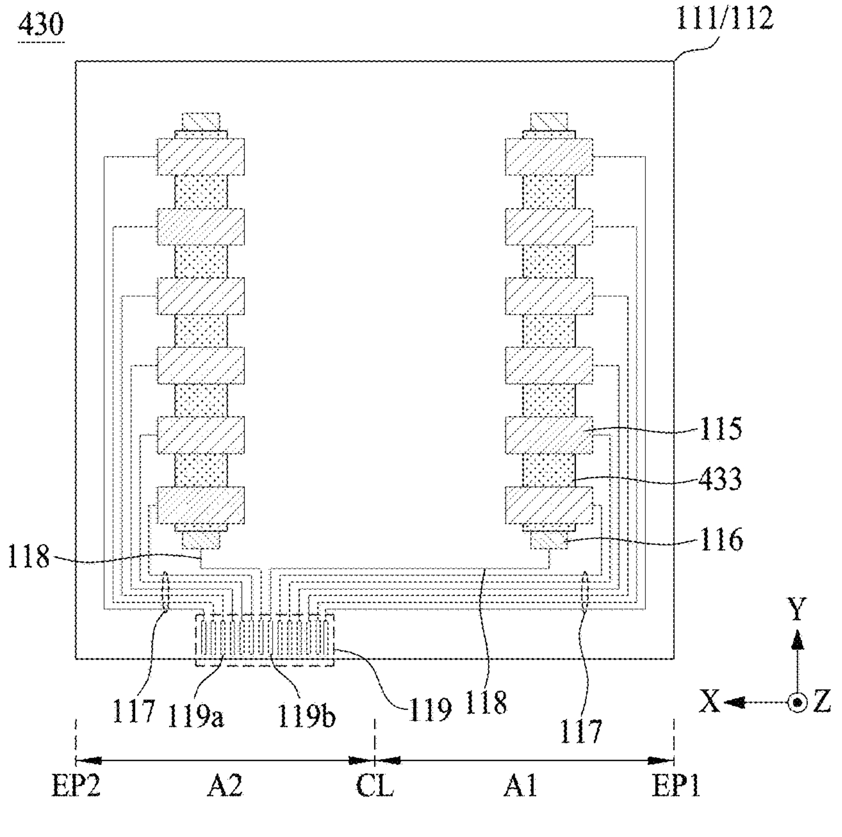
FIG. 40 illustrates a second vibration structure according to another embodiment of the present disclosure illustrated in FIG. 31.

FIG. 40 illustrates a second vibration structure 430 according to another embodiment of the present disclosure illustrated in FIG. 31 and illustrates an embodiment implemented by modifying the first power supply electrode in the second vibration structure described above with reference to FIGS. 36 to 39. In the following description, therefore, repetitive descriptions of elements other than a first power supply electrode and elements relevant thereto may be omitted or will be briefly given below.

With reference to FIGS. 36 and 40, the second vibration structure 430 according to another embodiment of the present disclosure may include a plurality of first power supply electrodes 115.

Each of the plurality of first power supply electrodes 115 may be disposed between each of a pair of vibration generating parts 433 and a first base member 111 and may be spaced apart from one another by having a predetermined interval in a second direction Y.

Each of the plurality of first power supply electrodes 115 according to an embodiment of the present disclosure may have an island shape where the plurality of first power supply electrodes 115 are disposed at the pair of vibration generating parts 433 overlapping each of the pair of second power supply electrodes 116. For example, each of the plurality of first power supply electrodes 115 may have a rectangular shape where the plurality of first power supply electrodes 115 intersect with the pair of second power supply electrodes 116 in a first direction X, but embodiments of the present disclosure are not limited thereto. For example, the plurality of first power supply electrodes 115 may be divided from one another in a second direction Y.

Each of the plurality of first power supply electrodes 115 may be partially connected to a first electrode layer 433*b* of each of the pair of vibration generating parts 433.

Each of the plurality of first power supply electrodes 115 may be electrically connected to a pad part 119 through a corresponding first power supply line 117 of a plurality of first power supply lines 117. The pad part 119 may include a plurality of first pads 119*a* which are electrically connected to the plurality of first power supply lines 117, respectively.

Each of the pair of vibration generating parts 433 may include a plurality of vibration generating regions formed in a plurality of intersection portions (or intersection regions) between the plurality of first power supply electrodes 115 and the pair of second power supply electrodes 116. Each of the pair of vibration generating parts 433 may generate a sound wave based on the repeated contraction and expansion of a vibration portion 433*a* corresponding to each of a plurality of vibration generating regions. For example, each of the plurality of vibration generating regions may individually vibrate based on a second vibration driving signal selectively supplied through a corresponding first power supply electrode 115 of the plurality of first power supply electrodes 115 to generate a sound wave.

As described above, the second vibration structure 430 according to an embodiment of the present disclosure may generate the same or different sound waves based on the individual vibrations of the vibration generating regions of the pair of vibration generating parts 433 overlapping each of the plurality of first power supply electrodes 115.

Figure 41:
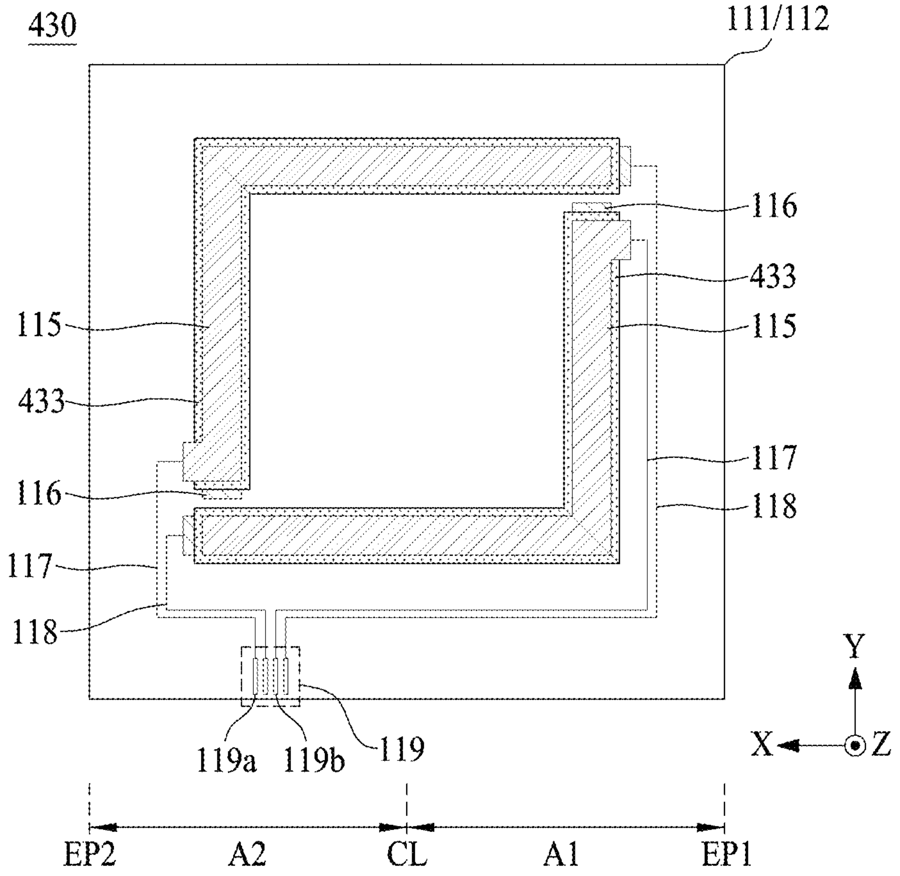
FIG. 41 illustrates a second vibration structure according to another embodiment of the present disclosure illustrated in FIG. 31.

FIG. 41 illustrates a second vibration structure 430 according to another embodiment of the present disclosure illustrated in FIG. 31 and illustrates an embodiment implemented by modifying the vibration generating part in the second vibration structure described above with reference to FIGS. 36 to 39. In the following description, therefore, repetitive descriptions of elements other than a vibration generating part and elements relevant thereto may be omitted or will be briefly given below.

With reference to FIGS. 36 and 41, the second vibration structure 430 according to another embodiment of the present disclosure may include a pair of vibration generating parts 433 having a nonlinear shape.

The pair of vibration generating parts 433 may be disposed at a periphery portion of the second vibration structure 430 to overlap a periphery portion of a first vibration structure 410. For example, each of the pair of vibration generating parts 433 may be formed to have a planar structure having an L-shape and may be disposed at the periphery portion of the second vibration structure 430.

According to an embodiment of the present disclosure, a first vibration generating part of the pair of vibration generating parts 433 may be formed to have a planar shape having a ⌋-shape and may be disposed at a first periphery portion and a second periphery portion of the second vibration structure 430. A second vibration generating part of the pair of vibration generating parts 433 may be formed to have a planar shape having a ⌜-shape and may be disposed at a third periphery portion and a fourth periphery portion of the second vibration structure 430.

Each of the pair of vibration generating parts 433, as illustrated in FIG. 38, may include a vibration portion 433*a* including a piezoelectric material, a first electrode layer 433*b* disposed at a first surface of the vibration portion 433*a*, and a second electrode layer 433*c* disposed at a second surface of the vibration portion 433*a*. The vibration portion 433*a* of the pair of vibration generating parts 433 may include a first surface 433*s*1 having an inclined-surface structure and a second surface 433*s*2 having a planar structure. Except for that each of the pair of vibration generating parts 433 has a planar structure having an L-shape, each of the pair of vibration generating parts 433 may be the same as each of the pair of vibration generating parts 433 described above with reference to FIGS. 36 to 39, and thus, like reference numerals refer to like elements and their repetitive descriptions may be omitted.

Each of the pair of vibration generating parts 433 may generate an orientation sound wave which travels in a specific direction, based on an inclined surface of the vibration portion 433*a*. For example, a sound wave generated based on a vibration (or displacement) of each of the pair of vibration generating part 433 may have a directivity where a sound wave travels in a forward direction of a center portion of the vibration apparatus.

The second vibration structure 430 according to another embodiment of the present disclosure may further include a pair of first power supply electrodes 115 and a pair of second power supply electrodes 116.

Each of the pair of first power supply electrodes 115 may be disposed between a first base member 111 and a corresponding vibration generating part of the pair of vibration generating parts 433 and may be electrically connected to a first electrode layer of a corresponding vibration generating part of the pair of vibration generating parts 433. Except for that each of the pair of first power supply electrodes 115 has a planar structure having an L-shape where each of the pair of first power supply electrodes 115 overlaps a corresponding vibration generating part 433 of the pair of vibration generating parts 433, each of the pair of first power supply electrodes 115 may be the same as each of the pair of first power supply electrodes 115 described above with reference to FIGS. 36 and 37, and thus, like reference numerals refer to like elements and their repetitive descriptions may be omitted.

Each of the pair of second power supply electrodes 116 may be disposed between a second base member 112 and a corresponding vibration generating part of the pair of vibration generating parts 433 and may be electrically connected to a second electrode layer of a corresponding vibration generating part of the pair of vibration generating parts 433. Except for that each of the pair of first power supply electrodes 116 has a planar structure having an L-shape where each of the pair of first power supply electrodes 116 overlaps a corresponding vibration generating part 433 of the pair of vibration generating parts 433, each of the pair of first power supply electrodes 116 may be the same as each of the pair of first power supply electrodes 116 described above with reference to FIGS. 36 and 37, and thus, like reference numerals refer to like elements and their repetitive descriptions may be omitted.

The second vibration structure 430 according to an embodiment of the present disclosure may further include a pair of first power supply lines 117, a pair of second power supply lines 118, a pad part 119, and a flexible cable FC. Each of the pair of first power supply lines 117, the pair of second power supply lines 118, the pad part 119, and the flexible cable FC of the second vibration structure 430 according to an embodiment of the present disclosure may be as described above with reference to FIGS. 36 and 37, and thus, like reference numerals refer to like elements and their repetitive descriptions may be omitted.

As described above, the second vibration structure 430 according to another embodiment of the present disclosure may generate a sound wave having a directivity which travels in a specific direction, based on the vibration portion 433*a* including an inclined surface provided in each of the pair of vibration generating parts 433.

Figure 42:
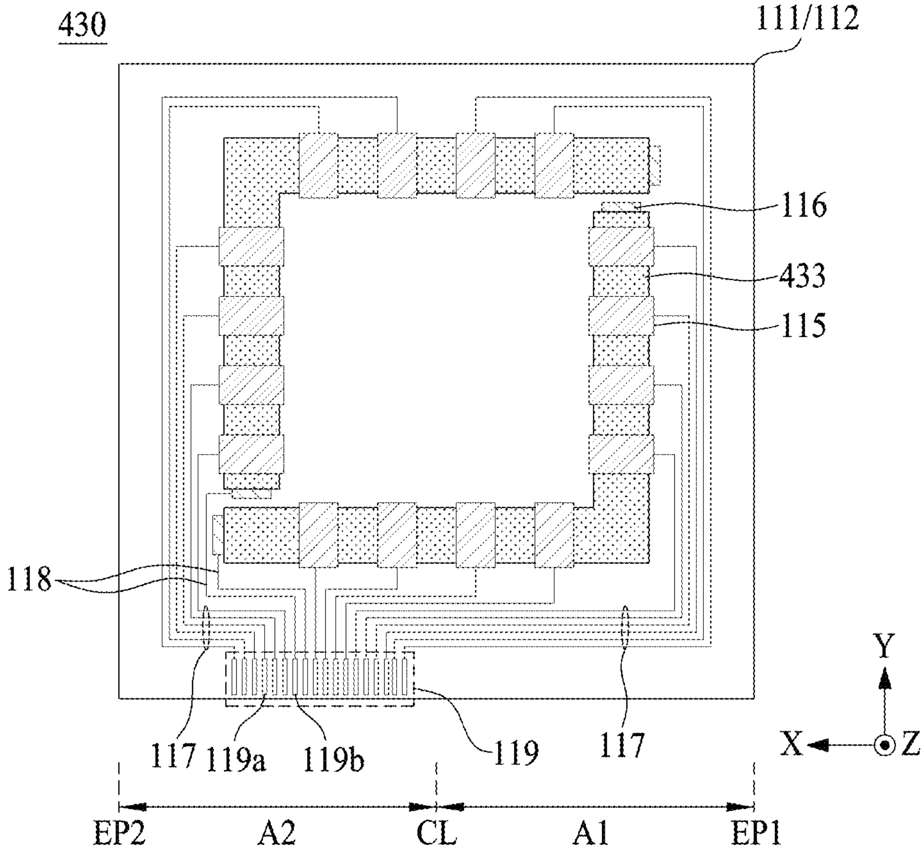
FIG. 42 illustrates a second vibration structure according to another embodiment of the present disclosure illustrated in FIG. 31.

FIG. 42 illustrates a second vibration structure 430 according to another embodiment of the present disclosure illustrated in FIG. 31 and illustrates an embodiment implemented by modifying the first power supply electrode in the second vibration structure described above with reference to FIG. 41. In the following description, therefore, repetitive descriptions of elements other than a first power supply electrode and elements relevant thereto may be omitted or will be briefly given below.

With reference to FIGS. 36 and 42, the second vibration structure 430 according to another embodiment of the present disclosure may include a plurality of first power supply electrodes 115.

The plurality of first power supply electrodes 115 may each be disposed between each of a pair of vibration generating parts 433 and a first base member 111 and may be spaced apart from one another by having a predetermined interval in a first direction X and a second direction Y.

Each of the plurality of first power supply electrodes 115 according to an embodiment of the present disclosure may have an island shape where the plurality of first power supply electrodes 115 are disposed at the pair of vibration generating parts 433 overlapping each of the pair of second power supply electrodes 116. For example, each of the plurality of first power supply electrodes 115 may have a rectangular shape where the plurality of first power supply electrodes 115 intersect with the pair of second power supply electrodes 116 in a first direction X, but embodiments of the present disclosure are not limited thereto. For example, the plurality of first power supply electrodes 115 may be divided from one another in the first direction X and a second direction Y.

Each of the plurality of first power supply electrodes 115 may be partially connected to a first electrode layer 433*b* of each of the pair of vibration generating parts 433.

Each of the plurality of first power supply electrodes 115 may be electrically connected to a pad part 119 through a corresponding first power supply line 117 of a plurality of first power supply lines 117. The pad part 119 may include a plurality of first pads 119*a* which are electrically connected to the plurality of first power supply lines 117, respectively.

Each of the pair of vibration generating parts 433 may include a plurality of vibration generating regions formed in a plurality of intersection portions (or intersection regions) between the plurality of first power supply electrodes 115 and the pair of second power supply electrodes 116. Each of the pair of vibration generating parts 433 may generate a sound wave based on the repeated contraction and expansion of a vibration portion 433*a* corresponding to each of a plurality of vibration generating regions. For example, each of the plurality of vibration generating regions may individually vibrate based on a second vibration driving signal selectively supplied through a corresponding first power supply electrode 115 of the plurality of first power supply electrodes 115 to generate a sound wave.

As described above, the second vibration structure 430 according to an embodiment of the present disclosure may generate the same or different sound waves based on the individual vibrations of the vibration generating regions of the pair of vibration generating parts 433 respectively overlapping the plurality of first power supply electrodes 115.

Figure 43:
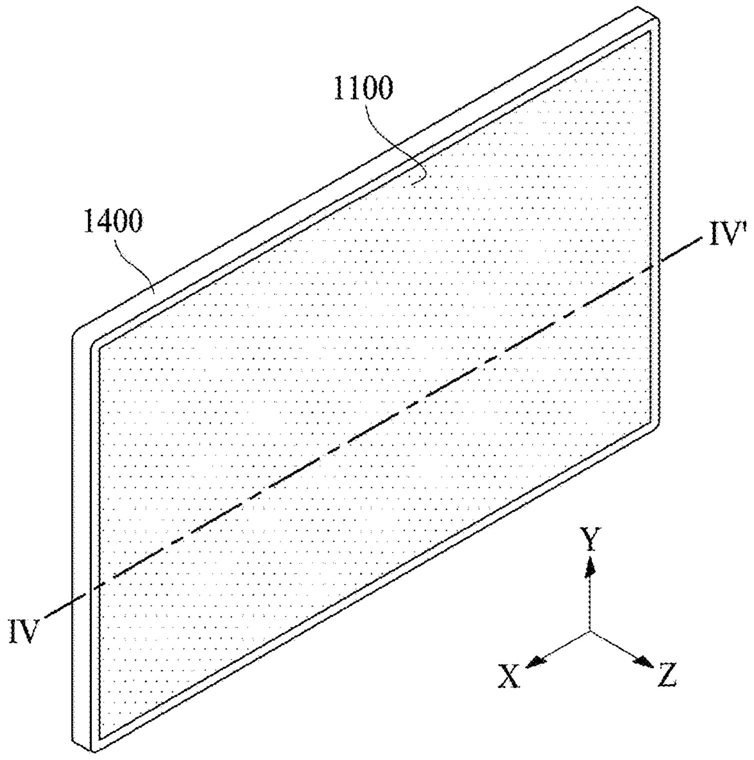
FIG. 43 illustrates an apparatus according to an embodiment of the present disclosure.
Figure 44:
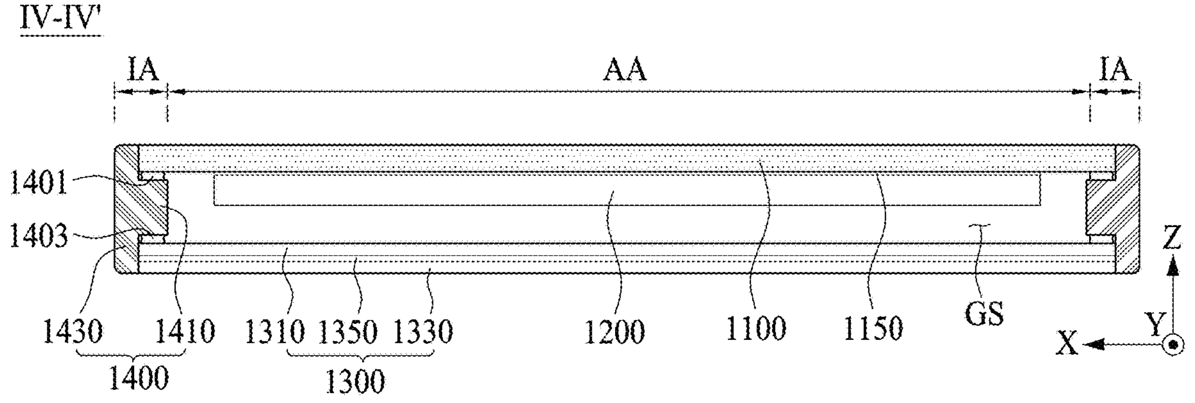
FIG. 44 is a cross-sectional view taken along line IV-IV' illustrated in FIG. 43.

FIG. 43 illustrates an apparatus according to an embodiment of the present disclosure, and FIG. 44 is a cross-sectional view taken along line IV-IV' illustrated in FIG. 43.

With reference to FIGS. 43 and 44, an apparatus (or a display apparatus) according to an embodiment of the present disclosure may include a display panel (a vibration object or a vibration member) 1100 to display an image, and a vibration generating apparatus 1200 to vibrate the display panel 1100 at a rear surface (or a backside surface) of the display panel 100.

The display panel 1100 may display an electronic image or a digital image. For example, the display panel 1100 may output light to display an image. The display panel 1100 may be a curved display panel, or may be any type of display panel, such as a liquid crystal display panel, an organic light-emitting display panel, a quantum dot light-emitting display panel, a micro light-emitting diode display panel, and an electrophoresis display panel, or the like. The display panel 1100 may be a flexible display panel. For example, the display panel 1100 may a flexible light emitting display panel, a flexible electrophoretic display panel, a flexible electro-wetting display panel, a flexible micro light emitting diode display panel, or a flexible quantum dot light emitting display panel, but embodiments of the present disclosure are not limited thereto.

The display panel 1100 according to an embodiment of the present disclosure may include a display area AA (or an active area) for displaying an image according to driving of the plurality of pixels. Also, the display panel 1100 may further include a non-display area IA surrounding the display area AA, but embodiments of the present disclosure are not limited thereto.

The display panel 1100 according to an embodiment of the present disclosure may include a pixel array portion disposed at the display area AA of the substrate. The pixel array portion may include a plurality of pixels which display an image based on a signal supplied through the signal lines. The signal lines may include a gate line, a data line and a pixel driving power line, or the like, but embodiments of the present disclosure are not limited thereto.

Each of the plurality of pixels may include a pixel circuit layer including a driving thin film transistor (TFT) provided at the pixel area which is configured by a plurality of gate lines and/or a plurality of data lines, a first electrode (or a pixel electrode) electrically connected to the driving TFT, a light emitting device formed at the anode electrode, and a second electrode (or a common electrode) electrically connected to the light emitting device.

The light emitting device according to an embodiment of the present disclosure may include an organic light emitting device layer formed at the first electrode. The organic light emitting device layer may be implemented to emit light having the same color (for example, white light) for each pixel, or may be implemented to emit light having a different color (for example, red light, green light, or blue light) for each pixel.

The light emitting device according to another embodiment of the present disclosure may include may include a micro light emitting diode device electrically connected to each of the first electrode and the second electrode. The micro light emitting diode device may be a light emitting diode implemented as an integrated circuit (IC) or chip type. The micro light emitting diode device may include a first terminal electrically connected to the first electrode and a second terminal electrically connected to the second electrode.

The display panel 1100 according to another embodiment of the present disclosure may include a first substrate, a second substrate, and a liquid crystal layer. The first substrate may be an upper substrate or a thin film transistor (TFT) array substrate. For example, the first substrate may include a pixel array including a plurality of pixels which are respectively provided in a plurality of pixel areas defined by intersections of a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage. For example, the second substrate may be include a pixel defining pattern including an opening area overlapping with the pixel area formed in the first substrate, and a color filter layer formed at the opening area. The liquid crystal layer may be disposed between the first substrate and the second substrate. The liquid crystal layer may include a liquid crystal including liquid crystal molecules where an alignment direction thereof is changed based on an electric field generated by the common voltage and a data voltage applied to a pixel electrode for each pixel.

The vibration generating apparatus 1200 may vibrate the display panel 1100 at the rear surface of the display panel 1100, thereby providing a sound and/or a haptic feedback based on the vibration of the display panel 1100 to a user. The vibration generating apparatus 1200 may be implemented at the rear surface of the display panel 1100 to directly vibrate the display panel 1100.

As an embodiment of the present disclosure, the vibration generating apparatus 1200 may vibrate according to a vibration driving signal synchronized with an image displayed by the display panel 1100 to vibrate the display panel 1100. As another embodiment of the present disclosure, the vibration generating apparatus 1200 may vibrate according to a haptic feedback signal (or a tactile feedback signal) synchronized with a user touch applied to a touch panel (or a touch sensor layer) which is disposed at the display panel 1100 or embedded into the display panel 1100 and may vibrate the display panel 1100. Accordingly, the display panel 1100 may vibrate based on a vibration of the vibration generating apparatus 1200 to provide a user (or a viewer) with at least one or more of a sound and a haptic feedback.

The vibration generating apparatus 1200 according to an embodiment of the present disclosure may be implemented to have a size corresponding to the display area AA of the display panel 1100. A size of the vibration generating apparatus 1200 may be 0.9 to 1.1 times a size of the display area AA, but embodiments of the present disclosure are not limited thereto. For example, a size of the vibration generating apparatus 1200 may be the same as or smaller than the size of the display area AA. For example, a size of the vibration generating apparatus 1200 may be the same as or approximately same as the display area AA of the display panel 1100, and thus, the vibration generating apparatus 1200 may cover a most region of the display panel 1100 and a vibration generated by the vibration generating apparatus 1200 may vibrate a whole portion of the display panel 1100, and thus, localization of a sound may be high, and satisfaction of a user may be improved. Also, a contact area (or panel coverage) between the display panel 1100 and the vibration generating apparatus 1200 may increase, and thus, a vibration region of the display panel 1100 may increase, thereby improving a sound of a middle-low-pitched sound band generated based on a vibration of the display panel 1100. Also, a vibration generating apparatus 1200 applied to a large-sized display apparatus may vibrate a whole display panel 1100 having a large size (or a large area), and thus, localization of a sound based on a vibration of the display panel 1100 may be further enhanced, thereby realizing an improved sound effect.

The vibration generating apparatus 1200 according to an embodiment of the present disclosure may include one or more of the vibration apparatus described above with reference to FIGS. 1 to 42, and thus, its repetitive description may be omitted.

The apparatus according to an embodiment of the present disclosure may further include a connection member 1150 disposed between the display panel 1100 and the vibration generating apparatus 1200.

The connection member 1150 may be disposed between the display panel 1100 and the vibration generating apparatus 1200, and thus, may connect or couple the vibration generating apparatus 1200 to the rear surface of the display panel 1100. For example, the vibration generating apparatus 200 may be directly connected or coupled to the rear surface of the display panel 1100 by the connection member 1150, and thus, may be supported by or disposed at the rear surface of the display panel 1100.

The connection member 1150 according to an embodiment of the present disclosure may be configured as a material including an adhesive layer which is good in adhesive force or attaching force with respect to each of the rear surface of the display panel 1100 and the vibration generating apparatus 200. For example, the connection member 1150 may include a foam pad, a double-sided tape, or an adhesive, but embodiments of the present disclosure are not limited thereto. For example, the adhesive layer of the connection member 1150 may include epoxy, acrylic, silicone, or urethane, but embodiments of the present disclosure are not limited thereto. For example, the adhesive layer of the connection member 1150 may differ from the adhesive layer of the adhesive member 120. For example, the adhesive layer of the connection member 1150 may include an acrylic-based material which is relatively better in adhesive force and hardness of acrylic and urethane. Accordingly, a vibration of the vibration generating apparatus 1200 may be transferred to the display panel 1100 well.

The connection member 1150 according to another embodiment of the present disclosure may further include a hollow portion between the display panel 1100 and the vibration generating apparatus 1200. The hollow portion of the connection member 1150 may provide an air gap between the display panel 1100 and the vibration generating apparatus 1200. Due to the air gap, a sound wave (or a sound pressure) based on a vibration of the vibration generating apparatus 1200 may not be dispersed by the connection member 1150, and may concentrate on the display panel 1100. Thus, the loss of a vibration caused by the connection member 1150 may be minimized, thereby increasing a sound pressure characteristic of a sound generated based on a vibration of the display panel 1100.

The apparatus according to an embodiment of the present disclosure may further include a supporting member 1300 disposed at a rear surface of the display panel 1100.

The supporting member 1300 may cover a rear surface of the display panel 1100. For example, the supporting member 1300 may cover a whole rear surface of the display panel 1100 with a gap space GS therebetween. For example, the supporting member 1300 may include at least one or more of a glass material, a metal material, and a plastic material. For example, the supporting member 1300 may be referred to as a rear surface structure, a set structure, a cover bottom, or a back cover, but embodiments of the present disclosure are not limited thereto.

The supporting member 1300 according to an embodiment of the present disclosure may include a first supporting member 1310 and a second supporting member 1330.

The first supporting member 1310 may cover a rear surface of the display panel 1100. For example, the first supporting member 1310 may be a member which covers a whole rear surface of the display panel 1100. For example, the first supporting member 1310 may include at least one or more materials of a glass material, a metal material, and a plastic material. For example, the first supporting member 1310 may be an inner plate, but embodiments of the present disclosure are not limited thereto.

The first supporting member 1310 may be spaced apart from a rearmost surface of the display panel 1100 or the vibration generating apparatus 1200 with a gap space GS therebetween. For example, the gap space GS may be referred to as an air gap, a vibration space, a sound resonance box, or the like, but embodiments of the present disclosure are not limited thereto.

The second supporting member 1330 may be disposed at a rear surface of the first supporting member 1310. The second supporting member 1330 may be a plate-shaped member which covers the whole rear surface of the first supporting member 1310. For example, the second supporting member 1330 may include at least one or more materials of a glass material, a metal material, and a plastic material. For example, the second supporting member 1330 may be an outer plate, a rear plate, a back plate, a back cover, or a rear cover, but embodiments of the present disclosure are not limited thereto.

The supporting member 1300 according to an embodiment of the present disclosure may further include a coupling member (or a connection member) 1350. The coupling member 1350 may be disposed between the first supporting member 1310 and the second supporting member 1330. For example, the first supporting member 1310 and the second supporting member 1330 may be coupled or connected to each other by the coupling member 1350. For example, the coupling member 1350 may be an adhesive resin, a double-sided tape, or a double-sided adhesive foam pad, but embodiments of the present disclosure are not limited thereto. For example, the coupling member 1350 may have elasticity for absorbing an impact, but embodiments of the present disclosure are not limited thereto. As an embodiment of the present disclosure, the coupling member 1350 may be disposed at a whole region between the first supporting member 1310 and the second supporting member 1330. As another embodiment of the present disclosure, the coupling member 1350 may be provided in a mesh structure (or a mesh shape) including an air gap between the first supporting member 1310 and the second supporting member 1330.

The apparatus according to an embodiment of the present disclosure may further include a middle frame 1400.

The middle frame 1400 may be disposed between a rear periphery portion of the display panel 1100 and a front periphery portion of the supporting member 1300. The middle frame 1400 may support at least one or more of the rear periphery portion of the display panel 1100 and the front periphery portion of the supporting member 1300, respectively, and may surround one or more of side surfaces of each of the display panel 1100 and the supporting member 1300, respectively. The middle frame 1400 may provide a gap space GS between the display panel 1100 and the supporting member 1300.

According to an embodiment of the present disclosure, the middle frame 1400 may be coupled or connected to the rear periphery portion of the display panel 1100 by a first connection member 1401. The middle frame 1400 may be coupled or connected to the rear periphery portion of the supporting member 1300 by a second connection member 1403. The middle frame 1400 may include a first supporting portion 1410 and a second supporting portion 1430. A front surface of the first supporting portion 1410 may be coupled or connected to the rear periphery of the display panel 1100 by the first frame connection member 1401. A rear surface of the first supporting portion 1410 may be coupled or connected to the front periphery of the supporting member 1300 by the second frame connection member 403. The second supporting portion 1430 may be vertically coupled to an outer surface of the first supporting portion 1410 in parallel with a thickness direction Z of the apparatus.

The apparatus according to an embodiment of the present disclosure may include the panel connection member or adhesive member instead of the middle frame 1400. The panel connection member may be disposed between the rear periphery portion of the display panel 1100 and the front periphery portion of the supporting member 1300 and may provide the gap space GS between the display panel 1100 and the supporting member 1300. The panel connection member may be disposed between the rear periphery portion of the display panel 1100 and the front periphery portion of the supporting member 1300 to adhere the display panel 1100 and the support member 1300.

As described above, the apparatus (or a display apparatus) according to an embodiment of the present disclosure may output a sound, generated by a vibration of the display panel 1100 based on a vibration of the vibration generating apparatus 1200 disposed at the rear surface of the display panel 1100, to a forward region in front of the display panel 1100 or the apparatus (or the display apparatus), may concentrate or focus in a specific direction a sound generated based on a vibration of the vibration generating apparatus 1200, and thus, may implement a user's privacy protection function of allowing a sound not to be listened in a periphery region (or an inaudible region) other than a region (or an audible region) in a specific direction.

In FIGS. 43 and 44, it has been described that the vibration generating apparatus 1200 vibrates the display panel 1100 to generate or output a sound, but embodiments of the present disclosure are not limited thereto. For example, the vibration generating apparatus 1200 may vibrate other vibration object (or vibration member) other than the display panel 1100 of the vibration object described above, to generate or output a sound.

Figure 45:
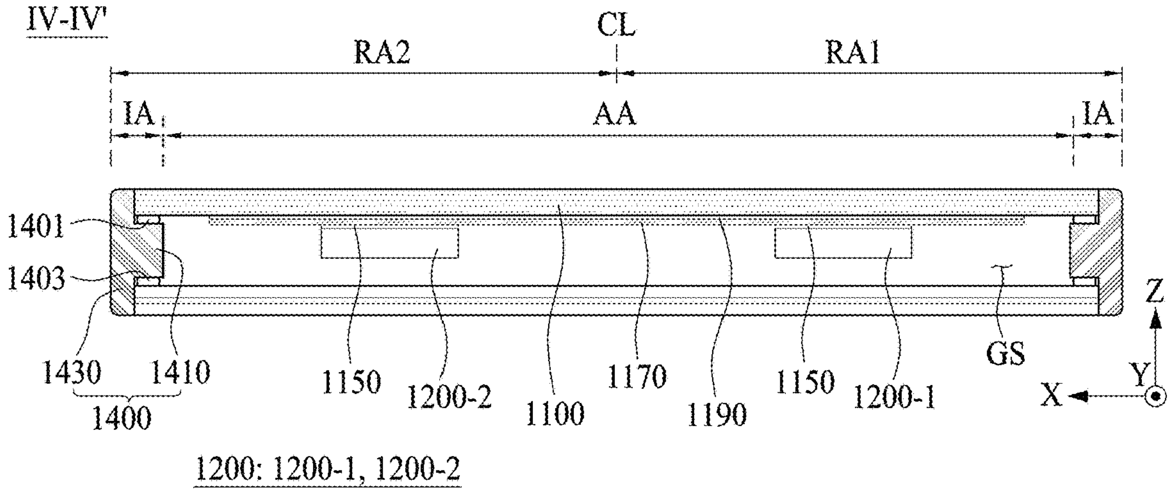
FIG. 45 is another cross-sectional view taken along line IV-IV' illustrated in FIG. 43.

FIG. 45 is another cross-sectional view taken along line IV-IV' illustrated in FIG. 43. FIG. 45 illustrates an embodiment implemented by modifying a vibration generating apparatus illustrated in FIG. 44. Therefore, in the following description, repetitive descriptions of elements other than the vibration generating apparatus and elements relevant thereto may be omitted or will be briefly given.

With reference to FIGS. 43 and 45, in the apparatus according to another embodiment of the present disclosure, a display panel 1100 (or a vibration object or a vibration member) may include a first rear region RA1 and a second rear region RA2. For example, the first rear region RA1 may be a right rear region, and the second rear region RA2 may be a left rear region. The first and second rear regions RA1 and RA2 may be a left-right symmetrical with respect to a center line CL of the display panel 1100 in a first direction X, but embodiments of the present disclosure are not limited thereto. For example, each of the first and second rear regions RA1 and RA2 may overlap the display area AA of the display panel 1100.

The vibration generating apparatus 1200 according to another embodiment of the present disclosure may include a first vibration generating device 1200-1 and a second vibration generating device 1200-2.

The first vibration generating device 1200-1 may be disposed at the first rear region RA1 of the display panel 1100. A size of the first vibration generating device 1200-1 may have the same size as the first rear area RA1 of the display panel 1100 or may have a size smaller than the first rear area RA1 of the display panel 1100 based on a characteristic of a first sound or a sound characteristic needed for the apparatus. For example, the first vibration generating device 1200-1 may be disposed close to a center or a periphery within the first rear region RA1 of the display panel 1100 with respect to the first direction X.

According to an embodiment of the present disclosure, the first vibration generating device 1200-1 may vibrate the first rear region RA1 of the display panel 1100, and thus, may generate the first sound of at least one of a first vibration sound, a first directional vibration sound, and a first haptic feedback. For example, the first vibration generating device 1200-1 may directly vibrate the first rear region RA1 of the display panel 1100, and thus, may generate the first sound in the first rear region RA1 of the display panel 1100. For example, the first sound may be a right sound.

The second vibration generating device 1200-2 may be disposed at the second rear region RA2 of the display panel 1100. A size of the second vibration generating device 1200-2 may have the same size as the second rear area RA2 of the display panel 1100 or may have a size smaller than the second rear area RA2 of the display panel 1100 based on a characteristic of the second sound or the sound characteristic needed for the apparatus. For example, the second vibration generating device 1200-2 may be disposed close to a center or a periphery within the second rear region RA2 of the display panel 1100 with respect to the first direction X.

According to an embodiment of the present disclosure, the second vibration generating device 1200-2 may vibrate the second rear region RA2 of the display panel 1100, and thus, may generate the second sound of at least one of a second vibration sound, a second directional vibration sound, and a second haptic feedback. For example, the second vibration generating device 1200-2 may directly vibrate the second rear region RA2 of the display panel 1100, and thus, may generate the second sound in the second rear region RA2 of the display panel 1100. For example, the second sound may be a left sound.

The first vibration generating device 200-1 and the second vibration generating device 200-2 may have the same size or different sizes to each other based on a sound characteristic of left and right sounds and/or a sound characteristic of the apparatus. And, the first vibration generating device 200-1 and the second vibration generating device 200-2 may be disposed in a left-right symmetrical structure or a left-right asymmetrical structure with respect to the center line CL of the display panel 1100.

Each of the first vibration generating device 200-1 and the second vibration generating device 200-2 may include one or more of the vibration apparatus described above with reference to FIGS. 1 to 42, and thus, their detailed descriptions may be omitted.

Each of the first vibration generating device 200-1 and the second vibration generating device 200-2 may disposed at the rear surface of the display panel 1100 by the connection member 1150. The connection member 1150 may be substantially the same as the connection member 1150 described above with reference to FIG. 44, and thus, its repetitive description may be omitted.

As described above, the apparatus (or a display apparatus) according to another embodiment of the present disclosure may output, through the first vibration generating device 1200-1 and the second vibration generating device 1200-2, a left sound and a right sound to a forward region in front of the display panel 1100 (or a vibration object or a vibration member), may concentrate or focus in a specific direction a sound generated by a vibration of each of the first vibration generating device 1200-1 and the second vibration generating device 1200-2, and thus, may implement a user's privacy protection function of allowing a sound not to be listened in a periphery region (or an inaudible region) other than a region (or an audible region) in a specific direction.

The apparatus according to another embodiment of the present disclosure may further include a plate 1170 which is disposed between the display panel 1100 and the vibration generating apparatus 1200.

The plate 1170 may have the same shape and size as the rear surface of the display panel 1100, or may have the same shape and size as the vibration generating apparatus 1200. As another embodiment of the present disclosure, the plate 1170 may have a size different from the display panel 1100. For example, the plate 1170 may be smaller than the size of the display panel 1100. As another embodiment of the present disclosure, the plate 1170 may have a size different from the vibration generating apparatus 1200. For example, the plate 1170 may be greater or smaller than the size of the vibration generating apparatus 1200. The vibration generating apparatus 1200 may be the same as or smaller than the size of the display panel 1100.

The plate 1170 may be coupled or connected to the rear surface of the display panel 1100 by a plate connection member 1190. Thus, the vibration generating apparatus 1200 may be connected or coupled to a rear surface of the plate 1170 by the connection member 1150, and thus, may be supported by or hung at the rear surface of the plate 1170.

The plate 1170 according to an embodiment of the present disclosure may include a plurality of opening portions. The plurality of opening portions may be configured to have a predetermined size and a predetermined interval. For example, the plurality of opening portions may be provided along a first direction X and a second direction Y so as to have a predetermined size and a predetermined interval. Due to the plurality of opening portions, a sound wave (or a sound pressure) based on a vibration of the vibration generating apparatus 1200 may not be dispersed by the plate 1170, and may concentrate on the display panel 1100 (or a vibration object or a vibration member). Thus, the loss of a vibration caused by the plate 1170 may be minimized, thereby increasing a sound pressure level characteristic of a sound generated based on a vibration of the display panel 1100 (or a vibration object or a vibration member). For example, the plate 1170 including the plurality of openings may have a mesh shape. For example, the plate 1170 including the plurality of openings may be a mesh plate.

The plate 1170 according to an embodiment of the present disclosure may include a metal material. For example, the plate 1170 may include any one or more materials of stainless steel, aluminum (Al), a magnesium (Mg), a magnesium (Mg) alloy, a magnesium-lithium (Mg—Li) alloy, and an Al alloy, but embodiments of the present disclosure are not limited thereto. Thus, the plate 1170 may act as a heat plate that dissipates heat occurring in the display panel 1100 (or a vibration object or a vibration member).

According to an embodiment of the present disclosure, the plate 1170 may reinforce a mass of the vibration generating apparatus 1200 which is disposed at or hung from the rear surface of the display panel 1100 (or a vibration object or a vibration member). Thus, the plate 1170 may decrease a resonance frequency of the vibration generating apparatus 1200 based on an increase in mass of the vibration generating apparatus 1200. Therefore, the plate 1170 may increase a sound characteristic and a sound pressure level characteristic of the low-pitched sound band generated based on a vibration of the vibration generating apparatus 1200 and may enhance the flatness of a sound pressure level characteristic. For example, the flatness of a sound pressure level characteristic may be a magnitude of a deviation between a highest sound pressure level and a lowest sound pressure level. For example, the plate 1170 may be referred to as a weight member, a mass member, a sound planarization member, or the like, but embodiments of the present disclosure are not limited thereto.

Figure 46:
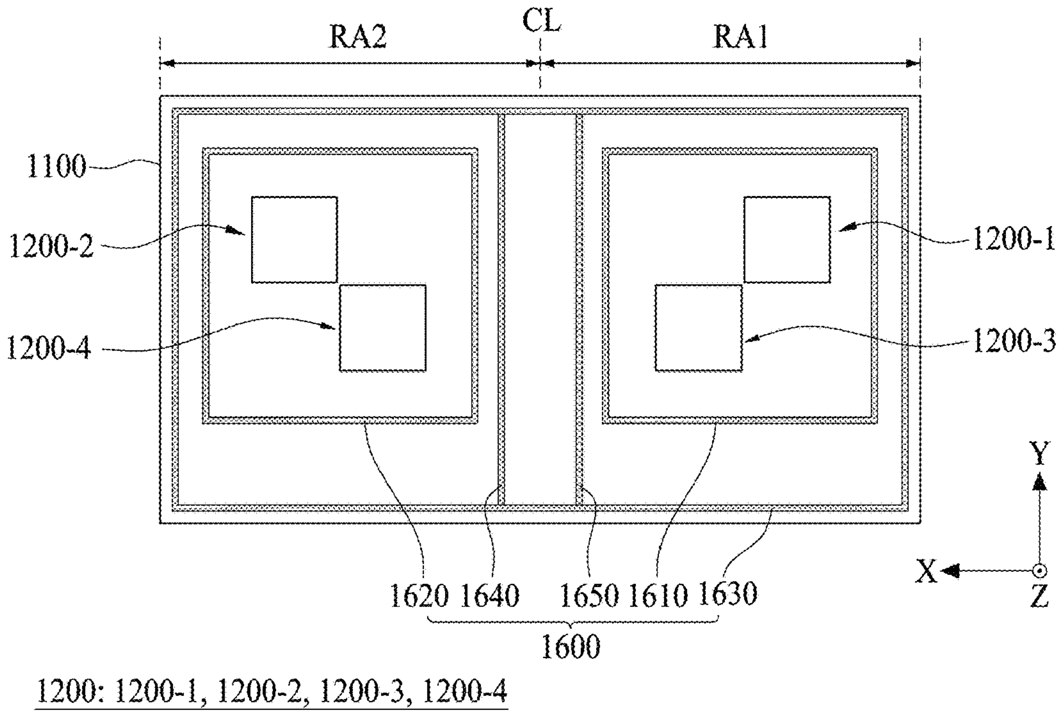
FIG. 46 illustrates another apparatus according to an embodiment of the present disclosure.

FIG. 46 illustrates an apparatus according to another embodiment of the present disclosure. FIG. 46 illustrates an embodiment where a partition is further configured in the apparatus illustrated in FIG. 44. Hereinafter, therefore, repetitive descriptions of elements other than the partition and elements relevant thereto may be omitted or will be briefly given.

With reference to FIG. 46, the apparatus according to another embodiment of the present disclosure may include a display panel 1100 and a vibration generating apparatus 1200, and may further include a partition 1600 for dividing the first and second rear regions RAT and RA2 of the display panel 1100.

The vibration generating apparatus 1200 may include a first to fourth vibration generating devices 1200-1 to 1200-4 which are disposed at the rear surface of the display panel 1100 (or a vibration object or a vibration member).

Each of the first to fourth vibration generating devices 1200-1 to 1200-4 may include one or more of the vibration apparatus described above with reference to FIGS. 1 to 42, and thus, their detailed descriptions may be omitted.

The first and third vibration generating devices 1200-1 and 1200-3 may be staggered or disposed in a diagonal direction within the first rear area RA1 of the display panel 1100 (or a vibration object or a vibration member), and thus, the first and third vibration generating devices 1200-1 and 1200-3 may increase a vibration area of the first rear region RA1 of the display panel 1100 (or a vibration object or a vibration member). For example, the diagonal direction may be a direction between the first direction X and the second direction Y.

Each of the first and third vibration generating devices 1200-1 and 1200-3 may vibrate the first rear region RA1 of the display panel 1100 (or a vibration object or a vibration member) to generate the first sound (or a right sound) or a first haptic feedback in the first rear region RA1 of the display panel 1100 (or a vibration object or a vibration member). For example, a vibration area of the first rear region RA1 of the display panel 1100 (or a vibration object or a vibration member) may increase based on a diagonal arrangement structure of the first and third vibration generating devices 1200-1 and 1200-3 and thus, a low-pitched sound band characteristic of the first sound (or the right sound) may be enhanced. For example, because the third vibration generating device 1200-3 is further disposed in addition to the first vibration generating device 1200-1, the first sound or the first haptic feedback generated in the second rear region RA2 of the display panel 1100 (or a vibration object or a vibration member) may be more enhanced than the first sound or the first haptic feedback described above with reference to FIG. 45.

The second and fourth vibration generating devices 1200-2 and 1200-4 may be staggered or disposed in a diagonal direction within the second rear area RA2 of the display panel 1100 (or a vibration object or a vibration member), and thus, the second and fourth vibration generating devices 1200-2 and 1200-4 may increase a vibration area of the second rear region RA2 of the display panel 1100

(or a vibration object or a vibration member). For example, the diagonal direction may be a direction between the first direction X and the second direction Y.

Each of the second and fourth vibration generating devices 1200-2 and 1200-4 may vibrate the second rear region RA2 of the display panel 1100 to generate the second sound (or a left sound) or a second haptic feedback in the second rear region RA2 of the display panel 1100 (or a vibration object or a vibration member). For example, a vibration area of the second rear region RA2 of the display panel 1100 (or a vibration object or a vibration member) may increase based on a diagonal arrangement structure of the second and fourth vibration generating devices 1200-2 and 1200-4 and thus, a low-pitched sound band characteristic of the second sound (or the left sound) may be enhanced. For example, because the fourth vibration generating device 1200-4 is further disposed in addition to the second vibration generating device 1200-2, the second sound or the second haptic feedback generated in the second rear region RA2 of the display panel 1100 (or a vibration object or a vibration member) may be more enhanced than the second sound or the second haptic feedback described above with reference to FIG. 45.

In FIG. 46, each of the first and third vibration generating devices 1200-1 and 1200-3 may be disposed to have a parallel arrangement structure in parallel along the first direction X or the second direction Y. Thus, because the first and third vibration generating devices 1200-1 and 1200-3 may be disposed to have the parallel arrangement structure, the first sound or the first haptic feedback generated in the first rear region RA1 of the display panel 1100 (or a vibration object or a vibration member) may be more enhanced than the first sound or the first haptic feedback described above with reference to FIG. 45.

In FIG. 46, each of the second and fourth vibration generating devices 1200-2 and 1200-4 may be disposed to have a parallel arrangement structure in parallel along the first direction X or the second direction Y. Thus, because the second and fourth vibration generating devices 1200-2 and 1200-4 may be disposed to have the parallel arrangement structure, the second sound or the second haptic feedback generated in the second rear region RA2 of the display panel 1100 (or a vibration object or a vibration member) may be more enhanced than the second sound or the second haptic feedback described above with reference to FIG. 45.

The partition 1600 according to an embodiment of the present disclosure may spatially divide the first and second rear regions RA1 and RA2 of the display panel 1100 (or a vibration object or a vibration member).

The partition 1600 may be an air gap or a space, where sounds are generated in each of the first and second rear regions RA1 and RA2 when the display panel 1100 (or a vibration object or a vibration member) is vibrated by the vibration generating apparatus 1200. For example, a partition 1600 may separate the sounds which is generated in each of the first and second rear regions RA1 and RA2 or a channel and may prevent or decrease the reduction of a sound characteristic caused by interference of the sounds which is generated in each of the first and second rear regions RA1 and RA2. The partition 1600 may be referred to as a sound blocking member, a sound separation member, a space separation member, an enclosure, or a baffle, or the like, but embodiments of the present disclosure are not limited thereto.

The partition 1600 according to an embodiment of the present disclosure may be disposed between the display panel 1100 (or a vibration object or a vibration member) and the supporting member 1300 (with reference to FIG. 44), and may spatially divide the first and second rear regions RA1 and RA2 of the display panel 1100 (or a vibration object or a vibration member). Also, the partition 1600 may block or minimize interference of the sounds between the first and second rear regions RA1 and RA2.

The partition 1600 according to an embodiment of the present disclosure may be configured as a material having elasticity which enables a certain degree of compression. For example, the partition 1600 may be configured as polyurethane or polyolefin, but embodiments of the present disclosure are not limited thereto. As another embodiment of the present disclosure, the partition 1600 may be configured as a single-sided tape, a single-sided foam pad, a double-sided tape, a double-sided foam tape, or the like.

The partition 1600 according to an embodiment of the present disclosure may include first and second partition members 1610 and 1620.

The first partition member 1610 may be disposed between the display panel 1100 and the supporting member 1300 corresponding to the first rear region RA1 of the display panel 1100 (or a vibration object or a vibration member). The first partition member 1610 may surround a whole the first and third vibration generating devices 1200-1 and 1200-3. The first partition member 1610 may have a rectangular shape, a circular shape or an oval shape surrounding the first and third vibration generating devices 1200-1 and 1200-3, but embodiments of the present disclosure are not limited thereto.

The second partition member 1620 may be disposed between the display panel 1100 and the supporting member 1300 corresponding to the second rear region RA2 of the display panel 1100 (or a vibration object or a vibration member). The second partition member 1620 may surround a whole the second and fourth vibration generating devices 1200-2 and 1200-4. The second partition member 1620 may have a rectangular shape, a circular shape or an oval shape surrounding the second and fourth vibration generating devices 1200-2 and 1200-4, but embodiments of the present disclosure are not limited thereto.

According to an embodiment of the present disclosure, the first and second partition members 1610 and 1620 may have the same or different shapes. For example, the first and second partition members 1610 and 1620 may have a rectangular shape. For example, the first partition member 1610 may have a rectangular ring shape, and the second partition member 1620 may have a circular ring shape or an oval ring shape.

In the apparatus according to an embodiment of the present disclosure, a sound output characteristic may be further enhanced by separating a left sound and a right sound by the first and second partition members 1610 and 1620. Also, the apparatus according to another embodiment of the present disclosure may output a two-channel or more a sound to the forward region in front of the display panel 1100 (or a vibration object or a vibration member) by separating the left and right sounds.

The partition 1600 according to an embodiment of the present disclosure may further include a third partition member 1630 between the display panel 1100 (or a vibration object or a vibration member) and the supporting member 1300.

The third partition member 1630 may be disposed between a rear periphery portion of the display panel 1100 and a front periphery portion of the supporting member 1300. The third partition member 630 may be disposed to surround a whole the vibration generating apparatus 1200.

The third partition member 1630 may be referred to as an edge partition, a sound blocking member, an edge enclosure, an edge baffle, or the like, but embodiments of the present disclosure are not limited thereto. For example, the third partition member 1630 may be adjacent to or in contact with the middle frame 1400 described above, and may be surrounded by the middle frame 1400. As another embodiment of the present disclosure, the third partition member 1630 may be integrated as one body with the middle frame 1400.

According to an embodiment of the present disclosure, the third partition member 1630 may be implemented with the same material as at least one of the first and second partition members 1610 and 1620.

The partition 600 according to an embodiment of the present disclosure may further include a fourth partition member 1640 and a fifth partition member 1650.

The fourth partition member 1640 and the fifth partition member 1650 may be disposed between the display panel 1100 (or a vibration object or a vibration member) and the supporting member 1300. For example, the fourth partition member 1640 and the fifth partition member 1650 may be disposed at a center region of the display panel 1100 (or a vibration object or a vibration member). For example, the fourth partition member 1640 and the fifth partition member 1650 may disposed in parallel with each other in the center region of the display panel 1100 (or a vibration object or a vibration member). The fourth partition member 1640 and the fifth partition member 1650 may disposed at a rear center line CL of the display panel 1100 (or a vibration object or a vibration member) and may separate the first rear region RA1 and the second rear region RA2 of the display panel 1100 (or a vibration object or a vibration member). For example, the fourth partition member 1640 and the fifth partition member 1650 may spatially divide the first and second rear regions RA1 and RA2 of the display panel 1100 (or a vibration object or a vibration member). Thus, the fourth partition member 1640 and the fifth partition member 1650 may block or minimize interference of the sounds between the first and second rear regions RA1 and RA2. In the apparatus according to an embodiment of the present disclosure, a sound output characteristic may be further enhanced by separating a left sound and a right sound by the fourth partition member 1640 and the fifth partition member 1650. Also, the apparatus according to another embodiment of the present disclosure may output a two-channel or more a sound to the forward region in front of the display panel 1100 (or a vibration object or a vibration member) by separating the left and right sounds.

According to an embodiment of the present disclosure, any one of the fourth partition member 1640 and the fifth partition member 1650 may be implemented with the same material as at least one of the first to third partition members 1610 to 1630.

According to an embodiment of the present disclosure, any one of the fourth and fifth partition members 1640 and 1650 may be omitted. For example, when the fifth partition member 1650 of the fourth and fifth partition members 1640 and 1650 is omitted, the fourth partition member 1640 may be disposed between the display panel 1100 (or a vibration object or a vibration member) and the supporting member 1300 to correspond to the rear center line CL of the display panel 1100 (or a vibration object or a vibration member). Even when any one of the fourth partition member 1640 and the fifth partition member 1650 is omitted, left and right sounds may be separated.

Therefore, the apparatus according to another embodiment of the present disclosure may include the partition 1600, and thus, the sound pressure level characteristic and the sound reproduction band of each of the left and right sounds may be improved or optimized. For example, the apparatus according to another embodiment of the present disclosure may include at least one or more of the first to fifth partition members 610 to 650.

Figure 47:
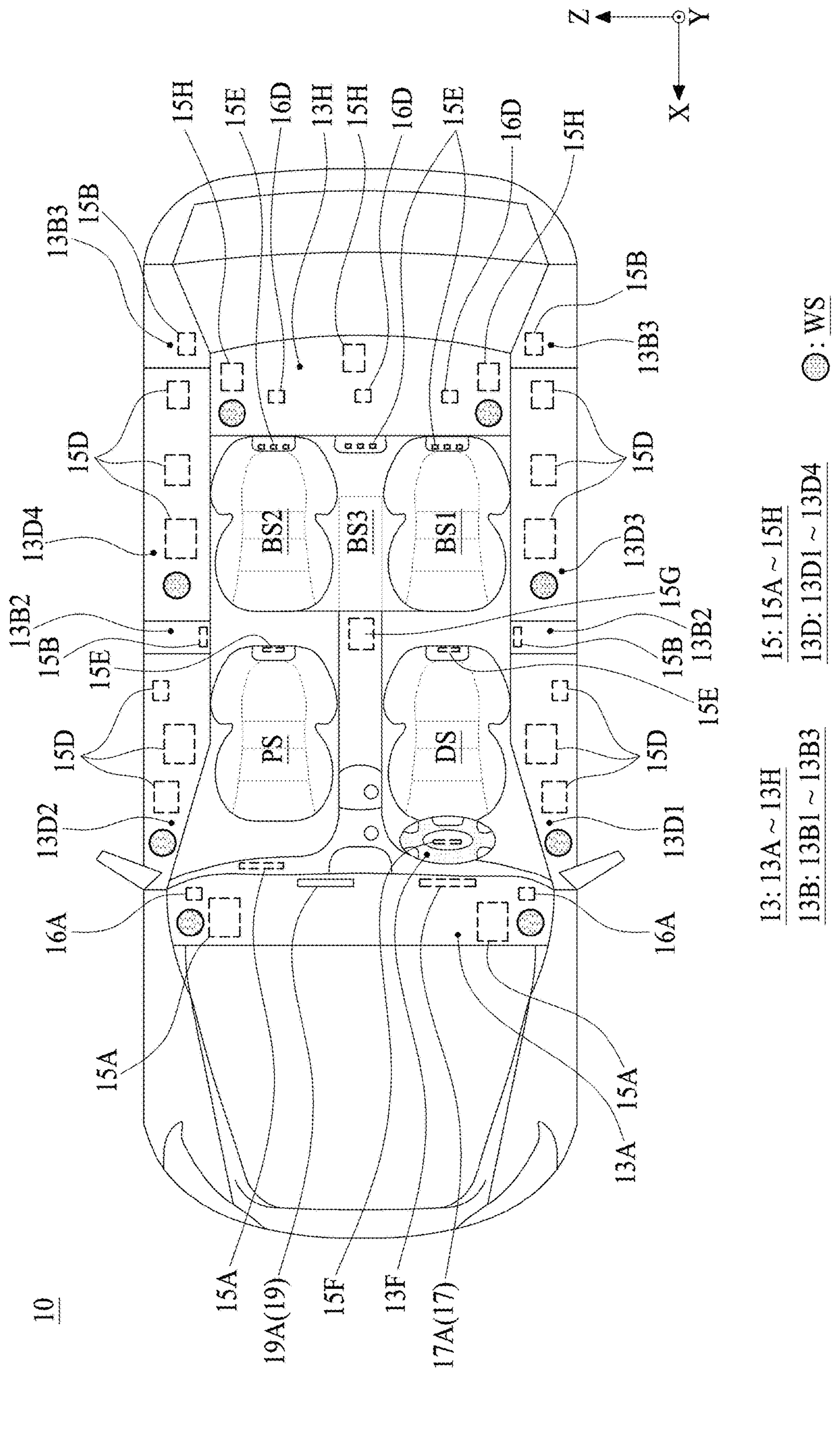
FIG. 47 illustrates a vehicle according to an embodiment of the present disclosure.
Figure 48:
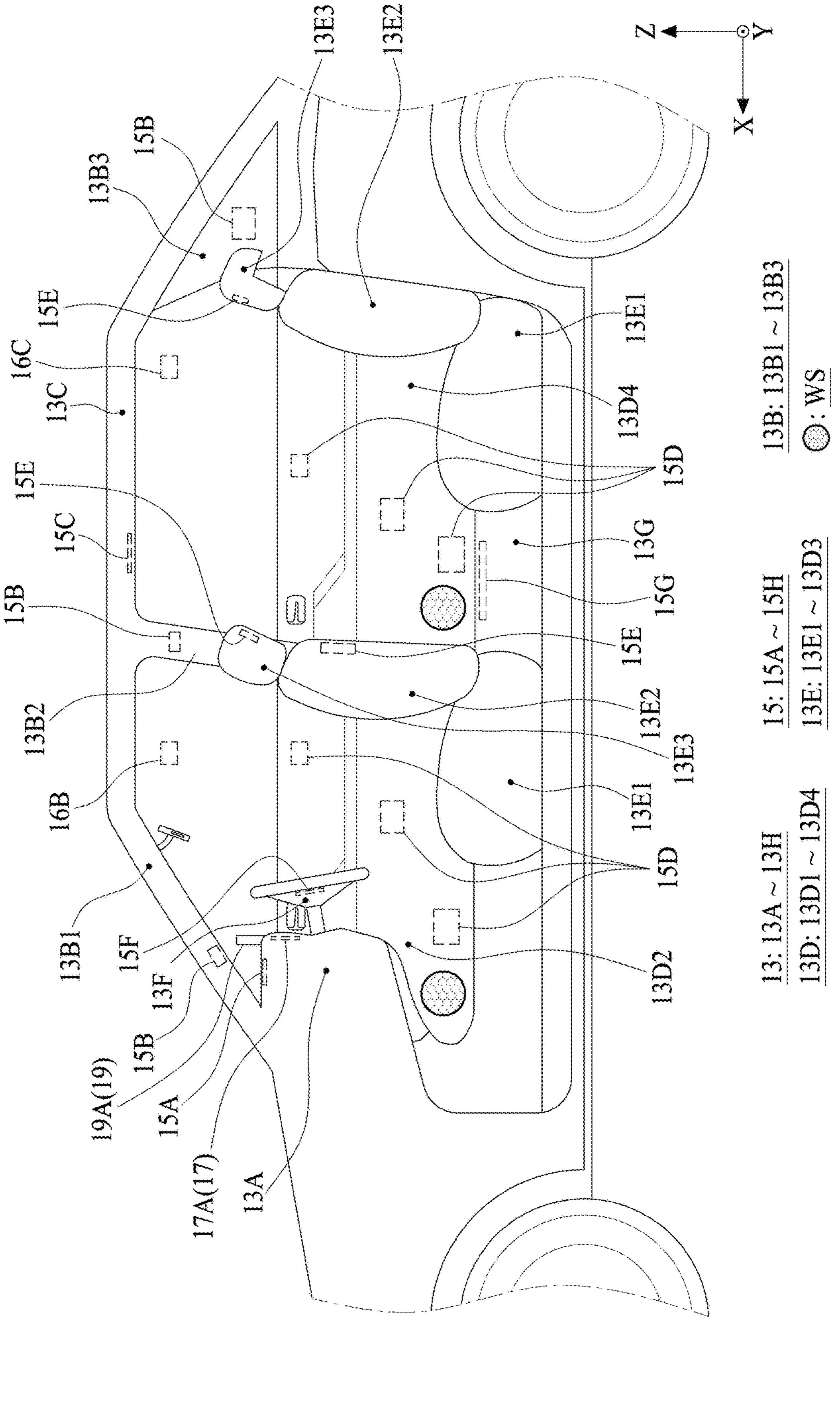
FIG. 48 illustrates a vehicle according to an embodiment of the present disclosure.
Figure 49:
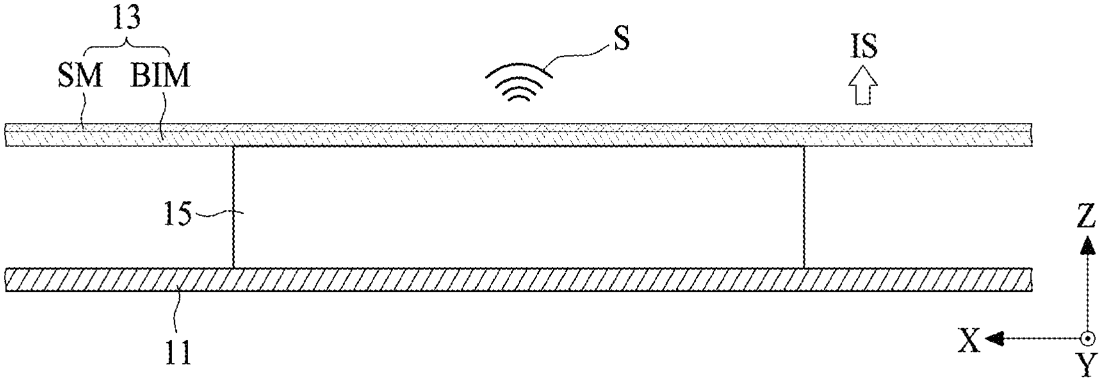
FIG. 49 illustrates an arrangement structure of a vibration apparatus for vehicles illustrated in FIGS. 47 and 48.

FIG. 47 illustrates a vehicle according to an embodiment of the present disclosure. FIG. 48 is a cross-sectional view illustrating a vehicle according to an embodiment of the present disclosure. FIG. 49 illustrates an arrangement structure of a vibration apparatus for vehicles illustrated in FIGS. 47 and 48.

With reference to FIGS. 47 to 49, a vehicle 10 according to an embodiment of the present disclosure may include a vehicle interior material 13 and a sound generating apparatus 15 for vehicles.

The vehicle interior material (or a vehicle interior finish material) 13 may be configured to cover a vehicle structure 11 at an inner portion or an indoor space the vehicle 10 and may configured be exposed at the inner portion or the indoor space the vehicle 10.

The vehicle structure 11 may include a main frame, a side frame, a door frame, a glass window, and a seat frame, but embodiments of the present disclosure are not limited thereto. For example, the main frame may include a dash panel, a pillar panel, a roof panel, and a floor panel, but embodiments of the present disclosure are not limited thereto. For example, the door frame may include a door inner panel and a door outer panel, but embodiments of the present disclosure are not limited thereto.

The vehicle interior material 13 may be configured to cover one or more surfaces (or an interior surface) of at least one or more of a main frame (or a vehicle body), a side frame (or a side body), a door frame (or a door body), a handle frame (or a steering hub), and a seat frame, which are exposed at the indoor space of the vehicle 10. The vehicle interior material 13 according to an embodiment of the present disclosure may include a dashboard 13A, a pillar interior material (or a pillar trim) 13B, a roof interior material (or a headliner) 13C, a door interior material (or a door trim) 13D, a seat interior material 13E, a handle interior material (or a steering cover) 13F, and a rear package interior material (or a back seat shelf) 13H, or the like.

The vehicle interior material 13 may include one or more material of plastic, fiber, leather, metal, and glass, but embodiments of the present disclosure are not limited thereto. For example, the vehicle interior material 13 including a plastic material may include an injection material. The vehicle interior material 13 including a plastic material may be an injection material which is implemented by an injection process using a thermoplastic resin or a thermosetting resin, but embodiments of the present disclosure are not limited thereto.

The vehicle interior material 13 according to an embodiment of the present disclosure may include a base interior material BIM and an outer surface member SM. For example, the base interior material BIM may be an injection material, a first interior material, an inner interior material, or a rear interior material, but embodiments of the present disclosure are not limited thereto. The outer surface member SM may be a second interior material, an outer interior material, a front interior material, an outer surface member, a reinforcement member, or a decoration member, but embodiments of the present disclosure are not limited thereto.

The base interior material BIM may include a plastic material. The base interior material BIM according to an embodiment of the present disclosure may include an injection material. For example, the base interior material BIM may be an injection material which is implemented by an injection process using a thermoplastic resin or a thermosetting resin, but embodiments of the present disclosure are not limited thereto. The base interior material BIM may be configured to cover a vehicle structure 11 in the inner portion or the indoor space IS of the vehicle 10. For example, the base interior material BIM may be configured to cover one or more surfaces (or an inner surface) of at least one or more of a main frame, a side frame, a door frame, and a handle frame, which are exposed at the indoor space IS of the vehicle 10.

The base interior material BIM may include one or more of a flat surface portion and a curved surface portion. For example, the base interior material BIM may have a surface structure corresponding to a surface structure of a corresponding vehicle structure 11, or may have a surface structure which differs from a surface structure of a corresponding vehicle structure 11.

The outer surface member SM may be disposed at the base interior material BIM. The outer surface member SM may cover the base interior material BIM at the inner portion or the indoor space IS of the vehicle 10 and may be exposed at the inner portion or the indoor space IS of the vehicle 10. For example, the outer surface member SM may be disposed at or coupled to a front surface of the base interior material BIM exposed at the indoor space IS of the vehicle 10.

The outer surface member SM according to an embodiment of the present disclosure may include any one or more of a fiber, leather, cloth, metal, and wood. For example, the outer surface member SM including a fiber material may include at least one or more of a synthetic fiber, a carbon fiber (or an aramid fiber), and a natural fiber. For example, the outer surface member SM including a fiber material may be a textile sheet, a knit sheet, or a nonwoven fabric, but embodiments of the present disclosure are not limited thereto. For example, the outer surface member SM including a fiber material may be a fabric member, but embodiments of the present disclosure are not limited thereto.

The synthetic fiber may be a thermoplastic resin and may include a polyolefin-based fiber which is an eco-friendly material which does not relatively release a harmful substance. For example, the polyolefin-based fiber may include a polyethylene fiber, a polypropylene fiber, or a polyethylene terephthalate fiber. The polyolefin-based fiber may be a fiber of a single resin or a fiber of a core-shell structure.

The natural fiber may be a composite fiber of any one or two or more of a jute fiber, a kenaf fiber, an abaca fiber, a coconut fiber, and a wood fiber.

The sound generating apparatus 15 for vehicles may be disposed at the vehicle structure 11 and may be covered by the vehicle interior material 13. For example, the sound generating apparatus 15 for vehicles may be configured to be disposed between the vehicle structure 11 and the vehicle interior material 13 or may be configured to be disposed at the vehicle interior material 13.

The sound generating apparatus 15 for vehicles may be configured to vibrate the vehicle interior material 13 to output the sound S toward the indoor space IS of the vehicle 10. For example, the sound generating apparatus 15 for vehicles may directly vibrate the vehicle interior material 13 to generate the sound S based on a vibration of the vehicle interior material 13. Thus, the vehicle interior material 13 may perform a function of a vibration plate, a sound vibration plate, or a sound generating plate for outputting the sound S. For example, the vehicle interior material 13 may have a size which is greater than that of the sound generating apparatus 15 for vehicles, and thus, may perform a function of a vibration plate, a sound vibration plate, or a sound generating plate having a large area, thereby enhancing a sound characteristic of a low-pitched sound band of the sound generating apparatus 15 for vehicles. For example, a frequency of a sound of the low-pitched sound band may be 500 Hz or less, but embodiments of the present disclosure are not limited thereto.

The sound generating apparatus 15 for vehicles according to an embodiment of the present disclosure may include at least one or more sound generating apparatuses to vibrate at least one or more of a dashboard 13A, a pillar interior material 13B, a roof interior material 13C, a door interior material 13D, a seat interior material 13E, a handle interior material 13F, a floor interior material 13G, and a rear package interior material 13H. For example, the sound generating apparatus 15 for vehicles may include at least one or more of the first to eighth sound generating apparatuses 15A to 15H and may vibrate a corresponding vehicle interior material 130 by the at least one or more of the first to eighth sound generating apparatuses 15A to 15H to output a realistic sound S or stereo sound of a multi-channel toward the indoor space IS of the vehicle 10.

Each of the first to eighth sound generating apparatuses 15A to 15H may be configured to be disposed between the vehicle structure 11 and the vehicle interior material 13 or may be configured to be disposed at the vehicle interior material 13.

The first sound generating apparatus 15A according to an embodiment of the present disclosure may be disposed between the dashboard 13A and a dash panel of a main frame of the vehicle structure and may be configured to vibrate the dashboard 13A to output a sound based on a vibration of the dashboard 13A. For example, the first sound generating apparatus 15A may be configured to directly vibrate the dashboard 13A to output a sound based on a vibration of the dashboard 13A. For example, the first sound generating apparatus 15A may include one or more of the vibration apparatus described above with reference to FIGS. 1 to 42, and thus, its repetitive description may be omitted. For example, the first sound generating apparatus 15A may be a dashboard speaker.

According to an embodiment of the present disclosure, at least one or more of the dash panel and the dashboard 13A may include a first region corresponding to a driver seat DS, a second region corresponding to a passenger seat PS, and a third region (or a middle region) between the first region and the second region. At least one or more of the dash panel and the dashboard 13A may include a fourth region which is inclined to face the passenger seat PS. According to an embodiment of the present disclosure, the first sound generating apparatus 15A may be disposed to vibrate at least one or more of the first to fourth regions of the dashboard 13A. For example, the first sound generating apparatus 15A may be disposed at each of the first and second regions of the dashboard 13A, or may be disposed at each of the first to fourth regions. For example, the first sound generating apparatus 15A may be disposed at each of the first and second regions of the dashboard 13A, or may be disposed at at least one or more of the first to fourth regions.

According to an embodiment of the present disclosure, the first sound generating apparatus 15A configured to vibrate at least one or more of the first to fourth regions of the dashboard 13A may have the same sound output characteristic or different sound output characteristics. For example, the first sound generating apparatus 15A configured to vibrate each of the first to fourth regions of the dashboard 13A may have the same sound output characteristic or different sound output characteristics.

According to an embodiment of the present disclosure, the first sound generating apparatus 15A configured to vibrate the first region of the dashboard 13A may concentrate or focus in the driver seat DS a sound, and thus, may implement a user's privacy protection function of allowing a sound not to be listened in a periphery region (or an inaudible region) other than the driver seat DS. Also, the first sound generating apparatus 15A configured to vibrate the second region of the dashboard 13A may concentrate or focus in the passenger seat PS a sound, and thus, may implement a user's privacy protection function of allowing a sound not to be listened in a periphery region (or an inaudible region) other than the passenger seat PS.

The second sound generating apparatus 15B according to an embodiment of the present disclosure may be disposed between the pillar interior material 13B and a pillar panel of the main frame of the vehicle structure and may vibrate the pillar interior material 13B to output a sound based on a vibration of the pillar interior material 13B. For example, the second sound generating apparatus 15B may directly vibrate the pillar interior material 13B to output a sound based on a vibration of the pillar interior material 13B. For example, the second sound generating apparatus 15B may include one or more of the vibration apparatus described above with reference to FIGS. 1 to 42, and thus, its repetitive description may be omitted. For example, the second sound generating apparatus 15B may be a pillar speaker.

According to an embodiment of the present disclosure, the pillar panel may include a first pillar (or an A pillar) disposed at both sides of a front glass window, a second pillar (or a B pillar) disposed at both sides of a center of a vehicle body, and a third pillar (or a C pillar) disposed at both sides of a rear portion of the vehicle body. The pillar interior material 13B may include a first pillar interior material 13B1 covering the first pillar, a second pillar interior material 13B2 covering the second pillar, and a third pillar interior material 13B3 covering the third pillar. According to an embodiment of the present disclosure, the second sound generating apparatus 15B may be disposed at at least one or more of a region between the first pillar and the first pillar interior material 13B1, a region between the second pillar and the second pillar interior material 13B2, and a region between the third pillar and the third pillar interior material 13B3, and thus, may vibrate at least one or more of the first to third pillar interior materials 13B1 to 13B3.

According to an embodiment of the present disclosure, the second sound generating apparatus 15B configured to vibrate at least one or more of the first to third pillar interior materials 13B1 to 13B3 may have the same sound output characteristic or different sound output characteristics.

According to an embodiment of the present disclosure, the second sound generating apparatus 15B configured to vibrate at least one or more of the first to third pillar interior materials 13B1 to 13B3 may concentrate or focus in any one or more of the driver seat DS, the passenger seat PS, the first rear seat BS1, and the second rear seat BS2 a sound, and thus, may implement a user's privacy protection function of allowing a sound not to be listened in a periphery region (or an inaudible region) other than corresponding seats DS, PS, BS1, and BS2.

The third sound generating apparatus 15C according to an embodiment of the present disclosure may be disposed between the roof interior material 13C and a roof panel of the main frame of the vehicle structure and may vibrate the roof interior material 13C to output a sound based on a vibration of the roof interior material 13C. For example, the third sound generating apparatus 15C may directly vibrate the roof interior material 13C to output a sound based on a vibration of the roof interior material 13C. For example, the third sound generating apparatus 15C may include one or more of the vibration apparatus described above with reference to FIGS. 1 to 42, and thus, its repetitive description may be omitted. For example, the third sound generating apparatus 15C may be a roof speaker.

According to an embodiment of the present disclosure, at least one or more of the roof panel and the roof interior material 13C covering the roof panel may include the first region corresponding to the driver seat DS, the second region corresponding to the passenger seat PS, a third region corresponding to a region between the driver seat DS and the passenger seat PS, a fourth region corresponding to a first rear seat BS1 behind the driver seat DS, a fifth region corresponding to a second rear seat BS2 behind the passenger seat PS, a sixth region corresponding to a region between the first rear seat BS1 and the second rear seat BS2, and a seventh region between the third region and the sixth region. For example, the third sound generating apparatus 15C may be disposed to vibrate at least one or more among the first to seventh regions of the roof interior material 13C.

According to an embodiment of the present disclosure, the third sound generating apparatus 15C configured to vibrate at least one or more among the first to seventh regions of the roof interior material 13C may have the same sound output characteristic or different sound output characteristics. For example, the third sound generating apparatus 15C configured to vibrate each of the first to seventh regions of the roof interior material 13C may have the same sound output characteristic or different sound output characteristics.

According to an embodiment of the present disclosure, the third sound generating apparatus 15C configured to vibrate at least one or more among the first to seventh regions of the roof interior material 13C may concentrate or focus in any one or more of the driver seat DS, the passenger seat PS, the first rear seat BS1, and the second rear seat BS2 a sound, and thus, may implement a user's privacy protection function of allowing a sound not to be listened in a periphery region (or an inaudible region) other than corresponding seats DS, PS, BS1, and BS2.

The fourth sound generating apparatus 15D according to an embodiment of the present disclosure may be disposed between the door interior material 13D and a door frame of the vehicle structure and may vibrate the door interior material 13D to output a sound based on a vibration of the door interior material 13D. For example, the fourth sound generating apparatus 15D may directly vibrate the door interior material 13D to output a sound based on a vibration of the door interior material 13D. According to an embodiment of the present disclosure, the fourth sound generating apparatus 15D may include one or more of the vibration apparatus described above with reference to FIGS. 1 to 42, and thus, its repetitive description may be omitted. For example, the fourth sound generating apparatus 15D may be a door speaker.

According to an embodiment of the present disclosure, at least one or more of the door frame and the door interior material 13D may include an upper region, a middle region, and a lower region with respect to a height direction Z of the vehicle 10. For example, the fourth sound generating apparatus 15D may be disposed at at least one or more of an upper region, a middle region, and a lower region between the door frame and the door interior material 13D, and thus, may vibrate at least one or more of an upper region, a middle region, and a lower region of the door interior material 13D.

According to an embodiment of the present disclosure, the door frame may include a first door frame (or a left front door frame), a second door frame (or a right front door frame), a third door frame (or a left rear door frame), and a fourth door frame (or a right rear door frame). According to an embodiment of the present disclosure, the door interior material 13D may include a first door interior material (or a left front door interior material) 13D1 covering the first door frame, a second door interior material (or a right front door interior material) 13D2 covering the second door frame, a third door interior material (or a left rear door interior material) 13D3 covering the third door frame, and a fourth door interior material (or a right rear door interior material) 13D4 covering the fourth door frame. For example, the fourth sound generating apparatus 15D may be disposed at at least one or more of an upper region, a middle region, and a lower region between each of the first to fourth door frames and the first to fourth door interior materials 13D1 to 13D4 and may vibrate at least one or more of an upper region, a middle region, and a lower region of each of the first to fourth door interior materials 13D1 to 13D4.

According to an embodiment of the present disclosure, the fourth sound generating apparatus 15D configured to vibrate the middle regions and/or the lower regions of at least one or more of the first to fourth door interior materials 13D1 to 13D4 may be one or more of a woofer, a mid-woofer, and a sub-woofer. For example, the fourth sound generating apparatus 15D configured to vibrate the middle region and/or the lower region of each of the first to fourth door interior materials 13D1 to 13D4 may be one or more of a woofer, a mid-woofer, and a sub-woofer.

Sounds, which are respectively output from the fourth sound generating apparatus 15D disposed at the first door interior material 13D1 and the fourth sound generating apparatus 15D disposed at the second door interior material 13D2, may be combined and output. For example, sounds, which are output from at least one or more of the fourth sound generating apparatus 15D disposed at the first door interior material 13D1 and the fourth sound generating apparatus 15D disposed at the second door interior material 13D2, may be combined and output. Also, a sound output from the fourth sound generating apparatus 15D disposed at the third door interior material 13D3 and a sound output from the fourth sound generating apparatus 15D disposed at the fourth door interior material 13D4 may be combined and output.

According to an embodiment of the present disclosure, an upper region of each of the first to fourth door interior materials 13D1 to 13D4 may include a first upper region adjacent to the dashboard 13A, a second upper region adjacent to the rear seats BS1 to BS3, and a third upper region between the first upper region and the second upper region. For example, the fourth sound generating apparatus 15D may be disposed at one or more of the first to third upper regions of each of the first to fourth door interior materials 13D1 to 13D4. For example, the fourth sound generating apparatus 15D may be disposed at the first upper region of each of the first and second door interior materials 13D1 and 13D2 and may be disposed at one or more of the second and third upper regions of each of the first and second door interior materials 13D1 and 13D2. For example, the fourth sound generating apparatus 15D may be disposed at one or more of the first to third upper regions of one or more of the first to fourth door interior materials 13D1 to 13D4.

According to an embodiment of the present disclosure, the fourth sound generating apparatus 15D configured to vibrate the middle regions and/or the lower regions of each of the first to fourth door interior materials 13D1 to 13D4 may concentrate or focus in any one or more of the driver seat DS, the passenger seat PS, the first rear seat BS1, and the second rear seat BS2 a sound, and thus, may implement a user's privacy protection function of allowing a sound not to be listened in a periphery region (or an inaudible region) other than corresponding seats DS, PS, BS1, and BS2.

The fifth sound generating apparatus 15E according to an embodiment of the present disclosure may be disposed between a seat frame and the seat interior material 13E and may vibrate the seat interior material 13E to output a sound based on a vibration of the seat interior material 13E. For example, the fifth sound generating apparatus 15E may directly vibrate the seat interior material 13E to output a sound based on a vibration of the seat interior material 13E. For example, the fifth sound generating apparatus 15E may include one or more of the vibration apparatus described above with reference to FIGS. 1 to 42, and thus, its repetitive description may be omitted. For example, the fifth sound generating apparatus 15E may be a seat speaker or a headrest speaker.

According to an embodiment of the present disclosure, the seat frame may include a first seat frame (or a driver seat frame), a second seat frame (or a passenger seat frame), a third seat frame (or a first rear seat frame), a fourth seat frame (or a second rear seat frame), and a fifth seat frame (or a third rear seat frame). According to an embodiment of the present disclosure, the seat interior material 13E may include the first seat interior material surrounding the first seat frame, the second seat interior material surrounding the second seat frame, the third seat interior material surrounding the third seat frame, the fourth seat interior material surrounding the fourth seat frame, and the fifth seat interior material surrounding the fifth seat frame.

According to an embodiment of the present disclosure, at least one or more of the first to fifth seat frames may include a seat bottom frame, a seat back frame, and a headrest frame. The seat interior material 13E may include a seat bottom interior material 13E1 surrounding the seat bottom frame, a seat back interior material 13E2 surrounding the seat back frame, and a headrest interior material 13E3 surrounding the headrest frame. At least one or more of the seat bottom interior material 13E1, the seat back interior material 13E2, and the headrest interior material 13E3 may include a seat inner interior material and a seat outer interior material. The seat inner interior material may include a foam layer. The seat outer interior material may include an outer surface layer including a fiber or leather. The seat outer interior material may further include a base layer including a plastic material which supports the outer surface layer.

According to an embodiment of the present disclosure, the fifth sound generating apparatus 15E may be disposed at at least one or more of a region between the seat back frame and the seat back interior material 13E2 and a region between the headrest frame and the headrest interior material 13E3, and thus, may vibrate at least one or more of the seat outer interior material of the seat back interior material 13E2 and the seat outer interior material of the headrest interior material 13E3.

According to an embodiment of the present disclosure, the fifth sound generating apparatus 15E disposed at at least one or more of the driver seat DS and the passenger seat PS may be disposed at at least one or more of the region between the seat back frame and the seat back interior material 13E2 and the region between the headrest frame and the headrest interior material 13E3.

According to an embodiment of the present disclosure, the fifth sound generating apparatus 15E disposed at at least one or more of the first to third rear seats BS1 to BS3 may be disposed between the headrest frame and the headrest interior material 13E3. For example, at least one or more of the first to third rear seats BS1 to BS3 may include at least one or more fifth sound generating apparatuses 15E disposed between the headrest frame and the headrest interior material 13E3.

According to an embodiment of the present disclosure, the fifth sound generating apparatus 15E configured to vibrate the seat back interior material 13E2 of at least one or more of the driver seat DS and the passenger seat PS may concentrate or focus in any one or more of the first rear seat BS1 and the second rear seat BS2 a sound, and thus, may implement a user's privacy protection function of allowing a sound not to be listened in a periphery region (or an inaudible region) other than corresponding seats BS1 and BS2.

According to an embodiment of the present disclosure, the fifth sound generating apparatus 15E configured to vibrate the headrest interior material 13E3 of at least one or more of the driver seat DS, the passenger seat PS, and the first to third rear seats BS1 to BS3 may concentrate or focus in any one or more of the first rear seat BS1 and the second rear seat BS2 a sound, and thus, may implement a user's privacy protection function of allowing a sound not to be listened in a periphery region (or an inaudible region) other than corresponding seats BS1 and BS2.

The sixth sound generating apparatus 15F according to an embodiment of the present disclosure may be disposed between a handle frame and the handle interior material 13F and may vibrate the handle interior material 13F to output a sound based on a vibration of the handle interior material 13F. For example, the sixth sound generating apparatus 15F may directly vibrate the handle interior material 13F to output a sound based on a vibration of the handle interior material 13F. According to an embodiment of the present disclosure, the sixth sound generating apparatus 15F may include one or more of the vibration apparatus described above with reference to FIGS. 1 to 42, and thus, its repetitive description may be omitted. For example, the sixth sound generating apparatus 15F may be a handle speaker or a steering speaker.

According to an embodiment of the present disclosure, the sixth sound generating apparatus 15F may vibrate the handle interior material 13F to provide a driver with a sound based on a vibration of the handle interior material 13F. For example, the sixth sound generating apparatus 15F may directly vibrate the handle interior material 13F to provide the driver with the sound based on the vibration of the handle interior material 13F. A sound output by the sixth sound generating apparatus 15F may be a sound which is the same as or different from a sound output from each of the first to fifth sound generating apparatuses 15A to 15E.

According to an embodiment of the present disclosure, the sixth sound generating apparatus 15F may only concentrate or focus in the driver seat DS a sound, and thus, may implement a user's privacy protection function of allowing a sound not to be listened in a periphery region (or an inaudible region) other than the driver seat DS.

The seventh sound generating apparatus 15G may be disposed between the floor interior material 13G and the floor panel among the main frame of the vehicle structure and may vibrate the floor internal material 13G to output a sound based on a vibration of the floor interior material 13G. For example, the seventh sound generating apparatus 15G may directly vibrate the floor internal material 13G to output the sound based on the vibration of the floor interior material 13G.

The seventh sound generating apparatus 15G may be disposed between the floor interior material 13G and the floor panel disposed between the front seats DS and PS and the third rear seat BS3. For example, the seventh sound generating apparatus 15G may include one or more of the vibration apparatus described above with reference to FIGS. 1 to 42, and thus, its repetitive description may be omitted. For example, the seventh sound generating apparatus 15G may be a floor speaker, a bottom speaker, or an under speaker.

According to an embodiment of the present disclosure, the seventh sound generating apparatus 15G may concentrate or focus in any one or more of the first rear seat BS1 and the second rear seat BS2 a sound, and thus, may implement a user's privacy protection function of allowing a sound not to be listened in a periphery region (or an inaudible region) other than corresponding seats BS1 and BS2.

The eighth sound generating apparatus 15H according to an embodiment of the present disclosure may be disposed at the rear package interior material 13H. For example, the rear package interior material 13H may be disposed behind the first to third rear seats BS1 to BS3. For example, a portion of the rear package interior material 13H may be disposed under a rear glass window.

The eighth sound generating apparatus 15H may be configured to vibrate the rear package interior material 13H to output the sound based on the vibration of the rear package interior material 13H. For example, the eighth sound generating apparatus 15H may be configured to directly vibrate the rear package interior material 13H to output the sound based on the vibration of the rear package interior material 13H.

According to an embodiment of the present disclosure, the eighth sound generating apparatus 15H may include one or more of the vibration apparatus described above with reference to FIGS. 1 to 42, and thus, its repetitive description may be omitted. For example, the eighth sound generating apparatus 15H may be a rear speaker.

According to an embodiment of the present disclosure, the rear package interior material 13H may include a first region corresponding to a rear portion of the first rear seat BS1, a second region corresponding to a rear portion of the second rear seat BS2, and a third region corresponding to a rear portion of the third passenger seat BS3. According to an embodiment of the present disclosure, the eighth sound generating apparatus 15H may be disposed to vibrate at least one or more of the first to third regions of the rear package interior material 13H. For example, the eighth sound generating apparatus 15H may be disposed at each of the first and second regions of the rear package interior material 13H, or may be disposed at each of the first to third regions of the rear package interior material 13H. For example, the eighth sound generating apparatus 15H may be disposed at at least one or more of the first and second regions of the rear package interior material 13H, or may be disposed at at least one or more of the first to third regions of the rear package interior material 13H.

For example, the eighth sound generating apparatus 15H configured to vibrate one or more of the first to third regions of the rear package interior material 13H may have the same sound output characteristic or different sound output characteristics. For example, the eighth sound generating apparatus 15H configured to vibrate each of the first to third regions of the rear package interior material 13H may have the same sound output characteristic or different sound output characteristics.

According to an embodiment of the present disclosure, the eighth sound generating apparatus 15H configured to vibrate one or more of the first to third regions of the rear package interior material 13H may concentrate or focus in any one or more of the first rear seat BS1 and the second rear seat BS2 a sound, and thus, may implement a user's privacy protection function of allowing a sound not to be listened in a periphery region (or an inaudible region) other than corresponding seats BS1 and BS2.

The vehicle 10 according to an embodiment of the present disclosure may further include a woofer speaker WS which is disposed at at least one or more among a dashboard 13A, a door frame 13B, and a rear package interior material 13H.

The woofer speaker WS according to an embodiment of the present disclosure may include at least one or more among a woofer, a mid-woofer, and a sub-woofer. For example, the woofer speaker WS may be a speaker which outputs a sound of about 60 Hz to about 150 Hz. Therefore, the woofer speaker WS may output a sound of about 60 Hz to about 150 Hz, and thus, may enhance a low-pitched sound band characteristic of a sound which is output to an indoor space.

According to an embodiment of the present disclosure, the woofer speaker WS may be disposed at at least one or more of first and second regions of the dashboard 13A. According to an embodiment of the present disclosure, the woofer speaker WS may be disposed at each of first to fourth door frames of the door frame 13D and may be exposed at a lower region among each of the first to fourth door interior materials 13D1 to 13D4 of the door interior material 13D. For example, the woofer speaker WS may be disposed at at least one or more of the first to fourth door frames of the door frame 13D and may be exposed at the lower regions of at least one or more of the first to fourth door interior materials 13D1 to 13D4 of the door interior material 13D. According to an embodiment of the present disclosure, the woofer speaker WS may be disposed at at least one or more of the first and second regions of the rear package interior material 13H. For example, the fourth sound generating apparatus 15D disposed at the lower region of each of the first to fourth door interior materials 13D1 to 13D4 may be replaced by the woofer speaker WS. For example, the fourth sound generating apparatus 15D disposed at the lower regions of at least one or more of the first to fourth door interior materials 13D1 to 13D4 may be replaced by the woofer speaker WS.

The vehicle 10 according to an embodiment of the present disclosure may further include an instrument panel apparatus 17 and an infotainment apparatus 19.

The instrument panel apparatus 17 according to an embodiment of the present disclosure may be disposed at a first region of the dashboard 13A to face the driver seat DS. The instrument panel apparatus 17 may include a display (or a first display) 17A which is disposed at the first region of the dashboard 13A to face the driver seat DS.

The first display 17A may include the display apparatus described above with reference to FIGS. 43 to 46, and thus, its repetitive description may be omitted. For example, the instrument panel apparatus 17 may output a sound, generated based on a vibration of a display panel based on a vibration of the vibration generating apparatus included in the first display 17A, toward the driver seat DS. For example, the first display 17A of the instrument panel apparatus 17 may concentrate or focus in the driver seat DS a sound, and thus, may implement a user's privacy protection function of allowing a sound not to be listened in a periphery region (or an inaudible region) other than the driver seat DS.

The infotainment apparatus 19 may be disposed at a third region of the dashboard 13A.

The infotainment apparatus 19 according to an embodiment of the present disclosure may be fixed on the third region of the dashboard 13A in an upright state.

The infotainment apparatus 19 according to another embodiment of the present disclosure may be installed to be raised and lowered on the third region of the dashboard 13A. For example, the infotainment apparatus 19 may be received or accommodated into the dashboard 13A on the based on the turn-off of the vehicle 10 or the manipulation of a vehicle passenger and may protrude to a region on the dashboard 13A based on the turn-on of the vehicle 10 or the manipulation of the vehicle passenger.

The infotainment apparatus 19 according to an embodiment of the present disclosure may include a display (or a second display) 19A disposed at the third region of the dashboard 13A, and a display elevation part.

The second display 19A may include the display apparatus described above with reference to FIGS. 43 to 46, and thus, its repetitive description may be omitted. For example, the infotainment apparatus 19 may output a sound, generated based on a vibration of a display panel based on a vibration of the vibration generating apparatus included in the second display 19A toward the driver seat DS and/or the passenger seat PS. For example, the second display 19A of the infotainment apparatus 19 may concentrate or focus in the driver seat DS or the passenger seat PS a sound, and thus, may implement a user's privacy protection function of allowing a sound not to be listened in a periphery region (or an inaudible region) other than the driver seat DS or the passenger seat PS.

The display elevation unit may be disposed at the third region of the dashboard 13A and may support the second display 19A so as to be raised and lowered. For example, the display elevation unit may raise the second display 19A based on the turn-on of the vehicle or the manipulation of the vehicle passenger, thereby allowing the second display 19A to protrude to a region on the dashboard 13A. Also, the display elevation unit may lower the second display 19A based on the turn-off of the vehicle 10 or the manipulation of the vehicle passenger, thereby allowing the second display 19A to be received or accommodated into the dashboard 13A.

The vehicle 10 according to an embodiment of the present disclosure may further include at least one or more transparent sound generating apparatus 16A to 16D disposed at a vehicle glass window. For example, the at least one or more transparent sound generating apparatus 16A to 16D may be disposed at at least one or more of a front glass window, a side glass window, a rear glass window, and a roof glass window, and may vibrate at least one or more of a front glass window, a side glass window, a rear glass window, and a roof glass window. For example, the at least one or more transparent sound generating apparatus 16A to 16D may include one or more of the display apparatuses described above with reference to FIGS. 1 to 42 and may be implemented to be transparent, and thus, their repetitive descriptions may be omitted. Thus, the at least one or more transparent sound generating apparatus 16A to 16D may concentrate or focus in corresponding seats of the driver seat DS, the passenger seat PS, and the first to third rear seats BS1 to BS3 a sound, and thus, may implement a user's privacy protection function of allowing a sound not to be listened in a periphery region (or an inaudible region) other than corresponding seats DS, PS, BS1, BS2, and BS3.

As described above, the vehicle 10 according to an embodiment of the present disclosure may output a sound S to an indoor space IS through the sound generating apparatus 15 for vehicles disposed between the vehicle structure 11 and a vehicle interior material 13, and thus, a sound may be output by the vehicle interior material as a vibration plate, thereby outputting a multi-channel surround stereophonic sound. Also, the vehicle 10 according to an embodiment of the present disclosure may output a sound by, as a sound vibration plate, a display panel of at least one of the one or more displays 17A and 19A of the instrument panel apparatus 17 and the infotainment apparatus 19 and may output a multi-channel surround stereophonic sound, which is more realistic, through a vibration generating apparatus of the instrument panel apparatus 17 and the one or more sound generating apparatuses 15A to 15H provided in the sound generating apparatus 15 for vehicles, a vibration generating apparatus of the infotainment apparatus 19, and at least one of the one or more transparent sound generating apparatuses 16A to 16D provided in a glass window. The vehicle 10 according to an embodiment of the present disclosure may concentrate or focus a sound on a driver seat DS, a passenger seat PS, and one or more of first to third occupant seats BST to BS3 through the one or more sound generating apparatuses 15A to 15H, the one or more transparent sound generating apparatuses 16A to 16D, the vibration generating apparatus of the instrument panel apparatus 17, and vibration generating apparatus of the infotainment apparatus 19, and thus, may implement a user's privacy protection function of allowing a sound not to be listened in a periphery region (or an inaudible region) other than corresponding seats DS, PD, BST, BS2, and BS3.

A vibration apparatus, an apparatus and vehicle including the same according to an embodiment of the present disclosure will be described below.

A vibration apparatus according to an embodiment of the present disclosure may comprise a lower vibration structure, an upper vibration structure on the lower vibration structure, and an adhesive member between the lower vibration structure and the upper vibration structure, the lower vibration structure and the upper vibration structure may be configured to generate sound waves having different frequencies.

According to some embodiments of the present disclosure, a sound wave generated from at least one of the lower vibration structure and the upper vibration structure may comprise an ultrasonic wave.

According to some embodiments of the present disclosure, the adhesive member may have a young's modulus of $10^7$ Pa or more, or shore hardness of 50 or more.

According to some embodiments of the present disclosure, the sound wave generated from each of the lower vibration structure and the upper vibration structure may be one or more of an audible frequency, an ultrasonic wave of an inaudible frequency band, and an ultrasonic wave of an inaudible frequency band including the audible frequency.

According to some embodiments of the present disclosure, the sound wave generated from the lower vibration structure may be an ultrasonic wave of an inaudible frequency band, and the sound wave generated from the upper vibration structure may be an ultrasonic wave of an inaudible frequency band including an audible frequency.

According to some embodiments of the present disclosure, each of the lower vibration structure and the upper vibration structure may comprise a first base member, a second base member overlapping the first base member, and a plurality of vibration generating parts disposed between the first base member and the second base member.

According to some embodiments of the present disclosure, each of the lower vibration structure and the upper vibration structure may further comprise an adhesive layer disposed between the first base member and the second base member to surround side surfaces of each of the plurality of vibration generating parts.

According to some embodiments of the present disclosure, the adhesive layer may include a first adhesive layer disposed at a rear surface of the first base member and a second adhesive layer disposed at an upper surface of the second base member.

According to some embodiments of the present disclosure, each of the first and second adhesive layers may include an electric insulating material having adhesiveness and may include a material capable of compression and decompression.

According to some embodiments of the present disclosure, the plurality of vibration generating part may have a circular band shape, an oval band shape or a donut shape having an opening portion.

According to some embodiments of the present disclosure, the plurality of vibration generating part of the upper vibration structure may include a pair of vibration generating parts having a nonlinear shape.

According to some embodiments of the present disclosure, each of a plurality of vibration generating parts disposed at the upper vibration structure may overlap a corresponding vibration generating part of a plurality of vibration generating parts disposed at the lower vibration structure.

According to some embodiments of the present disclosure, each of the lower vibration structure and the upper vibration structure may comprise a plurality of first power supply electrodes disposed at the first base member and electrically connected to a first surface of each of the plurality of vibration generating parts, a plurality of second power supply electrodes disposed at the second base member to respectively cross the plurality of first power supply electrodes and electrically connected to a second surface of each of the plurality of vibration generating parts, a plurality of first power supply lines disposed at the first base member and electrically connected to each of the plurality of first power supply electrodes, and a plurality of second power supply lines disposed at the second base member and electrically connected to each of the plurality of second power supply electrodes.

According to some embodiments of the present disclosure, each of the lower vibration structure and the upper vibration structure may comprise a pad part electrically connected to the plurality of first power supply lines and the plurality of second power supply lines, and a flexible cable electrically connected to the pad part.

According to some embodiments of the present disclosure, the pad part may include a plurality of first pads disposed in parallel at a first periphery portion of a second surface periphery portion of the first base member, and a plurality of second pads disposed in parallel at a first periphery portion of a first surface periphery portion of the second base member.

According to some embodiments of the present disclosure, each of the plurality of first pads may be electrically connected to each of the plurality of first power supply electrodes through one of the plurality of first power supply lines, and each of the plurality of second pads may be electrically connected to each of the plurality of second power supply electrodes through one of the plurality of second power supply lines.

According to some embodiments of the present disclosure, one or more of the first base member and the second base member may further include a plurality of pad holes respectively overlapping the plurality of first pads and the plurality of second pads.

According to some embodiments of the present disclosure, the flexible cable of each of the lower vibration structure and the upper vibration structure may comprise a plurality of protrusion lines electrically connected to the pad part and disposed between the first base member and the second base member.

According to some embodiments of the present disclosure, each of the plurality of vibration generating parts may be disposed at intersection portions between each of the plurality of first power supply electrodes and each of the plurality of second power supply electrodes and are spaced apart from one another in a first direction and a second direction crossing the first direction.

According to some embodiments of the present disclosure, each of the plurality of vibration generating parts may extend long in a first direction and may have a line shape which is spaced apart from an adjacent vibration generating part in a second direction crossing the first direction, and each of the plurality of first power supply electrodes disposed at the lower vibration structure may be disposed at the plurality of vibration generating parts to be spaced apart from one another.

According to some embodiments of the present disclosure, the plurality of vibration generating parts may be respectively disposed at intersection portions between the plurality of first power supply electrodes and the plurality of second power supply electrodes and may be spaced apart from one another in the first direction and the second direction crossing the first direction.

According to some embodiments of the present disclosure, each of the plurality of vibration generating parts may comprise a vibration portion including a piezoelectric material, a first electrode layer disposed at a first surface of the vibration portion, and a second electrode layer disposed at a second surface of the vibration portion.

According to some embodiments of the present disclosure, a polarization direction of the vibration portion provided in the first vibration structure may be same or opposite to a polarization direction of the vibration portion provided in the second vibration structure.

According to some embodiments of the present disclosure, the vibration portion may be configured as a ceramic-based material for generating a relatively high vibration, or may be configured as a piezoelectric ceramic having a perovskite-based crystalline structure.

According to some embodiments of the present disclosure, the vibration portion may have a piezoelectric deformation coefficient "d33" of 1,000 pC/N or more in a thickness direction of the vibration apparatus.

According to some embodiments of the present disclosure, each of the plurality of vibration generating parts may comprise a vibration portion including a piezoelectric material, a first electrode layer disposed at a first surface of the vibration portion, and a second electrode layer disposed at a second surface of the vibration portion. Each of the plurality of first power supply electrodes may be electrically connected to the first electrode layer of each of the plurality of vibration generating parts by an anisotropic conductive film or a conductive material included in an adhesive layer. And each of the plurality of second power supply electrodes may be electrically connected to the second electrode layer of each of the plurality of vibration generating parts by an anisotropic conductive film or a conductive material included in an adhesive layer.

According to some embodiments of the present disclosure, the vibration portion of the vibration generating part may include a plurality of inorganic material portions and a plurality of flexible portions alternately and repeatedly arranged in a first direction or a second direction of the vibration apparatus.

According to some embodiments of the present disclosure, the plurality of flexible portions may have modulus and viscoelasticity that are lower than those of the plurality of inorganic material portions.

According to some embodiments of the present disclosure, a vibration portion of the lower vibration structure and a vibration portion of the upper vibration structure may vibrate in the same direction.

According to some embodiments of the present disclosure, in the lower vibration structure, a first surface of the vibration portion may have an inclined-surface structure which is inclined from both sides to a center line, and a second surface of the vibration portion may have a planar structure.

According to some embodiments of the present disclosure, in the lower vibration structure, a distance between the first surface and the second surface of the vibration portion may be reduced progressively in a direction from the both sides to the center line.

According to some embodiments of the present disclosure, each of the lower vibration structure and the upper vibration structure may comprise a first base member, a second base member overlapping the first base member, and a vibration generating part disposed between the first base member and the second base member.

According to some embodiments of the present disclosure, the vibration generating part of each of the lower vibration structure and the upper vibration structure may comprise a plurality of inorganic material portions including a piezoelectric material, and a flexible portion between the plurality of inorganic material portions.

According to some embodiments of the present disclosure, each of the plurality of inorganic material portions disposed at the upper vibration structure may overlap each of the plurality of inorganic material portions disposed at the lower vibration structure.

According to some embodiments of the present disclosure, the flexible portion may comprise one or more of an organic material, an organic polymer, an organic piezoelectric material, and an organic non-piezoelectric material.

According to some embodiments of the present disclosure, the vibration generating part of each of the lower vibration structure and the upper vibration structure may comprise a 2-2 type composite structure or a 1-3 type composite structure.

According to some embodiments of the present disclosure, the lower vibration structure may comprise a first region and a second region, and the upper vibration structure may comprise a first upper vibration structure on the first region of the lower vibration structure, and a second upper vibration structure on the second region of the lower vibration structure.

According to some embodiments of the present disclosure, a sound wave generated from each of the lower vibration structure, the first upper vibration structure, and the second upper vibration structure may be one or more of an audible frequency, an ultrasonic wave of an inaudible frequency band, and an ultrasonic wave of an inaudible frequency band including the audible frequency.

According to some embodiments of the present disclosure, the sound wave generated from the lower vibration structure may be the ultrasonic wave of the inaudible frequency band, the sound wave generated from the first upper vibration structure may be the ultrasonic wave of the inaudible frequency band including the audible frequency, and the sound wave generated from the second upper vibration structure may be an ultrasonic wave of an inaudible frequency band including the audible frequency, which is the same or different from the sound wave generated from the first upper vibration structure.

According to some embodiments of the present disclosure, each of the lower vibration structure, the first upper vibration structure, and the second upper vibration structure may comprise a first base member, a second base member overlapping the first base member, and at least one vibration generating part disposed between the first base member and the second base member.

According to some embodiments of the present disclosure, at least one vibration generating part disposed at each of the first upper vibration structure and the second upper vibration structure may overlap at least one vibration generating part disposed at the lower vibration structure.

According to some embodiments of the present disclosure, the vibration apparatus may further comprise an intermediate vibration structure disposed between the lower vibration structure and the upper vibration structure.

According to some embodiments of the present disclosure, each of the lower vibration structure, the intermediate vibration structure, and the upper vibration structure may have a circular shape or an oval shape.

According to some embodiments of the present disclosure, the intermediate vibration structure may generate a sound wave on a periphery portion of the lower vibration structure, and the upper vibration structure may generate a sound wave on a periphery portion of the intermediate vibration structure.

According to some embodiments of the present disclosure, a sound wave generated from each of the lower vibration structure, the intermediate vibration structure, and the upper vibration structure may be one or more of an audible frequency, an ultrasonic wave of an inaudible frequency band, and an ultrasonic wave of an inaudible frequency band including the audible frequency.

According to some embodiments of the present disclosure, each of the lower vibration structure, the intermediate vibration structure, and the upper vibration structure may comprise a first base member, a second base member overlapping the first base member, and a vibration generating part disposed between the first base member and the second base member.

According to some embodiments of the present disclosure, the lower vibration structure may comprise a first base member, a second base member overlapping the first base member, and a plurality of vibration generating parts disposed between the first base member and the second base member, and the upper vibration structure may comprise a first base member, a second base member overlapping the first base member, and a pair of vibration generating parts disposed between the first base member and the second base member, the pair of vibration generating parts including an inclined surface.

According to some embodiments of the present disclosure, each of the plurality of vibration generating parts and the pair of vibration generating parts may comprise a vibration portion including a piezoelectric material, a first electrode layer disposed at a first surface of the vibration portion, and a second electrode layer disposed at a second surface of the vibration portion.

According to some embodiments of the present disclosure, the vibration portion of each of the pair of vibration generating parts may overlap a vibration portion of each vibration generating part disposed at a periphery portion of the plurality of vibration generating parts.

According to some embodiments of the present disclosure, in each of the pair of vibration generating parts, a first surface of the vibration portion may have an inclined-surface structure which is inclined from both ends of the upper vibration structure to a center line, and a second surface of the vibration portion may have a planar structure.

According to some embodiments of the present disclosure, the inclined-surface structure may include a first inclined surface and a second inclined surface, and a first included angle between the first inclined surface and the second surface may be an acute angle and a second included angle between the second inclined surface and the second surface may be an acute angle.

According to some embodiments of the present disclosure, the first included angle and the second included angle may be in a range of 10 degrees to 75 degrees.

According to some embodiments of the present disclosure, in each of the pair of vibration generating parts, a first surface of the vibration portion may have an inclined-surface structure which is inclined from one end of the upper vibration structure to a center line, with respect to a first direction of the vibration apparatus, and a second surface of the vibration portion may have a planar structure.

According to some embodiments of the present disclosure, the vibration portion of each of the pair of vibration generating parts may have an L-shaped planar structure and overlaps a periphery portion of the lower vibration structure.

According to some embodiments of the present disclosure, the vibration apparatus may further comprise a vibration driving circuit electrically connected to each of the lower vibration structure and the upper vibration structure through a flexible cable and supplying a first vibration driving signal to the first vibration structure and a second vibration driving signal to the second vibration structure.

An apparatus according to some embodiments of the present disclosure may comprise a vibration member, a vibration generating apparatus in the vibration member, and a connection member between the vibration member and the vibration generating apparatus, the vibration generating apparatus comprises the vibration apparatus, and the vibration apparatus may comprise a lower vibration structure, an upper vibration structure on the lower vibration structure, and an adhesive member between the lower vibration structure and the upper vibration structure, and the lower vibration structure and the upper vibration structure may be configured to generate sound waves having different frequencies.

According to some embodiments of the present disclosure, the vibration member may be one or more of a display panel including a plurality of pixels configured to display an image, a screen panel on which an image is projected from a display apparatus, a lighting panel, a vibration plate, wood, plastic, glass, cloth, metal, a vehicle interior material, a vehicle glass window, a building indoor ceiling, a building glass window, an aircraft interior material, and an aircraft glass window.

According to some embodiments of the present disclosure, the connection member may further include a hollow portion between the display panel and the vibration generating apparatus, for providing an air gap between the display panel and the vibration generating apparatus.

According to some embodiments of the present disclosure, the vibration member may be a display panel including a plurality of pixels configured to display an image, the display panel may comprise a first rear region and a second rear region, the vibration generating apparatus may comprise a first vibration generating device disposed at the first rear region of the display panel, and a second vibration generating device disposed at the second rear region of the display panel.

According to some embodiments of the present disclosure, the apparatus may further comprise a plate between the display panel and the vibration generating apparatus.

According to some embodiments of the present disclosure, the apparatus may further comprise a supporting member disposed at a rear surface of the display panel, and a partition disposed between the rear surface of the display panel and the supporting member and between the first rear region and the second rear region of the display panel.

According to some embodiments of the present disclosure, the plate may include a plurality of opening portions configured to have a predetermined size and a predetermined interval.

A vehicle according to some embodiments of the present disclosure may comprise a vehicle interior material covering a vehicle structure, and a sound generating apparatus disposed at the vehicle interior material, the sound generating apparatus may include a vibration apparatus, the vehicle interior material vibrates according to a vibration of the sound generating apparatus to output a sound, and the vibration apparatus may comprise a lower vibration structure, an upper vibration structure on the lower vibration structure, and an adhesive member between the lower vibration structure and the upper vibration structure, and the lower vibration structure and the upper vibration structure may be configured to generate sound waves having different frequencies.

According to some embodiments of the present disclosure, the vehicle structure may include a main frame, a side frame, a door frame, a glass window, and a seat frame.

According to some embodiments of the present disclosure, the vehicle interior material may comprise one or more materials of plastic, a fiber, leather, wood, cloth, metal, and glass.

According to some embodiments of the present disclosure, the sound generating apparatus may be disposed between the vehicle structure and the vehicle interior material or is disposed at the vehicle interior material.

According to some embodiments of the present disclosure, the vehicle interior material may comprise at least one or more among a dashboard, a pillar interior material, a roof interior material, a door interior material, a seat interior material, a handle interior material, a floor interior material, and a rear package interior material, and the sound generating apparatus may vibrate at least one or more of the dashboard, the pillar interior material, the roof interior material, the door interior material, the seat interior material, the handle interior material, the floor interior material, and the rear package interior material.

According to some embodiments of the present disclosure, the vehicle may further comprise a glass window, and a transparent sound generating apparatus at the glass window.

According to some embodiments of the present disclosure, the glass window may comprise at least one or more of a front glass window, a side glass window, a rear glass window, and a roof glass window, and the transparent sound generating apparatus may vibrate at least one or more of the front glass window, the side glass window, the rear glass window, and the roof glass window.

The vibration apparatus and an apparatus including the same according to an embodiment of the present disclosure may be applied to various electronic apparatus. For example, the vibration apparatus and an apparatus including the same may be applied to mobile apparatuses, video phones, smart watches, watch phones, wearable apparatuses, foldable apparatuses, rollable apparatuses, bendable apparatuses, flexible apparatuses, curved apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, home appliances, or the like.

Also, the vibration apparatus according to an embodiment of the present disclosure may be applied to light emitting diode lighting apparatuses, organic light emitting lighting apparatuses, or inorganic light emitting lighting apparatuses. When the vibration apparatus is applied to lighting apparatuses, the vibration apparatus may act as lighting and a speaker. As another embodiment of the present disclosure, when the vibration apparatus according to an embodiment of the present disclosure is applied to a mobile device, or the like, the vibration apparatus may act as one or more of a speaker, a receiver, and a haptic, but are not limited thereto.

As another embodiment of the present disclosure, the vibration apparatus according to an embodiment of the present disclosure may be applied to a non-display apparatus or a vibration member instead of a display apparatus. For example, when a vibration apparatus is applied to a vibration member or a non-display apparatus instead of a display apparatus, the vibration apparatus may be a vehicle speaker or a speaker implemented along with lighting, or the like, but embodiments of the present disclosure are not limited thereto.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A vibration apparatus, comprising:

a lower vibration structure;

an upper vibration structure on the lower vibration structure; and an adhesive member between the lower vibration structure and the upper vibration structure, wherein the lower vibration structure and the upper vibration structure are configured to generate sound waves having different frequencies, wherein each of the lower vibration structure and the upper vibration structure comprises:

a first base member;

a second base member overlapping the first base member; and a plurality of vibration generating parts disposed between the first base member and the second base member, and wherein each of the plurality of vibration generating parts disposed at the upper vibration structure overlaps a corresponding vibration generating part of the plurality of vibration generating parts disposed at the lower vibration structure.

2. The vibration apparatus of claim 1, wherein each of the lower vibration structure and the upper vibration structure further comprises:

an adhesive layer disposed between the first base member and the second base member to surround side surfaces of each of the plurality of vibration generating parts.

3. The vibration apparatus of claim 2, wherein the adhesive layer includes:

a first adhesive layer disposed at a rear surface of the first base member; and a second adhesive layer disposed at an upper surface of the second base member.

4. The vibration apparatus of claim 1, wherein the plurality of vibration generating part have a circular band shape, an oval band shape or a donut shape having an opening portion.

5. The vibration apparatus of claim 1, wherein the plurality of vibration generating part of the upper vibration structure include a pair of vibration generating parts having a nonlinear shape.

6. The vibration apparatus of claim 1, wherein each of the lower vibration structure and the upper vibration structure comprises:

a plurality of first power supply electrodes disposed at the first base member and electrically connected to a first surface of each of the plurality of vibration generating parts;

a plurality of second power supply electrodes disposed at the second base member to respectively cross the plurality of first power supply electrodes and electrically connected to a second surface of each of the plurality of vibration generating parts;

a plurality of first power supply lines disposed at the first base member and electrically connected to each of the plurality of first power supply electrodes; and a plurality of second power supply lines disposed at the second base member and electrically connected to each of the plurality of second power supply electrodes.

7. The vibration apparatus of claim 6, wherein each of the lower vibration structure and the upper vibration structure comprises:

a pad part electrically connected to the plurality of first power supply lines and the plurality of second power supply lines; and a flexible cable electrically connected to the pad part.

8. The vibration apparatus of claim 7, wherein the pad part includes a plurality of first pads disposed in parallel at a first periphery portion of a second surface periphery portion of the first base member, and a plurality of second pads disposed in parallel at a first periphery portion of a first surface periphery portion of the second base member.

9. The vibration apparatus of claim 8, wherein each of the plurality of first pads is electrically connected to each of the plurality of first power supply electrodes through one of the plurality of first power supply lines, and each of the plurality of second pads is electrically connected to each of the plurality of second power supply electrodes through one of the plurality of second power supply lines.

10. The vibration apparatus of claim 7, wherein the flexible cable of each of the lower vibration structure and the upper vibration structure comprises a plurality of protrusion lines electrically connected to the pad part and disposed between the first base member and the second base member.

11. The vibration apparatus of claim 6, wherein each of the plurality of vibration generating parts is disposed at intersection portions between each of the plurality of first power supply electrodes and each of the plurality of second power supply electrodes and are spaced apart from one another in a first direction and a second direction crossing the first direction.

12. The vibration apparatus of claim 6, wherein each of the plurality of vibration generating parts extends long in a first direction and has a line shape which is spaced apart from an adjacent vibration generating part in a second direction crossing the first direction, and wherein each of the plurality of first power supply electrodes disposed at the lower vibration structure is disposed at the plurality of vibration generating parts to be spaced apart from one another.

13. The vibration apparatus of claim 12, wherein the plurality of vibration generating parts are respectively disposed at intersection portions between the plurality of first power supply electrodes and the plurality of second power supply electrodes and are spaced apart from one another in the first direction and the second direction crossing the first direction.

14. The vibration apparatus of claim 1, wherein each of the plurality of vibration generating parts comprises:

a vibration portion including a piezoelectric material;

a first electrode layer disposed at a first surface of the vibration portion; and a second electrode layer disposed at a second surface of the vibration portion.

15. The vibration apparatus of claim 14, wherein a polarization direction of the vibration portion provided in the first vibration structure is same or opposite to a polarization direction of the vibration portion provided in the second vibration structure.

16. The vibration apparatus of claim 14, wherein the vibration portion of the vibration generating part includes a plurality of inorganic material portions and a plurality of flexible portions alternately and repeatedly arranged in a first direction or a second direction of the vibration apparatus.

17. The vibration apparatus of claim 16, wherein the plurality of flexible portions have modulus and viscoelasticity that are lower than those of the plurality of inorganic material portions.

18. The vibration apparatus of claim 14, wherein a vibration portion of the lower vibration structure and a vibration portion of the upper vibration structure vibrate in the same direction.

19. The vibration apparatus of claim 16, wherein, in the lower vibration structure, a first surface of the vibration portion has an inclined-surface structure which is inclined from both sides to a center line, and a second surface of the vibration portion has a planar structure.

20. The vibration apparatus of claim 19, wherein, in the lower vibration structure, a distance between the first surface and the second surface of the vibration portion is reduced progressively in a direction from the both sides to the center line.

21. A vibration apparatus, comprising:

a lower vibration structure;

an upper vibration structure on the lower vibration structure; and an adhesive member between the lower vibration structure and the upper vibration structure, wherein the lower vibration structure and the upper vibration structure are configured to generate sound waves having different frequencies, wherein each of the lower vibration structure and the upper vibration structure comprises:

a first base member;

a second base member overlapping the first base member; and a vibration generating part disposed between the first base member and the second base member and configured to include a plurality of inorganic material portions including a piezoelectric material and a flexible portion between the plurality of inorganic material portions, and wherein each of the plurality of inorganic material portions disposed at the upper vibration structure overlaps each of the plurality of inorganic material portions disposed at the lower vibration structure.

22. The vibration apparatus of claim 21, wherein the flexible portion comprises one or more of an organic material, an organic polymer, an organic piezoelectric material, and an organic non-piezoelectric material.

23. The vibration apparatus of claim 21, wherein the vibration generating part of each of the lower vibration structure and the upper vibration structure comprises a 2-2 type composite structure or a 1-3 type composite structure.

24. A vibration apparatus, comprising:

a lower vibration structure;

an upper vibration structure on the lower vibration structure; and an adhesive member between the lower vibration structure and the upper vibration structure, wherein the lower vibration structure and the upper vibration structure are configured to generate sound waves having different frequencies, wherein the lower vibration structure comprises a first region and a second region, and wherein the upper vibration structure comprises:

a first upper vibration structure on the first region of the lower vibration structure; and a second upper vibration structure on the second region of the lower vibration structure, wherein each of the lower vibration structure, the first upper vibration structure, and the second upper vibration structure comprises:

a first base member;

a second base member overlapping the first base member; and at least one vibration generating part disposed between the first base member and the second base member, and wherein at least one vibration generating part disposed at each of the first upper vibration structure and the second upper vibration structure overlaps at least one vibration generating part disposed at the lower vibration structure.

25. The vibration apparatus of claim 24, wherein a sound wave generated from each of the lower vibration structure, the first upper vibration structure, and the second upper vibration structure is one or more of an audible frequency, an ultrasonic wave of an inaudible frequency band, and an ultrasonic wave of an inaudible frequency band including the audible frequency.

26. The vibration apparatus of claim 24, wherein the sound wave generated from the lower vibration structure is the ultrasonic wave of the inaudible frequency band, wherein the sound wave generated from the first upper vibration structure is the ultrasonic wave of the inaudible frequency band including the audible frequency, and wherein the sound wave generated from the second upper vibration structure is an ultrasonic wave of an inaudible frequency band including the audible frequency, which is the same or different from the sound wave generated from the first upper vibration structure.

27. A vibration apparatus, comprising:

a lower vibration structure;

an upper vibration structure on the lower vibration structure; and an adhesive member between the lower vibration structure and the upper vibration structure, wherein the lower vibration structure and the upper vibration structure are configured to generate sound waves having different frequencies, wherein the lower vibration structure comprises:

a first base member;

a second base member overlapping the first base member; and a plurality of vibration generating parts disposed between the first base member and the second base member, wherein the upper vibration structure comprises:

a first base member;

a second base member overlapping the first base member; and a pair of vibration generating parts disposed between the first base member and the second base member, the pair of vibration generating parts including an inclined surface, and wherein each of the pair of vibration generating parts overlaps each vibration generating part disposed at a periphery portion of the plurality of vibration generating parts.

28. The vibration apparatus of claim 27, wherein each of the plurality of vibration generating parts and the pair of vibration generating parts comprises:

a vibration portion including a piezoelectric material;

a first electrode layer disposed at a first surface of the vibration portion; and a second electrode layer disposed at a second surface of the vibration portion.

29. The vibration apparatus of claim 28, wherein, in each of the pair of vibration generating parts, a first surface of the vibration portion has an inclined-surface structure which is inclined from both ends of the upper vibration structure to a center line, and a second surface of the vibration portion has a planar structure.

30. The vibration apparatus of claim 29, wherein the inclined-surface structure includes a first inclined surface and a second inclined surface, and a first included angle between the first inclined surface and the second surface is an acute angle and a second included angle between the second inclined surface and the second surface is an acute angle.

31. The vibration apparatus of claim 30, wherein the first included angle and the second included angle are in a range of 10 degrees to 75 degrees.

32. The vibration apparatus of claim 28, wherein, in each of the pair of vibration generating parts, a first surface of the vibration portion has an inclined-surface structure which is inclined from one end of the upper vibration structure to a center line, with respect to a first direction of the vibration apparatus, and a second surface of the vibration portion has a planar structure.

33. The vibration apparatus of claim 28, wherein the vibration portion of each of the pair of vibration generating parts has an L-shaped planar structure and overlaps a periphery portion of the lower vibration structure.

34. The vibration apparatus of claim 28, wherein the vibration portion of each of the pair of vibration generating parts overlaps a vibration portion of each vibration generating part disposed at a periphery portion of the plurality of vibration generating parts.

* * * * *